US009074717B2

(12) United States Patent
Nomura et al.

(10) Patent No.: US 9,074,717 B2
(45) Date of Patent: Jul. 7, 2015

(54) VACUUM HEAT INSULATING MATERIAL, HEAT INSULATING BOX USING VACUUM HEAT INSULATING MATERIAL, REFRIGERATOR, REFRIGERATING/AIR-CONDITIONING APPARATUS, WATER HEATER, EQUIPMENTS, AND MANUFACTURING METHOD OF VACUUM HEAT INSULATING MATERIAL

(75) Inventors: Kyoko Nomura, Chiyoda-ku (JP); Syuichi Iwata, Chiyoda-ku (JP); Hiroshi Nakashima, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/161,234

(22) Filed: Jun. 15, 2011

(65) Prior Publication Data
US 2011/0241514 A1 Oct. 6, 2011

Related U.S. Application Data

(62) Division of application No. 13/133,585, filed as application No. PCT/JP2009/062102 on Jul. 2, 2009.

(30) Foreign Application Priority Data

Dec. 26, 2008 (JP) ................................. 2008-332904

(51) Int. Cl.
*A47B 96/04* (2006.01)
*B32B 23/00* (2006.01)
(Continued)

(52) U.S. Cl.
CPC ............ *F16L 59/065* (2013.01); *Y10T 428/231* (2015.01); *Y10T 29/4998* (2015.01); *Y10T 428/1366* (2015.01); *F25D 2201/14* (2013.01)

(58) Field of Classification Search
CPC .......... F25D 23/00; F25D 23/02; F25D 23/06
See application file for complete search history.

(56) References Cited

U.S. PATENT DOCUMENTS

| 1,641,288 A | 9/1927 | Neidich |
| 3,016,160 A | 1/1962 | Scharpf |

(Continued)

FOREIGN PATENT DOCUMENTS

| CN | 101023291 A | 8/2007 |
| CN | 101086315 A | 12/2007 |

(Continued)

OTHER PUBLICATIONS

International Search Report (PCT/ISA/210) issued on Aug. 25, 2009, by Japanese Patent Office as the International Searching Authority for International Application No. PCT/JP2009/062102.

(Continued)

*Primary Examiner* — Jennifer Chriss
*Assistant Examiner* — Camie Thompson
(74) *Attorney, Agent, or Firm* — Buchanan Ingersoll & Rooney PC

(57) ABSTRACT

A highly reliable vacuum heat insulating material having excellent processability, usability and heat insulating performance and a heat insulating box using the vacuum heat insulating material are provided. A vacuum heat insulating material related to the present invention includes: a core material structured by a laminated structure of an organic fiber assembly formed by forming an organic fiber into a sheet shape and cutting an end face with a predetermined length, and having a core material opening portion formed by a through hole or a notch with cutting; a gas-barrier outer cover material containing the core material inside, having a sealing portion for sealing surrounding of the sheet-shaped organic fiber assembly and surrounding of the core material opening portion, and hermetically sealing an inside with almost vacuum status by sealing the sealing portion; and an outer cover material opening portion provided at the outer cover material under a status in which the sealing portion provided at the surrounding of the sheet-shaped organic fiber assembly and the surrounding of the core material opening portion is sealed, being a through hole or a notch which is smaller than the core material opening portion with a sealed amount, and a long fiber being equal to or longer than a length of the sheet is used for the organic fiber.

23 Claims, 27 Drawing Sheets

(51) Int. Cl.
*B29D 23/00* (2006.01)
*F16L 59/065* (2006.01)

(56) References Cited

U.S. PATENT DOCUMENTS

| | | | |
|---|---|---|---|
| 3,368,934 | A | 2/1968 | Vosburgh, Sr. |
| 3,537,226 | A | 11/1970 | Van et al. |
| 3,755,062 | A | 8/1973 | Schirmer |
| 3,979,245 | A | 9/1976 | Bondra, Jr. et al. |
| 4,055,268 | A | 10/1977 | Barthel |
| 5,731,248 | A | 3/1998 | Phillips et al. |
| 5,791,551 | A | 8/1998 | Parks et al. |
| 8,211,523 | B2 | 7/2012 | Fujimori et al. |
| 2003/0157284 | A1 | 8/2003 | Tanimoto et al. |
| 2003/0167789 | A1 | 9/2003 | Tanimoto et al. |
| 2003/0209002 | A1 | 11/2003 | Lancaster |
| 2004/0180176 | A1 | 9/2004 | Rusek, Jr. |
| 2004/0253406 | A1 | 12/2004 | Hayashi et al. |
| 2005/0023731 | A1 | 2/2005 | Kondo et al. |
| 2005/0175809 | A1 | 8/2005 | Hirai et al. |
| 2008/0095970 | A1 | 4/2008 | Takashima et al. |
| 2008/0279603 | A1 | 11/2008 | Chen |
| 2011/0241513 | A1* | 10/2011 | Nomura et al. ............... 312/405 |
| 2012/0196059 | A1* | 8/2012 | Fujimori et al. ............. 428/34.1 |

FOREIGN PATENT DOCUMENTS

| | | |
|---|---|---|
| CN | 101363566 A | 2/2009 |
| CN | 100529504 C | 8/2009 |
| EP | 1457612 A1 | 9/2004 |
| GB | 2 451 614 A | 2/2009 |
| JP | 62-45136 S | 3/1987 |
| JP | 62-141189 U | 9/1987 |
| JP | 7-103955 B2 | 11/1994 |
| JP | 7-091594 A | 4/1995 |
| JP | 8-028776 A | 2/1996 |
| JP | 10-253243 A | 9/1998 |
| JP | 2000-097390 A | 4/2000 |
| JP | 2000-249290 A | 9/2000 |
| JP | 2001-336691 A | 12/2001 |
| JP | 2002-188791 A | 7/2002 |
| JP | 2003-293256 A | 10/2003 |
| JP | 2004-245258 A | 9/2004 |
| JP | 2004-340197 A | 12/2004 |
| JP | 2005-061611 A | 3/2005 |
| JP | 2005-257232 A | 9/2005 |
| JP | 2005-344832 A | 12/2005 |
| JP | 2005-344870 A | 12/2005 |
| JP | 2006-017151 A | 1/2006 |
| JP | 2006-029505 A | 2/2006 |
| JP | 2006-077790 A | 3/2006 |
| JP | 2006-112440 A | 4/2006 |
| JP | 2006-118808 A | 5/2006 |
| JP | 2006-125631 A | 5/2006 |
| JP | 2006-161939 A | 6/2006 |
| JP | 2006-162076 A | 6/2006 |
| JP | 2006-170303 A | 6/2006 |
| JP | 2006-183810 A | 7/2006 |
| JP | 2006-283817 A | 10/2006 |
| JP | 2006-292361 A | 10/2006 |
| JP | 2006-307921 A | 11/2006 |
| JP | 2007-056972 A | 3/2007 |
| JP | 2007-056974 A | 3/2007 |
| JP | 2007-092776 A | 4/2007 |
| JP | 2007-155065 A | 6/2007 |
| JP | 2007-155276 A | 6/2007 |
| JP | 2007-309478 A | 11/2007 |
| JP | 2007-321925 A | 12/2007 |
| JP | 2008-157431 A | 7/2008 |
| JP | 2008-157516 A | 7/2008 |
| JP | 2008-215632 A | 9/2008 |
| JP | 2008-223922 A | 9/2008 |
| JP | 2008-232372 A | 10/2008 |
| JP | 2009-041592 A | 2/2009 |
| JP | 2009-121671 A | 6/2009 |
| JP | 2009-228917 A | 8/2009 |
| WO | 01/11119 A1 | 2/2001 |

OTHER PUBLICATIONS

Extended European Search Report issued Aug. 20, 2012 in corresponding European Patent Application No. 11004596.0. (9 pages).
Office Action dated Dec. 12, 2012 issued by the USPTO in corresponding U.S. Appl. No. 13/530,153.
Office Action dated Dec. 4, 2012 issued by the Japanese Patent Office in corresponding Japanese Application No. 2011-002839, and a partial English translation thereof.
International Search Report dated Mar. 16, 2010 issued by the Japanese Patent Office in corresponding PCT/JP2010/052244.
International Search Report dated May 11, 2010 issued by the Japanese Patent Office in corresponding PCT/JP2010/052245.
International Search Report dated Mar. 23, 2013 issued by the Japanese Patent Office in corresponding PCT/JP2010/052246.
Notification of the First Office Action dated Dec. 21, 2012 issued by the Chinese Patent Office in corresponding Chinese Patent Application No. 201110187463.X, and an English translation of the text portion thereof.
Advisory Action dated Jul. 11, 2013 issued by the U.S. Patent and Trademark Office in corresponding U.S. Appl. No. 13/530,153.
Office Action dated Jun. 11, 2013 issued by the Japanese Patent Office in corresponding Japanese Patent Application No. 2011-002839, and a partial translation thereof.
Office Action dated Jun. 11, 2013 issued by the Japanese Patent Office in corresponding Japanese Patent Application No. 2011-105767, and a partial translation thereof.
Office Action dated Jan. 29, 2013, issued in corresponding Japanese Patent Application No. 2011-105767, and a partial English translation thereof.
Notification of the Second Office Action dated Mar. 6, 2013 issued in corresponding Chinese Patent Application No. 200980148266.8, and an English translation of the text portion thereof.
Office Action dated Mar. 12, 2013 issued in corresponding Japanese Patent Application No. 2011-536052, and a partial English translation thereof.
Office Action issued by the U.S. Patent and Trademark Office in the U.S. Appl. No. 13/530,153, mailed Apr. 15, 2013, U.S. Patent and Trademark Office, Alexandria, VA. (20 pages).
Extended European Search Report dated Jan. 21, 2013 issued by the EPO in corresponding European Patent Application No. 12 17 9415.0.
Office Action issued on Mar. 20, 2014, by the European Patent Office in corresponding European Patent Application No. 12 179 415.0. (5 pages).
Office Action (Restriction Requirement) issued by the U.S. Patent and Trademark Office in the U.S. Appl. No. 13/501,237 mailed Apr. 17, 2014, U.S. Patent and Trademark Office, Alexandria, VA. (8 pages).
Extended Search Report issued on Jan. 8, 2014 by the European Patent Office, in corresponding European Patent Application No. 10823214.1(6 pages).
Extended Search Report issued on Jan. 8, 2004 by the European Patent Office , in corresponding European Patent Application No. 10824676.0 (8 pages).
Extended Search Report issued on Jan. 15, 2014 by the European Patent Office, in corresponding European Patent Application No. 10823215.8 (7 pages).
Chinese Office Action (Notification of the Third Office Action) dated May 15, 2014, issued by the Chinese Patent Office in corresponding Chinese Patent Application No. 201080046442.X, and English language translation of Office Action. (15 pages).
Chinese Office Action (Decision of Rejection) dated Apr. 15, 2014, issued by the Chinese Patent Office in corresponding Chinese Patent Application No. 201110187463.X, and English language translation of Office Action. (18 pages).
Office Action issued on May 13, 2014 by the U.S. Patent and Trademark Office in U.S. Appl. No. 13/501,227. (8 pages).

(56) References Cited

OTHER PUBLICATIONS

Office Action issued on Apr. 28, 2014 by the U.S. Patent and Trademark Office in U.S. Appl. No. 13/501,200. (8 pages).
Office Action issued by the U.S. Patent and Trademark Office in U.S. Appl. No. 13/133,585, mailed Jan. 9, 2014, U.S. Patent and Trademark Office, Alexandria, VA. (8 pages).
Office Action issued on Feb. 28, 2014, by the Chinese Patent Office in corresponding Chinese Patent Application No. 201080046444.9 and an English translation of the Office Action. (16 pages).
Chinese Office Action dated Jun. 20, 2013, issued by the Chinese Patent Office in corresponding Chinese Patent Application No. 201110187463.X, and English language translation of Office Action. (15 pages).
Chinese Office Action dated Jun. 18, 2013, issued by the Chinese Patent Office in corresponding Chinese Patent Application No. 201080046442.X, and English language translation of Office Action. (13 pages).
Communication Pursuant to Article 94(3) EPC, dated Jun. 13, 2013, issued by the European Patent Office in corresponding European Patent Application No. 09 834 568.9-1751. (6 pages).
Communication Pursuant to Article 94(3) EPC, dated Jun. 13, 2013, issued by the European Patent Office in corresponding European Patent Application No. 11 004 596.0-1751. (5 pages).
Chinese Office Action (Text Portion of the Notification of the Third Office Action) dated Nov. 11, 2013, issued by the Chinese Patent Office in corresponding Chinese Patent Application No. 201110187463.X, and English language translation of Office Action. (8 pages).
Chinese Office Action (Text Portion of the Notification of the Third Office Action) dated Nov. 18, 2013, issued by the Chinese Patent Office in corresponding Chinese Patent Application No. 201080046442.X, and English language translation of Office Action. (12 pages).
Office Action issued by the U.S. Patent and Trademark Office in the U.S. Appl. No. 13/530,153, mailed Oct. 30, 2013, U.S. Patent and Trademark Office, Alexandria, VA. (11 pages).
Chinese Office Action (Decision of Rejection) dated Sep. 4, 2014, issued by the Chinese Patent Office in corresponding Chinese Patent Application No. 201080046444.9, and an English translation thereof. (14 pgs).
U.S. Office Action dated Sep. 12, 2014, issued by the U.S Patent and Trademark Office in corresponding U.S. Appl. No. 13,501,237.
Office Action issued by the U.S. Patent and Trademark Office in U.S. Appl. No. 13/501,237, mailed Jun. 10, 2014. (8 pages).
Office Action issued by the U.S. Patent and Trademark Office in U.S. Appl. No. 13/501,227, mailed Jul. 15, 2014. (6 pages).
Office Action issued by the U.S. Patent and Trademark Office in U.S. Appl. No. 13/530,153, mailed Jul. 17, 2014. (18 pages).
Office Action issued on Oct. 22, 2014 by the U.S. Patent and Trademark Office in U.S. Appl. No. 13/501,227 (8 pages).
Advisory Action issued on Dec. 16, 2014 by the U.S. Patent and Trademark Office in U.S. Appl. No. 13/501,237 (3 pages).
Office Action issued on Dec. 15, 2014 by the U.S. Patent and Trademark Office in U.S. Appl. No. 13/530,153 (19 pages).
Extended European Search Report, dated Jan. 27, 2012.
Office Action issued May 4, 2015 by the European Patent Office in corresponding European Patent Application No. 11 004 596.0 (5 pages).

\* cited by examiner

Fig. 9

| P/d | HEAT CONDUCTIVITY [W/mK] |
|---|---|
| 2 | 0.0042 |
| 3 | 0.0025 |
| 4 | 0.0019 |
| 5 | 0.0019 |
| 6 | 0.0018 |
| 7 | 0.0019 |
| 8 | 0.0026 |
| 9 | 0.004 |
| 10 | 0.0063 |
| COMPARISON EXAMPLE (COTTONLIKE CORE MATERIAL) | 0.003 |

VACUUM HEAT INSULATING MATERIAL, HEAT INSULATING BOX USING VACUUM HEAT INSULATING MATERIAL, REFRIGERATOR, REFRIGERATING/AIR-CONDITIONING APPARATUS, WATER HEATER, EQUIPMENTS, AND MANUFACTURING METHOD OF VACUUM HEAT INSULATING MATERIAL

CROSS-REFERENCE TO RELATED APPLICATIONS

This application is a divisional of U.S. application Ser. No. 13/133,585 filed on Jun. 8, 2011, which claims priority to Japanese Application No. 2008-332904 filed on Dec. 26, 2008, the entire contents of which are incorporated herein by reference.

TECHNICAL FIELD

The present invention relates to vacuum heat insulating material, a heat insulating box using this vacuum heat insulating material, in particular vacuum heat insulating material, and a heat insulating box, a refrigerator, equipments, and housing (wall surface, etc.) and so on. The equipments of the present invention include equipments in which the vacuum heat insulating material can be used such as an automatic vending machine, a cool box, a refrigerator, a calorifier, a water heating appliance (water heater) for family use or business use, a refrigerating/air-conditioning apparatus for family use or business use, a showcase, a jar pot, etc.

BACKGROUND ART

Conventionally, urethane foam has been used for heat insulating material used for the heat insulating box of the refrigerator, etc. Recently, according to requests from the market for energy-saving or space-saving and capacity-increasing, instead of the urethane foam, another structure, in which vacuum heat insulating material having heat insulating performance being better than the urethane foam is embedded in the urethane foam and used together, is used. Such vacuum heat insulating material is also used for the refrigerator, etc.

The vacuum heat insulating material is formed by inserting powder, foam, fiber body, etc. as a core material in an outer cover material made of a plastic laminated film, etc. in which aluminum foil is used for a gas barrier layer. Inside of the vacuum heat insulating material, the degree of vacuum is kept to no more than some Pa (pascal).

Further, in order to suppress degradation of the degree of vacuum which becomes a cause of decreasing the heat insulating performance of the vacuum heat insulating material, adsorption agent to sorb gas or water is provided in the outer cover material. For the core material of the vacuum heat insulating material, powder such as silica, foam such as urethane, and fiber body, etc. is used. Currently, glass fiber having excellent heat insulating performance is mainly used for the core material of the vacuum heat insulating material.

Elements of the fiber include inorganic fibers such as glass fiber, ceramic fiber, etc. (refer to Patent Document 1 and Patent Document 8, for example).

Further, there are organic fibers such as polypropylene fiber, polylactate fiber, aramid fiber, LCP (liquid crystalline polymer) fiber, polyethylene terephthalate fiber, polyester fiber, polyethylene fiber, cellulose fiber, etc. (refer to Patent Document 2 and Patent Document 7, for example).

Shapes of the fiber body include cottonlike, lamination of sheets (refer to Patent Document 3 and Patent Document 4, for example), and lamination of sheets with alternating fiber orientations of sheets (refer to Patent Document 5 and Patent Document 6, for example).

Processing of the vacuum heat insulating material includes formation of an opening portion (refer to Patent Document 9, for example) or forming an concave portion on the core material for folding processing (refer to Patent Document 10, for example).

RELATED ART DOCUMENTS

Patent Documents

Patent document 1: JP H08-028776 A
Patent document 2: JP 2002-188791 A
Patent document 3: JP 2005-344832 A
Patent document 4: JP 2006-307921 A
Patent document 5: JP 2006-017151 A
Patent document 6: JP H07-103955 B
Patent document 7: JP 2006-283817 A
Patent document 8: JP 2005-344870 A
Patent document 9: JP 2006-161939 A
Patent document 10: JP H10-253243 A

SUMMARY OF THE INVENTION

Problems to be Solved by the Invention

Like the above, for the currently used vacuum heat insulating material, the glass fibers are mainly used as the core material. However, since the glass fiber is stiff and brittle, at the time of manufacturing the vacuum heat insulating material, powder dust flows dispersedly to cause to stick to skin/mucous membrane of a worker, which may cause stimulus, and a problem exists in the usability and workability.

Further, from the viewpoint of recycling, for example, the refrigerator is demolished for each product in a recycle factory. At this time, the glass fiber is mixed with urethane waste, etc. and supplied to thermal recycle. There is a problem that the recyclability of the glass fiber is not good such that it causes to degrade the combustion efficiency, to remain as residue, etc.

On the other hand, in case of using polyester fiber for the core material, the usability and the recyclability are excellent. However, the vacuum heat insulating material using polyester fiber shows the heat conductivity which is an index representing the heat insulating performance is around 0.0030 [W/mK] (refer to Patent Document 7, for example). There is a problem that the vacuum heat insulating material using polyester fiber for the core material, compared with the general vacuum heat insulating material using the glass fiber for the core material (the heat conductivity: around 0.0020 [W/mK]), shows worse heat insulating performance.

Because of this, it is possible to improve the heat insulating performance by making the organic fiber layer thin and directing the orientation of the fibers in the direction being orthogonal to the heat transfer direction. However, in such a case, the number of laminated sheets exceeds some hundreds, so that the productivity is bad. Further, when the hole formation or the notch formation are conducted, since the number of laminated sheets is large, it is not easy to carry out the hole formation or the notch formation of the laminated sheet-shaped body of the organic fiber assembly. Further, for the bending process, since the number of laminated sheets is large, the usability and the productivity are bad.

Further, when the organic fiber assembly is used for the core material, if the thickness of one sheet (represented by the fabric weight) is thin, the fiber may be deformed by the pressure force due to the vacuuming pressure at the time of vacuum forming and the temperature. When the fibers are deformed, the thickness is largely decreased, and the number of laminated sheets may increase drastically.

Further, the vacuum heat insulating material in which the glass fibers are used for the core material is excellent in the heat insulating performance. However, if the hole formation or the notch formation is done, processed powder of the glass fiber flows dispersedly around the processed portion of the hole formation or the notch formation. Accordingly, even if the outer cover material around the hole formation is sealed/adhesion sealed, the processed powder of the glass fiber may intrude into the sealing portion, which causes incomplete sealing and degrades the degree of vacuum.

Further, even when the organic fiber is used for the core material, if short fibers of which the fiber length is short are used, in case of doing the hole formation or the notch formation, processed powder of the fiber may protrude or flow dispersedly around the processed portion of the hole formation or the notch formation. The protruding fiber powder may intrude into the sealing portion for sealing/deposition sealing of the outer cover material inside of the processed portion of the hole or the notch formation, which causes incomplete sealing and degrades the degree of vacuum, and further degrades the heat insulating performance. Further, similarly to the above, from the processed portion of the end face (cutoff portion) of the core material, the processed powder may protrude or flow dispersedly to the neighborhood and intrude to the sealing portion of the outer cover material for sealing/deposition sealing, which may cause incomplete sealing, degrades the degree of vacuum, and decreases the heat insulating performance.

Here, the vacuum heat insulating material described in Patent Document 9 uses sheet-shaped fiber assembly formed by short-fibered organic fiber having the size of 200 mm 200 mm, and the fiber length of 10 to 150 mm, preferably 20 to 80 mm for the core material. Then from the center portion of the sheet, the size of 100 mm 100 mm is cut and removed to form a through hole. However, since the short fibers having short fiber length are used, the fibers are cutoff by cutting to form the through hole. At this time, the fiber length of the remaining fiber possibly be extremely short. If the fiber length of the remaining fiber is short, the remaining fiber cannot be tangled with the existing fiber which exists in the sheet, the remaining fiber may protrude from around the through hole, flow dispersedly to intrude into the sealed portion of the outer cover material around the through hole, which may cause the sealing failure.

For example, it is assumed that the initial fiber length is 80 mm. When the through hole having the size of 100 mm 100 mm is made by cutting, if 75 mm out of the initial fiber length 80 mm is cut by the through hole formation, the remaining fiber on the sheet is 5 mm. When the remaining fiber is short such as 5 mm, the remaining fiber cannot be tangled with the existing fiber on the sheet and maintained on the sheet, but may protrude from around the through hole to the outside of the sheet, and further may come out of the sheet. Similarly, in case of using the short fiber for the core material, when the end face of the core material or the fiber assembly is cut in order to form the sheet of a predetermined size, the remaining fiber on the sheet may protrude from the end face of the core material, or may come out of the sheet. When the core material is inserted into the outer cover material and sealed, the remaining fiber intrudes to the sealing portion, which may cause the sealing failure. Accordingly, it is necessary to make the length of sealing long, which increases the manufacturing cost.

Further, when the glass fiber is used for the core material of the vacuum heat insulating material, the glass fiber is excellent in heat insulating performance. However, since the glass fiber is hard and brittle, it is difficult to do folding processing after vacuuming.

Further, when the glass fiber is used for the core material of the vacuum heat insulating material, the glass fiber is excellent in heat insulating performance. However, since the glass fiber is hard and brittle, if the piping such as a cooler piping, etc. is inserted between the vacuum heat insulating material and the vacuum heat insulating material for insulating heat, the vacuum heat insulating material cannot be deformed to be a tubular shape, and thus there exists a gap corresponding to the diameter of the piping between the vacuum heat insulating materials. Accordingly, heat leakage occurs from the gap between the vacuum heat insulating materials, which degrades the heat insulating performance drastically.

Further, in case of using the organic fiber for the core material, when plural sheets are laminated to form the core material, the vacuum heat insulating material becomes harder as the number of laminated layers increases. Accordingly, when it is necessary to do folding process after vacuuming, there is a problem that it is difficult to fold a portion which needs to be folded, and the portion which is not desired to be folded may be deformed.

Here, in the vacuum heat insulating material described in Patent Document 10, the micro-powder of silica, parlight, etc. and fiberglass (the glass fiber), or foam urethane heat insulating material of continuous foaming is used. It is described then, the concave groove is formed on the core material of the vacuum heat insulating material, and from this concave groove, the folding is done. However, in this case, since the micro-powder such as silica, parlight, etc. and fiberglass (the glass fiber), etc. are used, as discussed above, usability is not good. Further, in this case, since the micro-powder such as silica, parlight, etc. and fiberglass (the glass fiber), etc. are used, as discussed above, the usability is bad, and there is a problem at the time of the recycling.

Further, since the manufacturing method for the concave groove is not described, when micro-powder such as silica, parlight, etc., and glass fiber are used for the core material, it is unclear how to provide the core material with a desired concave groove. In particular, in case of using the glass fiber, the formation of the concave groove itself is difficult.

Further, in case of foam urethane, there is some problems: manufacturing is difficult, the manufacturing cost is high, and further the heat insulating performance is worse. Further, it is necessary to change the size of the concave portion according to the size of the curve, in case of foam urethane, to change the size requires to change a forming die, etc. which largely increases manufacturing time and manufacturing cost.

The present invention is provided to solve the above problems and aims to provide the vacuum heat insulating material including at least features which will be shown below, the heat insulating box using the vacuum heat insulating material, and the equipments using the heat insulating box such as an automatic vending machine, a cool box, a refrigerator, a water heater, a refrigerating/air-conditioning apparatus, etc.
(1) having high heat insulating performance, and excellent usability and recyclability;
(2) having high heat insulating performance and excellent productivity;

(3) in case of using the organic fiber assembly for the core material, having excellent productivity and less deformation caused by compression force at the time of vacuum forming or temperature;

(4) being easy to carry out a hole formation, a notch formation, folding processing, having good sealing property, with a low cost, having high heat insulating performance, and easy usability;

(5) being changeable in a shape of a concave groove according to the size of the curve of folding process, and having easy manufacturability; and (6) having a concave groove along a shape of piping.

Means to Solve the Problems

According to the present invention, a vacuum heat insulating material includes:

a core material structured by a laminated structure of an organic fiber assembly made by forming an organic fiber into a sheet shape and cutting an end face with a predetermined length, or structured by after laminating the organic fiber assembly made by the organic fiber formed into the sheet shape, cutting the end face with the predetermined length, and having a core material opening portion formed by a through hole or a notch provided by cutting;

a gas-barrier outer cover material containing the core material inside, having a sealing portion for sealing surrounding of the core material structured by the laminated structure of the sheet-shaped organic fiber assembly and surrounding of the core material opening portion, and hermetically sealing an inside with almost vacuum status by sealing the sealing portion; and an outer cover material opening portion provided at the outer cover material under a status in which the sealing portion provided at the surrounding of the sheet-shaped core material and the surrounding of the core material opening portion is sealed, being a through hole or a notch which is smaller than the core material opening portion with a sealed amount, and a long fiber being equal to or longer than a length of the core material is used for the organic fiber.

According to the present invention, a vacuum heat insulating material includes:

a core material structured by a laminated structure of an organic fiber assembly made by forming an organic fiber into a sheet shape, having a cutting portion where an end face is cut so as to be a predetermined length;

a gas-barrier outer cover material containing the core material inside, and having a sealing portion for sealing surrounding the cutting portion in a range being larger than the cutting portion of the core material with an amount of sealing length, and hermetically sealing an inside with almost vacuum status by sealing the sealing portion, and a long fiber being equal to or longer than a length of the core material is used for the organic fiber.

In the vacuum heat insulating material of the present invention, a thickness of the organic fiber assembly is, when the organic fiber assembly is contained inside of the gas-barrier outer cover material with an almost vacuum state, at least 3 times and no more than 18 times of a diameter of the organic fiber.

In the vacuum heat insulating material of the present invention, the organic fiber assembly is formed in a sheet-shape by applying heat deposition on continuous organic fiber, and an area of the heat deposited portion is made no more than 20% of an area of the sheet.

In the vacuum heat insulating material of the present invention, the organic fiber assembly is formed in a sheet-shape by applying heat deposition on continuous organic fiber, a fabric weight of a non-woven cloth which is the organic fiber assembly is at least 4.7 $g/m^2$ and no more than 70 $g/m^2$, or at least 140 $g/m^2$ and no more than 198 $g/m^2$, and the heat deposited portion is made to penetrate from a front surface to a rear surface of the organic fiber assembly.

In the vacuum heat insulating material of the present invention, the organic fiber assembly is formed in a sheet-shape by applying heat deposition on continuous organic fiber, a fabric weight of a non-woven cloth which is the organic fiber assembly is at least 4.7 $g/m^2$ and no more than 100 $g/m^2$, and the heat deposited portion is made not to penetrate from a front surface to a rear surface of the organic fiber assembly.

In the vacuum heat insulating material of the present invention, a fabric weight of a non-woven cloth which is the organic fiber assembly is at least 85 $g/m^2$ and no more than 198 $g/m^2$, so that deformation of the organic fiber assembly caused by compression force is made small at the time of vacuum forming.

In the vacuum heat insulating material of the present invention, the heat deposited portion is provided with a through hole or a concave portion which is smaller than a size of the heat deposited portion and within a range heat deposition of the organic fiber assembly can be maintained in a thickness direction of the organic fiber assembly.

According to the present invention, a vacuum heat insulating material includes:

a core material structured by a laminated structure of an organic fiber assembly formed by forming an organic fiber into a sheet-shape and heat deposition applied, and having a cutting portion where an end face is cut so as to be a predetermined length;

a gas-barrier outer cover material containing the core material inside, and having a sealing portion for sealing surrounding of the cutting portion in a range being larger than the cutting portion of the core material with an amount of sealing length, and hermetically sealing an inside with almost vacuum status by sealing the sealing portion, and a thickness of the organic fiber assembly is made at least 3 times and no more than 18 times of an average fiber diameter of the organic fiber, a fabric weight of the organic fiber assembly is made at least 4.7 $g/m^2$ and no more than 70 $g/m^2$, and a range in which the organic fiber assembly is provided with a heat deposited portion is made no more than 20% of an area of the organic fiber assembly body of the sheet-shape.

In the vacuum heat insulating material of the present invention, a cross sectional shape of a fiber forming the organic fiber assembly is made a modified cross sectional shape such as almost triangular, C-shaped, etc.

In the vacuum heat insulating material of the present invention, a plurality of types of core material having different fabric weights are mixed and laminated.

In the vacuum heat insulating material of the present invention, the core material is formed by a first organic fiber assembly folded and laminated and a second organic fiber assembly folded and laminated, and the first organic fiber assembly and the second organic fiber assembly are folded so as to intersect each other.

In the vacuum heat insulating material of the present invention, the organic fiber is continuous in a length direction or a width direction of the organic fiber assembly.

In the vacuum heat insulating material of the present invention, an organic fiber of the organic fiber assembly is one of polyester, polystyrene, polypropylene, polylactate, aramid, and liquid crystalline polymer.

According to the present invention, a heat insulating box includes: an external box; and an internal box arranged inside of the external box, and the above vacuum heat insulating material of one of claims 1 through 14 is provided at either of a gap on a surface of the external box between the external box and the internal box, a gap on a surface of the external box between the external box and the internal box, and a gap on a surface of the internal box between the external box and the internal box.

In the heat insulating box of the present invention, a spacer is provided between the external box and the vacuum heat insulating material.

According to the present invention, a refrigerator provided with the above vacuum heat insulating material on a storage room door or a heat insulating wall between a machine room containing a compressor and a cooler room containing a cooler generating cold air.

In the refrigerator of the present invention, the vacuum heat insulating material is provided with an opening portion such as a through hole or a notch, and the opening portion is arranged at a position of a piping connecting the compressor and the cooler so that the piping penetrates the vacuum heat insulating material.

According to the present invention, a refrigerating/air-conditioning apparatus includes: an outdoor unit having a cabinet having an almost rectangular cubic shape, a partition wall for partitioning inside of the cabinet into a fan room containing a fan and a machine room containing a compressor, and the vacuum heat insulating material provided at at least a part of an inside or an outside of the machine room.

According to the present invention, a water heater includes: a cabinet having an almost rectangular cubic shape or an almost cylindrical shape; and a hot water tank having an almost cylindrical shape, for reserving water or hot water, and contained in the cabinet, and all or at least a part of inside wall of the cabinet is provided with the above vacuum heat insulating material.

According to the present invention, an equipment includes: an almost cylindrical container such as a compressor or a tank, surrounding of the container is provided with the above vacuum heat insulating material in which a long fibered organic fiber having a length being equal to or longer than a length of the core material is used.

According to the present invention, an equipment such as a refrigerator or a refrigerating/air-conditioning apparatus, etc., displays an overall view or a partial view such as a cross section, a development view, a cubic diagram, a perspective view, etc. of the equipment on a rear surface or a side surface of a body of the equipment, and further displays a provided position of the above vacuum heat insulating material of one in either of the overall view or the partial view.

According to the present invention, a method for manufacturing a vacuum heat insulating material includes: a collecting step for extruding heat-deposited resin in a continuous state from a plurality of aligned nozzles and collecting on a conveyer as a plurality of organic fibers; a reeling step for feeding the conveyer at a predetermined speed, and producing an organic fiber assembly in a reeled sheet state by applying pressure with a roller and applying heat-deposition; a core material processing step for making a core material having a predetermined size by cutting an end face of the organic fiber assembly produced by the reeling step; a decompressing step for inserting the core material into an outer cover material from an insertion opening and decompressing an inside to an almost vacuum state; and an outer cover material sealing step for sealing the insertion opening of the outer cover material the inside of which is decompressed to the almost vacuum state at the decompressing step.

In the method for manufacturing the vacuum heat insulating material of the present invention, the collecting step includes: an extruding step for continuously extruding heated and melted resin in a predetermined width from a plurality of aligned nozzles; a fiberizing step for cooling the resin continuously extruded from the nozzles at the extruding step and then stretching by compressed air to fiberize, or a fiberizing step for blowing high-temperature air with a temperature being almost equal to a melting temperature of the resin from neighborhood of an extruding hole of the nozzles to the resin extruded from the nozzles; and a fiber collecting step for collecting a plurality of organic fibers fiberized at the fiberizing step on the conveyer.

In the method for manufacturing the vacuum heat insulating material of the present invention, the core material processing step makes the core material having a predetermined size by cutting an end face after laminating a plurality of layers of organic fiber assembly.

The method for manufacturing the vacuum heat insulating material of the present invention, a range to which the heat deposition is applied is no more than 20% of a total of the organic fiber assembly formed in a sheet-shape.

In the method for manufacturing the vacuum heat insulating material of the present invention, a fabric weight of the organic fiber assembly is at least 4.7 $g/m^2$ and no more than 26 $g/m^2$.

Effect of the invention

According to the vacuum heat insulating material of the present invention, since the long-fibered organic fiber assembly is used for the core material, it is possible to suppress protrusion to the cutting portion of the non-woven cloth sheet of a remaining fiber generated by cutting; that is, the protrusion, etc. of the remaining fiber, generated by cutting from the cutting portion when the short fibers are used for the core material, would never occur.

Further, since the organic fiber non-woven cloth sheet is used for the core material, it is possible to provide the vacuum heat insulating material having excellent processability, usability, heat insulating performance, or productivity, and equipments having this vacuum heat insulating material such as the heat insulating box, the automatic vending machine, the cool box, the refrigerator, the water heater, the refrigerating/air-conditioning apparatus, showcase, etc.

BRIEF EXPLANATION OF THE DRAWINGS

FIG. 9 shows the first embodiment and shows measured result of heat conductivity of the vacuum heat insulating material 7.

PREFERRED EMBODIMENTS FOR CARRYING OUT THE INVENTION

Embodiment 1

Figure 1:
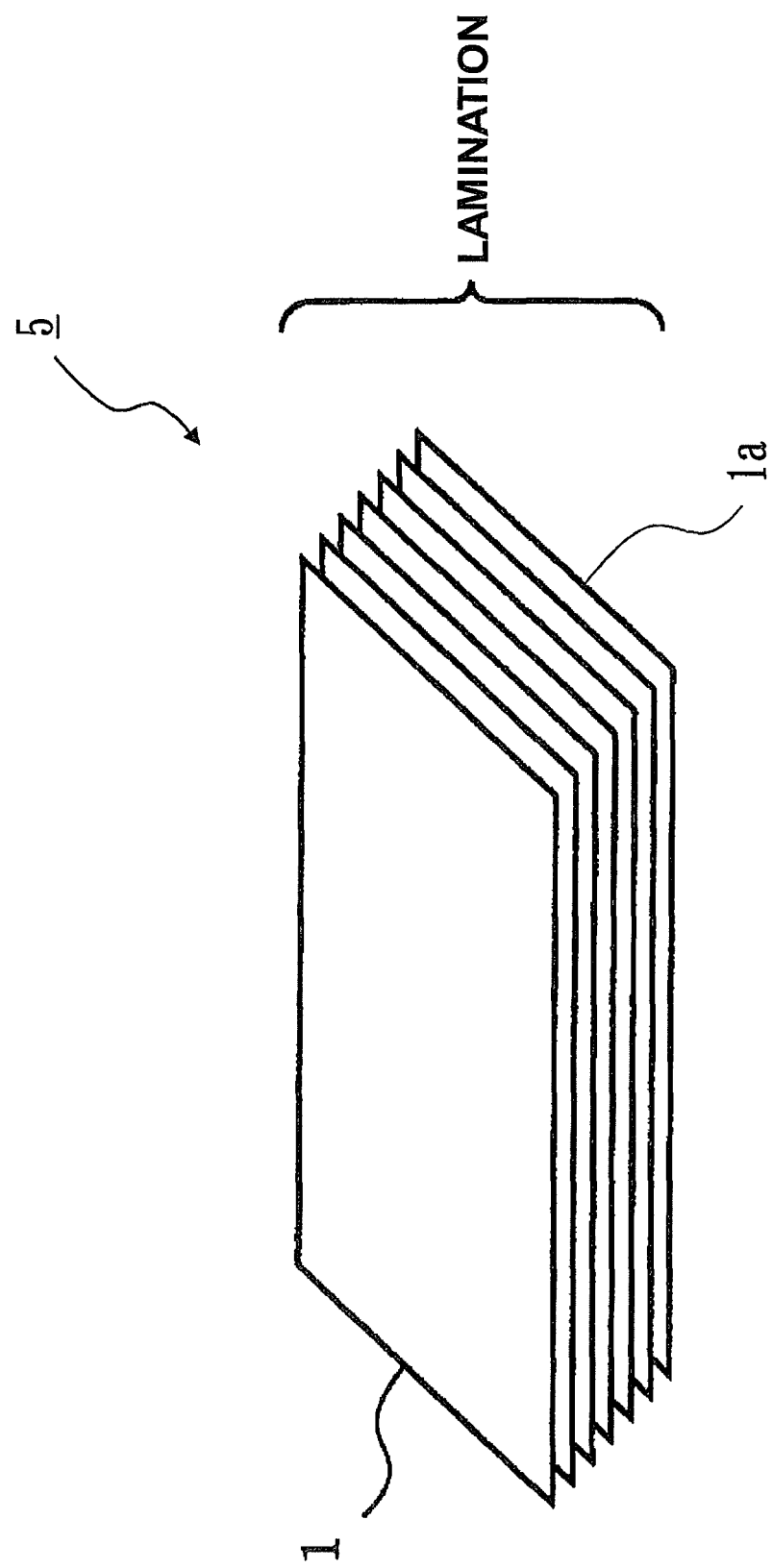
FIG. 1 shows the first embodiment and is a pattern diagram of a vacuum heat insulating material 7, and is a perspective view of a core material 5 of the vacuum heat insulating material 7 made by laminating a plurality of non-woven cloth sheets.
Figure 2:
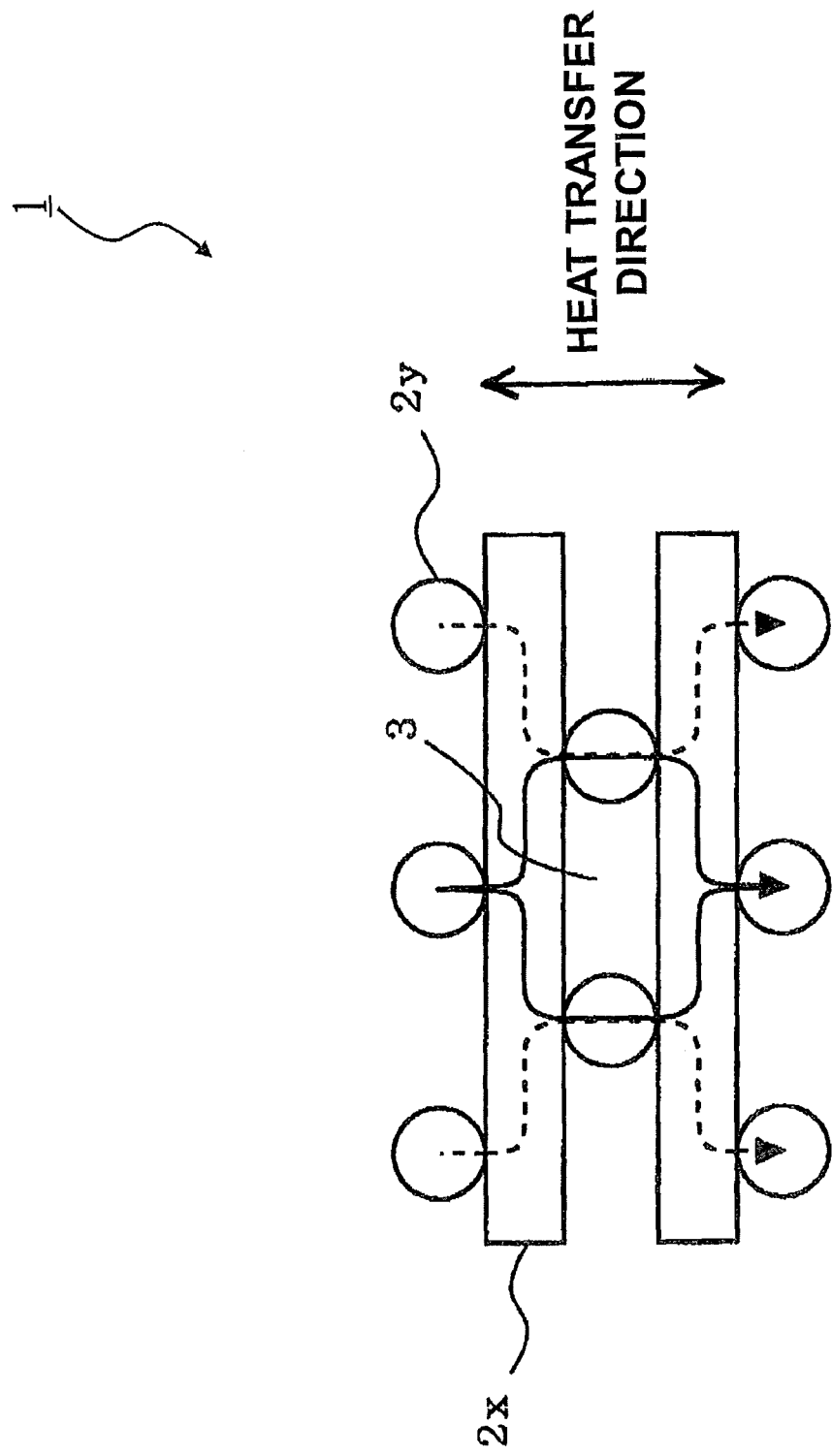
FIG. 2 shows the first embodiment and is a pattern diagram of the vacuum heat insulating material 7, and is a side view showing orientation of fiber in one non-woven cloth sheet.
Figure 3:
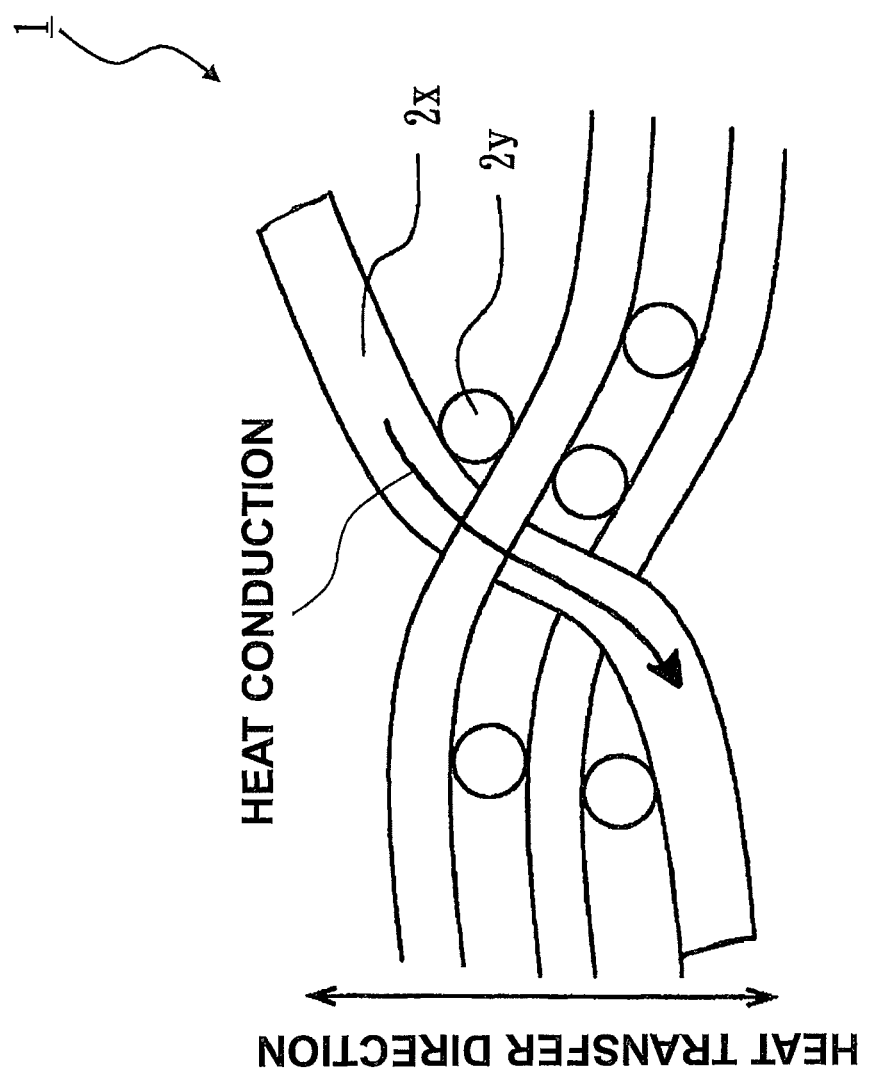
FIG. 3 shows the first embodiment and is a pattern diagram of the vacuum heat insulating material 7, and is a side view showing orientation situation of fiber when the core material 5 is thick.
Figure 4:
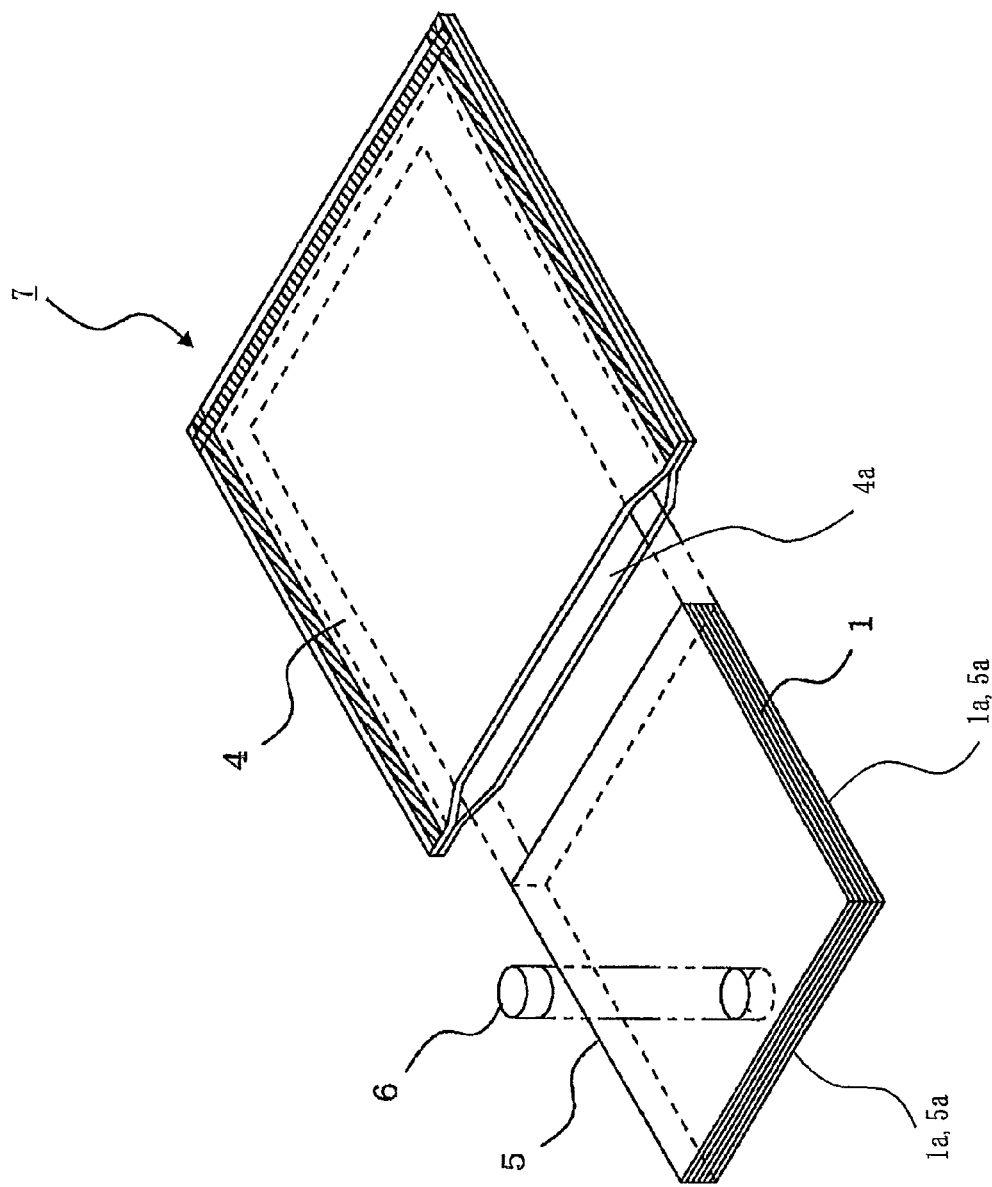
FIG. 4 shows the first embodiment and is an exploded perspective view showing a structure of the vacuum heat insulating material 7.

FIGS. 1 through 4 show the first embodiment; FIG. 1 is a pattern diagram of a vacuum heat insulating material 7 and is a perspective view of a core material 5 of the vacuum heat insulating material 7 made by laminating a plurality of non-woven cloth sheets; FIG. 2 is a pattern diagram of the vacuum heat insulating material 7, and is a side view showing an orientation of fabric in one sheet of non-woven cloth; FIG. 3 is a pattern diagram of the vacuum heat insulating material 7, and is a side view showing an orientation situation of fabric when the core material 5 is thick; and FIG. 4 is an exploded perspective view showing a structure of the vacuum heat insulating material 7.

(Laminated Structure)

In FIG. 1, the core material 5 has a laminated structure in which sheet-shaped organic fiber assembly (hereinafter, "organic fiber assembly 1") is laminated.

In FIG. 2, the organic fiber assembly 1 is formed by a plurality of organic fibers $2x$ and a plurality of organic fibers $2y$ which are arranged with a predetermined interval in a direction being approximately orthogonal to the organic fibers $2x$.

At this time, the organic fibers $2x$ and the organic fibers $2y$ make approximate point contact. Among the organic fibers $2y$, an air room 3 being a heat insulated room is formed.

As a collective term of the organic fibers $2x$ and the organic fibers $2y$, the organic fibers 2 are used.

Here, as shown in FIG. 3, if the thickness of one sheet (the organic fiber assembly 1) is increased, the fiber tends to be orientated to a thickness direction which is a heat transfer direction. In particular, when the organic fibers 2 (sometimes called simply as a fiber) is a short fiber having a short fiber length (for example, the fiber length is around 5 to 150 mm), the short fiber tends to be orientated to the thickness direction which is the heat transfer direction. Through this short fiber, heat is transferred from a front surface of the sheet to a rear surface, and heat insulating performance is degraded.

Accordingly, by thinly laminating the organic fiber assembly 1 to make thin-sheet-shaped, it is possible to prevent the fiber from being made orientated to the heat transfer direction (the laminating direction of fibers of the organic fiber assembly 1; the thickness direction of the sheet-shaped organic fiber assembly 1). Thereby, degradation of heat insulating performance caused by heat transfer through the fiber orientated to the heat transfer direction can be suppressed. Therefore, a heat conductivity of the core material 5 can be made small, which enables to increase the heat insulating performance.

In FIG. 2, an arrow in a solid line and an arrow in a broken line show the heat transfer direction. Since the organic fibers 2x and the organic fibers 2y are almost orthogonal, a contacting part of the organic fibers 2x and the organic fibers 2y become point contact, and thus heat resistance is increased and the heat insulating performance is improved.

Here, the above shows a case when the organic fibers 2x and the organic fibers 2y intersect almost orthogonal, however, the present embodiment is not limited to this case. The organic fibers 2x and the organic fibers 2y can intersect with an angle other than a right angle. It is sufficient that the organic fibers 2x and the organic fibers 2y are not placed in parallel. Only if the degradation of heat insulating performance caused by the heat transfer through the fiber orientated to the heat transfer direction can be suppressed a little bit, it is possible to improve the heat insulating performance.

In FIG. 4, the vacuum heat insulating material 7 has a gas barrier container ("an outer cover material 4", hereinafter) having air barrier properties, a core material 5 and an adsorption agent 6 (gas absorbent or water absorbent (CaO), for example) sealed inside of the outer cover material 4. The inside of the outer cover material 4 is decompressed to a predetermined degree of vacuum (some Pa (pascal) to some hundreds Pa).

(Organic Fiber)

As for material used for the organic fibers 2 which forms the core material 5 of the vacuum heat insulating material 7, polyester, and others such as polypropylene, polylactate, aramid, LCP (liquid crystalline polymer), PPS, polystyrene, etc. can be used. Further, if the heat-resistant properties of the core material 5 is desired to be increased, heat-resistant resin such as LCP (liquid crystalline polymer), PPS, etc. should be used. Further, if the compressive creep properties desired to be increased, fibers having a large fiber diameter should be used. Further, if the above resins are mixed and used, the vacuum heat insulating material 7 having an excellent compressive creep properties, high heat-resistance, and high heat insulating properties can be obtained. Polystyrene has small solid heat conductivity, and it is expected that the heat insulating performance can be improved, and manufacture can be done with a low cost.

Since polypropylene has low hygroscopic property, it is possible to reduce time for drying or vacuuming by using polypropylene and the productivity can be improved. Further, polypropylene has small solid heat conductivity, it is possible to expect the improvement of heat insulating performance of the vacuum heat insulating material 7.

Further, since polylactate has biodegradability, after use of the product, the disorganized and sorted core material can be processed by disposal by landfill.

Further, since aramid or LCP has high stiffness, shape retention capacity is good when is vacuum-packed and is applied with air pressure, and the porosity can be increased, and there is a merit that it is possible to expect the improvement of the heat insulating performance.

The core material 5 serves, for example, in the vacuum heat insulating material 7 which uses a plastic laminating film for the outer cover material 4, a role to secure a space within the vacuum heat insulating material 7 for supporting air pressure, and another role to reduce the heat conduction of gas by precisely dividing the space. Here, from a view point of heat conduction control of gas, it is desirable that the distance within this room should be made smaller than free travel distance of air molecule at the degree of vacuum.

In this embodiment, the organic fibers 2 are used for the core material 5 of the vacuum heat insulating material 7, when compared with a case in which hard and brittle glass fiber is used as the core material, at the time of manufacturing the vacuum heat insulating material 7, powder dust does not flow dispersedly and does not stick to the skin/mucosal membrane of a worker to cause irritation, and thus usability and workability can be improved.

(Fiber Assembly)

The organic fiber assembly 1 (organic fiber assembly, the same as the sheet-shaped assembly) which forms the core material 5 is manufactured by making heated and melted polyester resin or polystyrene resin fall freely on a conveyer from a number of nozzles aligned in a width which is desired to produce and reeling with pressure by a roller with feeding the conveyer at an arbitrary speed. The bulk density of the organic fiber assembly 1 is adjusted by discharge amount of the melted resin and the speed of the conveyer, and it is possible to obtain fiber assemblies having different thickness.

Further, as for long fiber non-woven cloth which is the organic fiber assembly 1, continuous fiber melted by an extruder and extruded from a spinning nozzle is collected on the conveyer, the conveyer is fed at an arbitrary speed, and long fibered non-woven cloth being able to be reeled is obtained.

Further, for fiber spinning, a method can be used, in which after cooling the resin by cold air, etc. directly under the nozzle, by stretching the resin with compressed air, etc. to fiberize; and another method by blowing, from the side of a nozzle hole, the resin with high-temperature air which is as high as the melting temperature of the resin.

Here, the organic fiber assembly 1 obtained by the above methods may be difficult to handle at the time of manufacturing the vacuum heat insulating material 7, since organic fibers 2 are disjointed with each other. Then, at the time of applying pressure, the organic fibers 2 can be heat-deposited. At this time, applying excessive pressure, or excessive heat-deposition may increase a contacting area between the organic fibers 2, increase heat transfer, and heat conduction from the welding unit, which degrades the heat insulating performance. Therefore, the contacting area between the organic fibers 2 should be made small as much as possible. The contacting area between the organic fibers 2 is desired to be no more than 20% of the total area (the sheet area), preferably no more than 15%, more preferably no more than 8%.

Since it is confirmed that a rate occupied by the heat deposition exceeds 20% of the total area (the sheet area), the heat conductivity becomes large, and the heat insulating performance is degraded, the rate occupied by the heat deposition is preferably no more than 20% of the total area (the sheet area). Here, if the rate of the occupied by the heat deposition to the total area (the sheet area) is made small, the heat insulating performance is extremely improved, so that it is desired that the rate occupied by the heat deposition is suppressed to be no more than 15% of the total area (the sheet area), and further, no more than 8% of the total area (the sheet area).

As for the heat deposition, an embossing 110 is done by, for example, adding dotted welded spots by a heat roller, long-fibered non-woven cloth (the organic fiber assembly 1) which is reelable and has a good heat insulating performance can be obtained, while securing handling strength. Here, in the present embodiment, the temperature of the heat roller is made about 195 degrees Celsius.

Next, the obtained sheet-shaped organic fiber assembly 1 is cut (cut out) with an end face 1a so as to be, for example, a size of A4 (width 210 mm length 297 mm) which is a predetermined size. By laminating these into a plurality of layers (twenty-five layers, for example), the core material 5 is formed, which has a predetermined size and a predetermined thickness, and of which an end surface 5a is cut (the core material 5 can be formed by cutting the end face 5a to become a predetermined size after laminating the sheet-shaped organic fiber assembly 1). Here, the number of sheets to be laminated can be set arbitrarily based on the thickness of the organic fiber assembly 1 obtained and the thickness of the vacuum heat insulating material 7 which is desired to manufacture.

(Fiber Diameter)

In this first embodiment, the fiber diameter of the organic fiber assembly 1 is adjusted by the nozzle diameter so as to be about 15 μm. As for the heat insulating performance, the smaller the fiber diameter is, the better the heat insulating performance is. Theoretically, the fiber diameter is desired to be small due to the relation between degree of internal vacuum of the vacuum heat insulating material 7 with the special distance segmented by fibers, and with a free travel distance of gas molecule. The fiber diameter is desired to be no more than 15 μm, preferably no more than 10 μm; the average fiber diameter of around 9 μm can be used.

The measurement of the average fiber diameter can be done by measuring diameters of some to some tens of parts (ten parts, for example) using a microscope and using an average value. Further, fabric weight (weight (g) of fiber per 1 $m^2$) can be obtained by measuring an area and a weight of one sheet and obtaining a weight per unit area of one sheet.

In the present embodiment, by regulating an orientation direction of fiber to almost orthogonal to the thickness direction which is heat insulating direction, a plurality of the organic fiber assemblies 1 are laminated to form a multi-layered structure.

Further, when short fibered non-woven cloth is used for the organic fiber assembly 1, since the fiber length is short, the organic fibers 2x and the organic fibers 2y tend to be orientated in the heat insulating direction (the thickness direction of sheet). In order to suppress degradation of the heat insulating performance due to the heat transfer through the fibers orientated in the heat insulating direction, long-fibered non-woven cloth, which uses long fiber, is used for the organic fiber assembly 1.

In the present embodiment, as for the fiber length, at least almost the same length as the length of the sheet is used, so that it is prevented that fiber may be torn halfway in the sheet and a part (a mid) or an end of the fiber may be orientated in the heat insulating direction so as to degrade the heat insulating performance.

(Lamination of Fiber Assembly)

Figure 5:
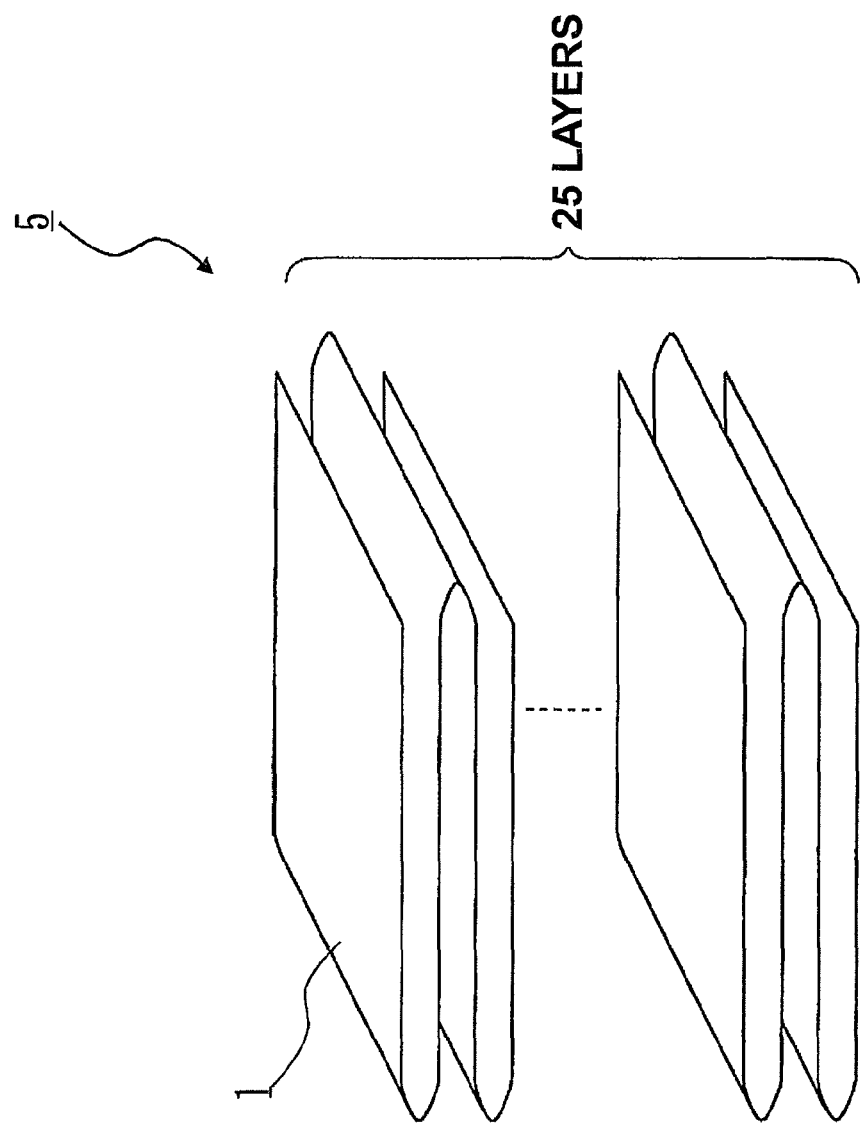
FIG. 5 shows the first embodiment and is a perspective view showing by pattern a lamination procedure of the core material 5 that forms the vacuum heat insulating material 7.
Figure 6:
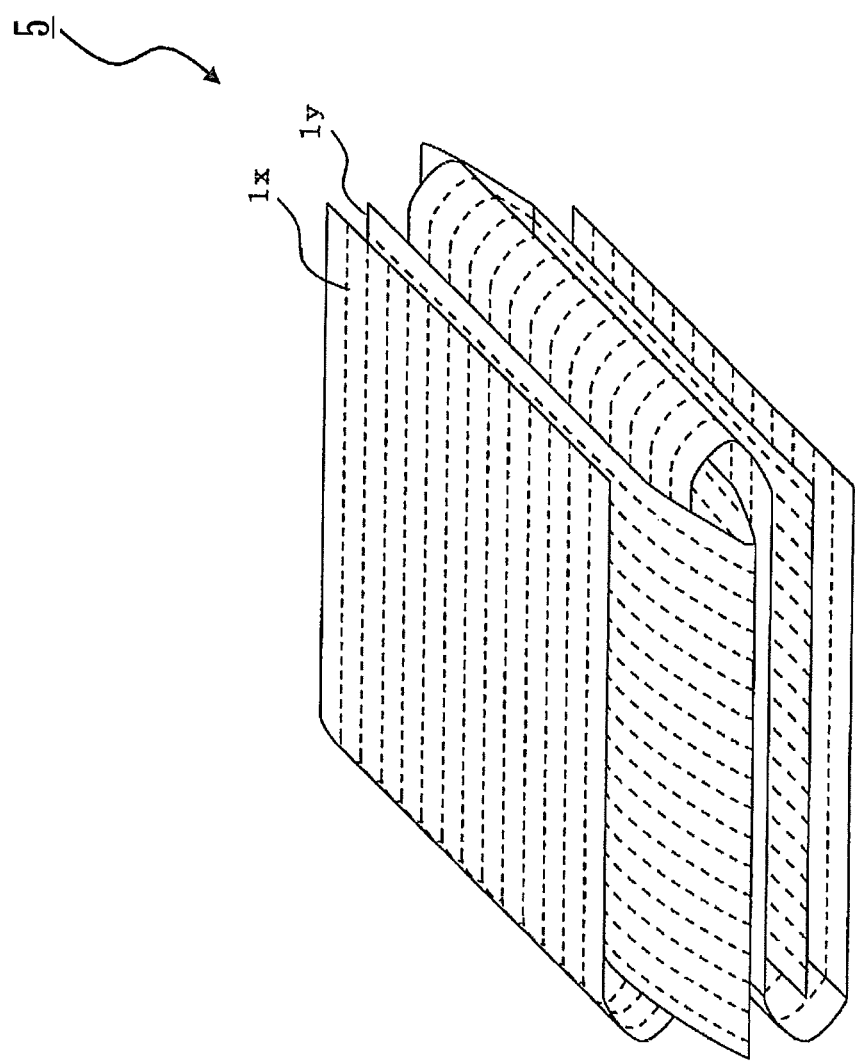
FIG. 6 shows the first embodiment and is a perspective view showing by pattern a lamination procedure of the core material 5 that forms the vacuum heat insulating material 7.

FIGS. 5 and 6 show the first embodiment; FIG. 5 is a perspective view showing by pattern a lamination procedure of the core material 5 that forms the vacuum heat insulating material 7, and FIG. 6 is a perspective view showing by pattern a lamination procedure of the core material 5 that forms the vacuum heat insulating material 7.

FIG. 5 shows that the core material 5 is formed by folding and laminating the organic fiber assembly 1 in a continuous sheet shape without cutting.

In FIG. 6, using continuous sheet-shaped first organic fiber assembly 1x without cutting and continuous sheet-shaped second organic fiber assembly 1y without cutting (the both are sometimes called as "organic fiber assembly 1" as a whole), the both are alternatively arranged so as to mutually intersect (so that the folding direction of the first organic fiber assembly 1x is almost orthogonal to the folding direction of the second organic fiber assembly 1y). Within a range overlapped by respective folded portions the first organic fiber assembly 1x and the second organic fiber assembly 1y are continuously laminated so that they are alternatively folded.

Namely, by continuously laminating the organic fiber assembly 1 with folding, a time for cutting can be saved, it is possible to manufacture the core material 5 efficiently in a short time with a low cost, and thus the low-cost vacuum heat insulating material 7 can be manufactured.

The organic fiber assembly 1 used here is manufactured by the above manufacturing method, so that the organic fibers 2 are orientated in the long side direction (the length direction or the width direction), and thus the heat insulating performance is good. Further, as discussed above, if the lamination is performed so that the sheet-shaped organic fiber assemblies 1 themselves (the first organic fiber assembly 1x and the second organic fiber assembly 1y) intersect with each other, it is possible to further improve the heat insulating performance since the contact between the sheets becomes a point contact, which further improves the heat insulating performance.

(Outer Cover Material)

For the outer cover material 4 (FIG. 4) of the vacuum heat insulating material 7, a laminated film having the thickness of at least 5 μm and no more than 100 μm. In the present embodiment, for example, a gas-barrier plastic laminated film structured by nylon (6 μm), aluminum evaporated PET (polyethylene telephthalate) (10 μm), aluminum foil (6 μm), high-density polyethylene (50 μm) is used.

Other than the above, if the laminated file without including a aluminum foil such as a structure of polypropylene, polyvinyl alcohol, and polypropylene is used, it is possible to suppress the degradation of the heat insulating performance caused by heat bridge. Here, three sides out of four sides of the outer cover material 4 are heat-sealed by a seal packaging machine. The remaining one side is heat-sealed after the core material 5 is inserted.

(Manufacturing Method of a Vacuum Heat Insulating Material 7)

As for manufacturing the vacuum heat insulating material 7, first, the core material 5 having a predetermined size and thickness is inserted into the outer cover material 4 which is a bag. The outer cover material is fixed so as not to close an opening of the remaining one side (opening portion) 4a, and dried in a constant temperature reservoir at the temperature of about 105 degrees Celsius for a half day (about 12 hours). Then, in order to sorb remaining gas after vacuum packaging, out gas discharged over time from the core material 5, and permeated gas entering through a seal layer of the outer cover material 4, adsorption agent 6 (gas adsorption agent or water adsorption agent, etc.) is inserted in a filmed bag (the outer cover material 4), and vacuuming is done using Kashiwagi-type vacuum packaging machine (a product of Nucleopore Corporation; KT-650). The vacuuming is done until the degree of vacuum in the chamber becomes about 1 to 10 Pa, the opening portion 4a of the filed bag is heat-sealed in the chamber, and a plate-shaped vacuum heat insulating material 7 is obtained.

(Heat Insulating Performance 1)

(Thickness of Fiber Assembly)

Here, as for effect of the thickness of the organic fiber assembly 1 to the heat insulating performance, assuming that the vacuum heat insulating material 7 in which the core material 5 formed by laminating the organic fiber assembly 1 is used is prepared as Embodiment examples 1 to 4, comparison with Comparison example 1 (cottonlike core material) is done. The comparison result will be explained.

For Comparison example 1, using for the core material cottonlike polyester having almost the same diameter as the fiber diameter (about 15 μm) of Embodiment examples 1 to 4 using the organic fiber assembly 1 of the present embodiment, the vacuum heat insulating material 7 is manufactured in the above manufacturing method, that is, in the same method as Embodiment examples 1 to 4.

For the manufactured Embodiment examples 1 to 4 and Comparison example 1 (all are the vacuum heat insulating materials 7), heat conductivities are measured using "Auto A HC-073 (EKO Instruments Co., Ltd.)" in a temperature difference between upper temperature of 37.7 degrees Celsius and lower temperature of 10.0 degrees Celsius. Here, measurement is done after leaving the vacuum heat insulating material for about one day since the vacuuming step is carried out until gas or water inside of the outer cover material is sorbed in the adsorption agent 6 and the heat conductivity of the vacuum heat insulating material (inside of the outer cover material) is stabled.

Here, the thickness of one sheet of the organic fiber assembly 1 is a value obtained by subtracting two times of the thickness of the outer cover material 4 from the thickness of the vacuum heat insulating material 7 and dividing by the number of laminated sheets.

Further, an average fiber diameter is an average value of measurement values at 100 points measured by the microscope. The result of division of the thickness of one sheet after vacuuming by the average fiber diameter is shown in Table 1.

TABLE 1

|  | thickness of one sheet/average fiber diameter |
| --- | --- |
| Embodiment example 1 | 4 |
| Embodiment example 2 | 8 |
| Embodiment example 3 | 14 |
| Embodiment example 4 | 18 |
| Comparison example 1 | 369 |

Figure 7:
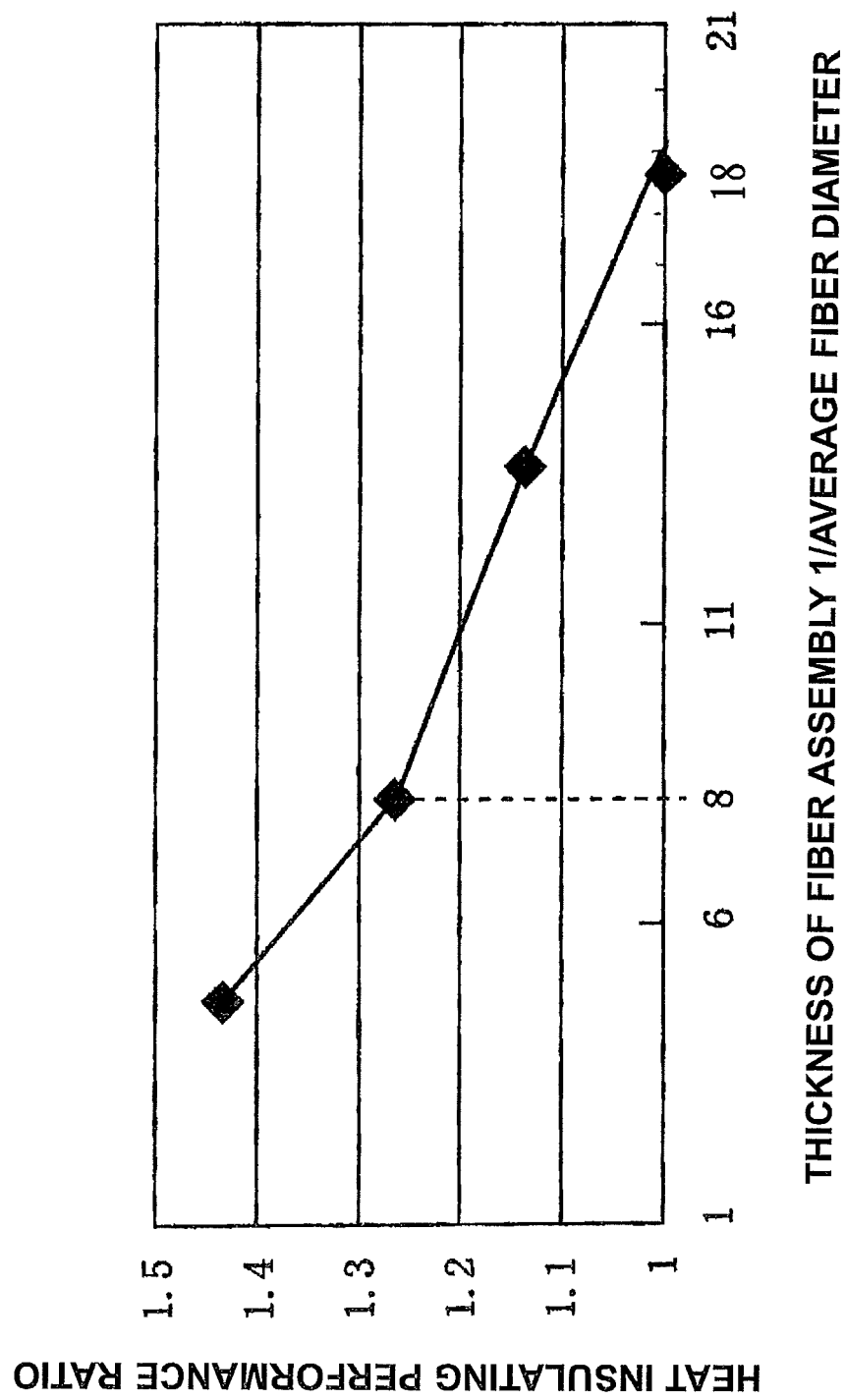
FIG. 7 shows the first embodiment and is a correlation diagram for explaining heat insulating performance of the vacuum heat insulating material 7.

FIG. 7 shows the first embodiment and is a correlation diagram for explaining heat insulating performance of the vacuum heat insulating material 7. The horizontal axis of FIG. 7 is a numeral value obtained by dividing the thickness of the organic fiber assembly 1 by the average fiber diameter, and the vertical axis is a heat insulating performance ratio. Here, the heat insulating performance ratio is a value obtained by dividing the heat conductivity of Comparison example 1 by each of the heat conductivities of Embodiment examples 1 to 4 (the same as an inverse of a value obtained by dividing the heat conductivities of Embodiment examples 1 to 4 by the heat conductivity of Comparison example). Namely, the larger value of the heat insulating performance ratio shows better heat insulating performance.

From FIG. 7, when the thickness of the organic fiber assembly 1 is less than 18 times of the average fiber diameter ("heat insulating performance ratio" in the figure corresponds to about 1 [thickness of fiber assembly/average fiber diameter]), the heat insulating performance is improved compared with Comparison example 1 using the cottonlike fiber for the core material. It is considered that this is because the smaller the thickness of the organic fiber assembly 1 is, the easier the fiber is orientated in the plane direction (the length or width direction of the sheet-shaped organic fiber assembly 1) which is almost orthogonal to the heat insulating direction (the thickness direction of the sheet-shaped fiber assembly), that is, a solid heat transfer passage within the vacuum heat insulating material 7 in the heat insulating direction can be made long, and thus the heat insulating performance is improved.

Further, the closer the thickness of the organic fiber assembly 1 becomes to one time of an average fiber diameter, the better the heat insulating performance becomes. Therefore, it is preferable that the thickness of the organic fiber assembly 1 is one to eighteen times of the average fiber diameter.

Here, if the thickness of the organic fiber assembly 1 is no more than eight times of the fiber diameter, the heat insulating performance is rapidly (extremely) improved. Therefore, the thickness of the organic fiber assembly 1 is preferably one to eight times of the average fiber diameter. Here, it is understood that the smaller the average fiber diameter is compared with the thickness of the organic fiber assembly 1, the further the heat insulating performance is improved. However, since if the thickness of the organic fiber assembly 1 is one time of the average fiber diameter, the manufacturing becomes difficult, the average fiber diameter is preferably at least three times of the thickness of the organic fiber assembly 1.

Here, if the thickness of the organic fiber assembly 1 is less than three times of the average fiber diameter, the productivity of the organic fiber assembly 1 is degraded, the line speed of the manufacturing has to be extremely lowered, and the production efficiency becomes extremely degraded. Thus, the thickness of the organic fiber assembly 1 is preferably equal to or greater than three times of the average fiber diameter.

From the above, if the organic fiber assembly 1 manufactured so that the thickness is made at least one time and no more than eighteen times of the average fiber diameter is used for the core material 5 of the vacuum heat insulating material 7, the heat insulating performance is improved compared with the case in which cottonlike fiber is used for the core material.

In particular, if the organic fiber assembly 1 manufactured so that the thickness is made at least one time and no more than eight times of the average fiber diameter is used for the core material 5 of the vacuum heat insulating material 7, the heat insulating performance is further improved.

Further, if the organic fiber assembly 1 manufactured so that the thickness is made at least three times and no more than eighteen times (preferably, at least three times and no more than eight times of the average fiber diameter) of the average fiber diameter is used for the core material 5 of the vacuum heat insulating material 7, in addition to the effect of the improvement of heat insulating performance, the manufacturability is improved, and the manufacturing cost can be reduced; that is, the vacuum heat insulating material 7 with high performance and high reliability can be obtained with a low cost.

(Heat Insulating Performance 2)
(Fiber Diameter and Inter-Fiber Distance)

The following will explain effect of a diameter of the organic fibers 2 and an inter-fiber distance to the heat insulating performance.

Figure 8:
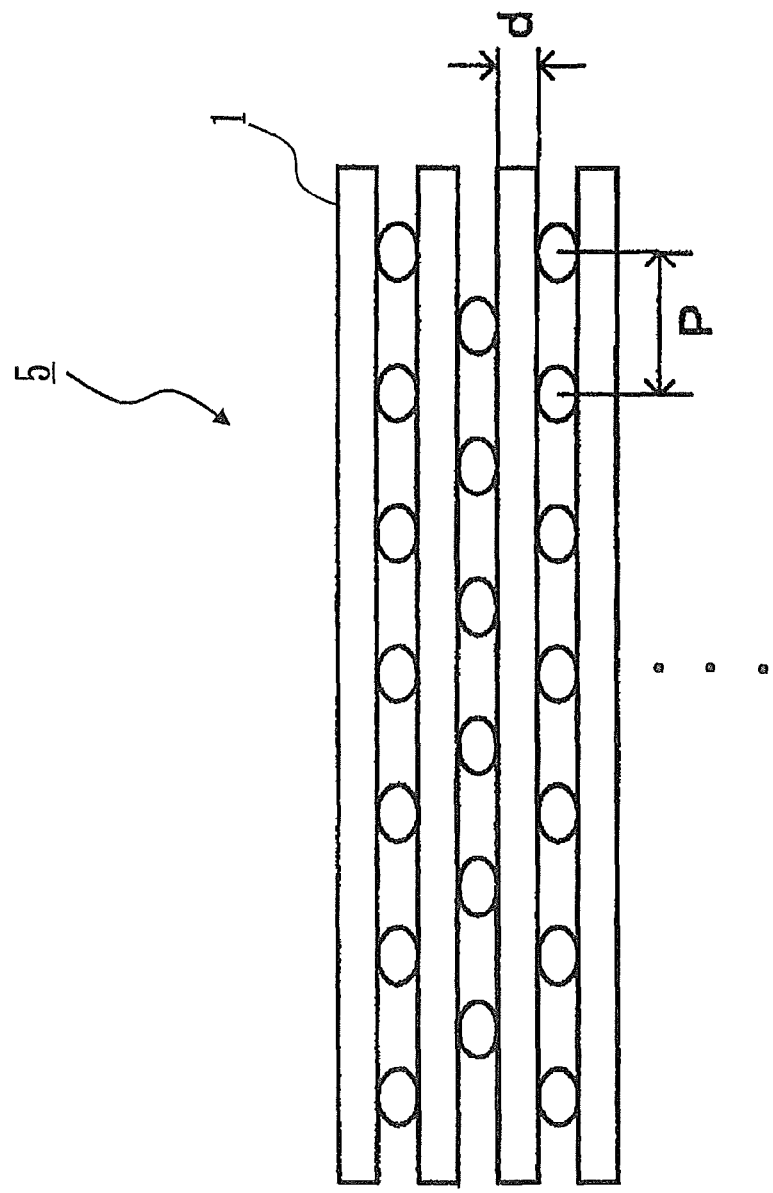
FIG. 8 shows the first embodiment and is a schematic view extendedly showing a structure of vertical cross section of the core material 5 used for the vacuum heat insulating material 7.

FIG. 8 shows the first embodiment, and is a schematic view extendedly showing a structure of vertical cross section of the core material 5 used for the vacuum heat insulating material 7. With reference to FIG. 8, a structure of the core material 5 will be explained in detail. As shown in FIG. 8, the core material 5 is structured by laminating each layer of the organic fiber assembly 1 with making each layer orientated in one direction so that fibers may not be overlapped in the thickness direction of the sheet-shaped non-woven cloth and further each layer to be vertically laminated is overlaid so that fibers of layers intersect almost orthogonally.

Specifically, the core material 5 is formed by laminating the organic fiber assembly 1, in which spun fibers orientated to one direction so as not to be overlapped among fibers, so that the fiber directions may be almost orthogonally intersected with each other. Here, it is assumed that an average fiber diameter is d and an average fiber interval (an average inter-fiber distance; an interval between fibers) is P.

Each layer of the organic fiber assembly 1 can be manufactured by stretching the film so as to make molecules orientated and then splitting into pieces. If this method is used at the time of splitting the film, it is possible to partially leave the connection part between fibers without completely separating the fibers. The organic fiber assembly 1 can be manufactured by stretching the torn sheet in a direction which is almost orthogonal to the fiber direction so as to maintain the interval P between fibers. Thereby the usability of the core material 5 is improved. Here, polyester, etc., for example, can be used for material of the fiber which forms the organic fiber assembly 1.

Next, the obtained core material 5 is inserted to the outer cover material 4 which is a plastic laminated film. Then, the outer cover material 4 to which the core material 5 is inserted is dried for about five hours at the temperature of 100 degrees Celsius. After this, about five (g) of CaO (the adsorption agent 6) enveloped in a non-woven cloth bag is arranged inside the outer cover material 4, and then, the outer cover material 4 in which the core material 5 and the adsorption agent 6 are included is set inside the vacuum chamber. Subsequently, the outer cover material 4 is vacuumed to around 3 Pa inside the vacuum chamber, the opening portion is heat-sealed inside the vacuum chamber, and the vacuum heat insulating material 7 which is a vacuum heat insulating panel is completed.

Figure 10:
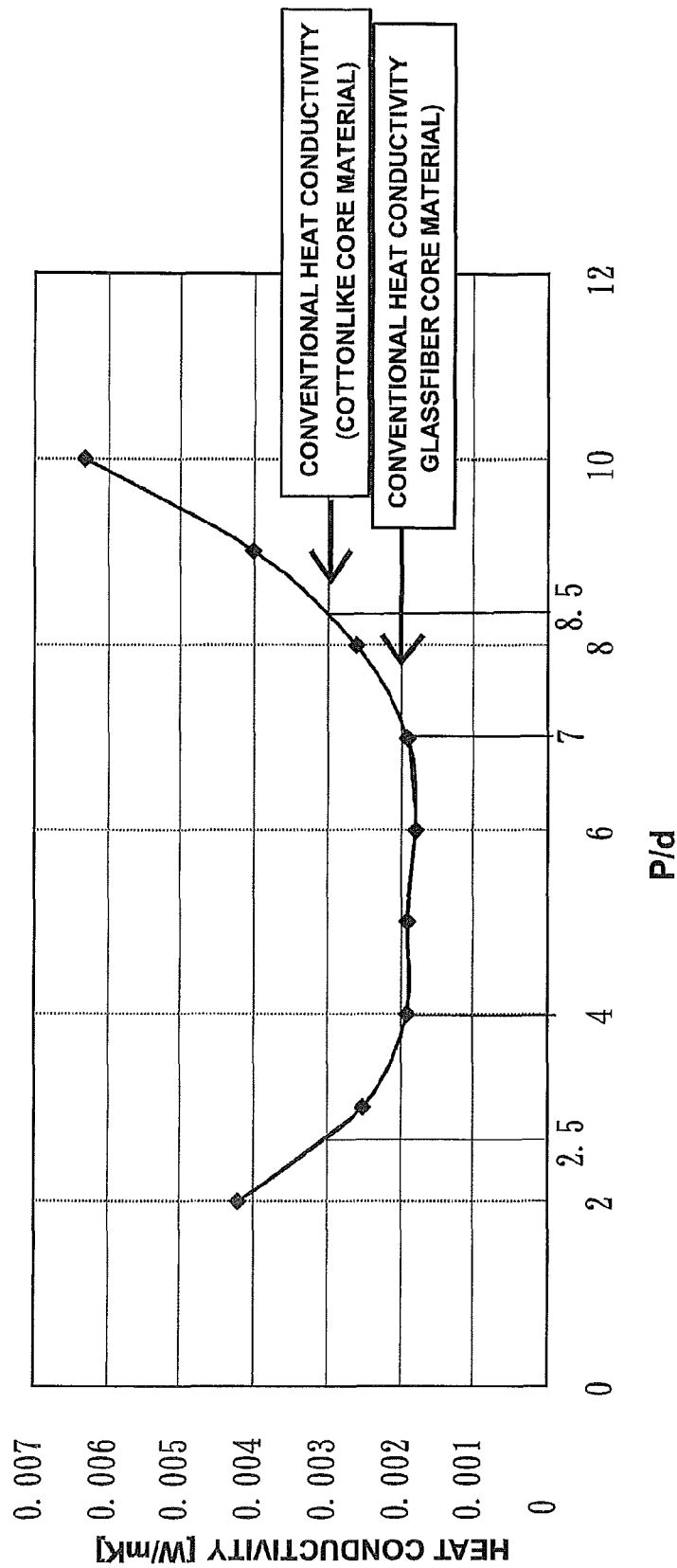
FIG. 10 is a graphed chart of the measured result shown in FIG. 9.

FIGS. 9 and 10 show the first embodiment; FIG. 9 shows measured result of heat conductivity of the vacuum heat insulating material 7, and FIG. 10 is a graphed chart of the measured result shown in FIG. 9. With reference to FIGS. 9 and 10, the measurement result of the heat conductivity, which is carried out as heat insulating performance evaluation of the vacuum heat insulating material 7 obtained in the above method, will be explained.

FIGS. 9 and 10 show relation between the average fiber interval (P)/the average film diameter (d) of the vacuum heat insulating material 7 and heat conductivity [W/mK] in each layer. Here, FIG. 9 also shows heat conductivity of the vacuum heat insulating material 7 when cottonlike fiber (polyester fiber, for example) is used for the core material 5 as a comparison example. Further, in FIG. 10, a horizontal axis shows the average fiber interval/the average film diameter (P/d), and a vertical axis shows the heat conductivity [W/mK].

From the measured result shown in FIGS. 9 and 10, when the average fiber interval (P) is within a range of 2.5 to 8.5 times of the average fiber diameter (d) (a range of P/d is at least 2.5 times and no more than 8.5 times), the heat conductivity of the vacuum heat insulating material 7 according to the first embodiment is smaller than 0.0030 [W/mK] of the vacuum heat insulating material 7 in case of the comparison example using cottonlike core material. Namely, it can be understood the vacuum heat insulating material 7 according to the first embodiment is superior in the heat insulating performance.

This is because of the following: The vacuum heat insulating material 7 of the comparison example using the cottonlike fiber for the core material 5 includes a part in which fibers are orientated in the thickness direction which is the heat transfer direction (the heat insulating direction) due to the irregularity of arrangement of fibers. Heat is transferred through the part in which fibers are orientated in the thickness direction and leaked, which degrades the heat insulating performance. On the contrary to this, the vacuum heat insulating material 7 according to the first embodiment does not transfer heat in the thickness direction which is the heat transfer direction except transferring heat by a point contact through a contacting point with another fiber, so that it is possible to obtain an effect of contact thermal resistance.

In the vacuum heat insulating material 7 according to the present embodiment, leakage of heat in the thickness direction which is the heat transfer direction is low, and accordingly, solid heat transfer through the core material 5 can be reduced. Therefore, the vacuum heat insulating material 7 according to the present embodiment can reduce the heat conductivity, that is, the heat insulating performance is improved.

On the other hand, when the average fiber interval (P) is smaller than 2.5 times of the average fiber diameter (d) (when P/d is less than 2.5 times), the smaller the average fiber interval (P) is, the larger the heat conductivity of the vacuum heat insulating material 7 according to the first embodiment rapidly grows, that is, the heat insulating performance is rapidly degraded, compared with the comparison example using the cottonlike fiber for the core material 5.

It is considered that this is because the fibers of the vacuum heat insulating material 7 according to the first embodiment becomes thick compared with the comparison example using the cottonlike fiber for the core material 5, the heat transfer passage is shortened, and further, solid volume fraction in the vacuum heat insulating material 7 is raised.

Here, if the average fiber interval (P) is made large, namely, is made at least 2.5 times of the average fiber diameter (d) (P/d is at least 2.5 times), the solid volume fraction in the vacuum heat insulating material 7 can be reduced, and further, the heat transfer distance can be made long, which gradually reduces the heat conductivity. The above can be understood from this hypothesis.

Further, in a range in which the average fiber interval (P) is 4 to 7 times of the average fiber diameter (d) (P/d is at least 4 and no more than 7), the heat conductivity stays almost unchanged to be around 0.0020 [W/mK]. Since the heat conductivity becomes almost the same as around 0.0020 [W/mK] which is the heat conductivity of conventional general vacuum heat insulating material 7 using glass fiber for the core material 5, the vacuum heat insulating material 7 according to the present embodiment can present excellent heat insulating performance. From the point at which the average fiber interval (P) exceeds 7 times of the average fiber diameter (d) (when P/d is larger than 7 times), the heat conductivity grows rapidly. Namely, it can be understood that the heat transfer performance becomes rapidly degraded. It is estimated that this is because, as the average fiber interval (P) is made larger, deflection of fiber, which is supported by the contacting point between fibers, becomes large, and the fibers are orientated in the thickness direction, and thus contact of fibers occurs between fibers of respective layers.

From the above explanation, as for the vacuum heat insulating material 7 according to the first embodiment, when the average fiber interval (P) is within a range of 2.5 to 8.5 times of the average fiber diameter (d) (a range of P/d is at least 2.5 and no more than 8.5 times), the heat conductivity becomes smaller than 0.0030 [W/mK] which is the heat conductivity of the conventional vacuum heat insulating material 7 using cottonlike core material, namely, the heat insulating performance is superior.

Further, if the vacuum heat insulating material 7 according to the first embodiment is used in a range in which the average fiber interval (P) is 4 to 7 times of the average fiber diameter (d) (P/d is at least 4 and no more than 7 times), the heat conductivity becomes almost the same as 0.0020 [W/mK] which is the heat conductivity of the conventional general vacuum heat insulating material 7 using the glass fiber for the core material 5; that is, the vacuum heat insulating material 7 according to the first embodiment can present excellent heat insulating performance.

Therefore, it is possible to obtain the vacuum heat insulating material 7 having excellent heat insulating performance if the average fiber interval (P) is set at least 2.5 and no more than 8.5 times of the average fiber diameter (d). Preferably, when the average fiber interval (P) is set at least 4 and less than 7, it can be expected that the heat insulating performance is further improved.

(Heat Insulating Performance 3)
(Influence of Heat Deposition)

Next, influence of fabric weight to the heat insulating performance will be explained when the organic fiber assembly 1 is used for the core material 5, and the organic fiber assembly 1 is unwoven cloth to which heat deposition is applied by an embossing 110.

As discussed above, as for long-fibered non-woven cloth which is the organic fiber assembly 1, continuous fiber melted by the extruder and extruded from the spinning nozzle is collected on the conveyer, the conveyer is lead at an arbitrary speed, and the embossing 110 is carried out by the heat roller with forming, for example, a dotted heat deposited portion. Thereby the fibers which form the sheet become hard to unravel or reveal, so that the handlability of the non-woven cloth sheet is improved, and the reelable long-fibered non-woven cloth can be obtained with maintaining the handling strength.

Figure 11:
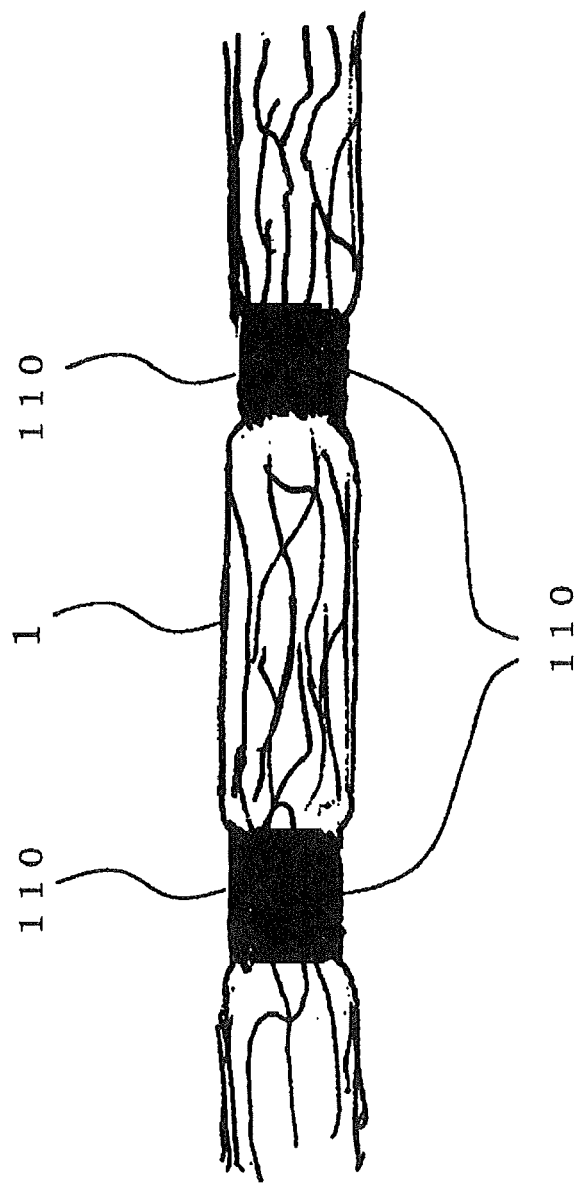
FIG. 11 shows the first embodiment and is a cross sectional view of non-woven cloth which is an organic fiber assembly 1 of the vacuum heat insulating material 7.

FIG. 11 shows the first embodiment and is a cross sectional view of non-woven cloth which is the organic fiber assembly 1 of the vacuum heat insulating material 7. In FIG. 11, on the sheet-shaped organic fiber assembly 1, the embossing 110 is provided appropriately and is heat-deposited. In this figure, the embossing 110 is formed by penetrating from the surface of the sheet-shaped organic fiber assembly 1 to the rear surface (penetrating in the thickness direction of the sheet).

In the heat deposition step by the embossing 110, long-fibered non-woven cloth which is the organic fiber assembly 1 can be manufactured by changing the fabric weight (fabric weight per unit area) with adjusting manufacturing condition such as the speed of the collecting conveyer so that the heat deposited portion penetrates through from the surface to the rear surface, namely, in the thickness direction. Here, the embossing 110 needs to have a size (a diameter in case of an almost circular shape; a length of one side in case of a polygonal shape) of at least about 0.3 mm in order that the heat deposition is securely done to the sheet. Further, in order not to degrade the heat insulating performance due to the heat transfer through the embossing 110, it is preferable that the size of the embossing 110 is no more than about 5 mm.

For example, it is preferable to set the diameter of at least 0.3 mm and no more than around 5 mm if the embossing 110 is circular, or if polygonal, set one side of at least 0.3 mm and no more than around 5 mm; preferably, it should be at least 0.5 mm and no more than 1.5 mm.

In the present embodiment, by setting the embossing 110 to be almost circular and to have a diameter of around 0.5 to 1 mm, the heat insulating performance is improved, and the heat deposition is securely done. A rate occupied by the embossing 110 in the sheet is made around 8% which does not degrade the heat insulating performance so much. Further, as for the measurement of the average fiber diameter, some portions to some hundreds portions (10 portions, for example) are measured by a micro-scope, and an average can be used. Further, the fabric weight (weight (g) of the fiber per 1 m$^2$) can be obtained by measuring the area and the weight of one sheet and obtaining the weight per unit area of one sheet.

Next, 300 sheets of the obtained non-woven clothes are laminated to form the core material 5, inserted into the outer cover material 4 which is an aluminum foil laminated film, and dried at about 100 degrees Celsius for about five hours. After dried, inside of the outer cover material 4 containing the core material 5, the adsorption agent 6 such as water adsorption (CaO) 5g or gas adsorption included in a bag having a good ventilation is provided, and the dried assembly is set inside of a chamber type vacuum packaging machine and vacuumed. The vacuuming is done until the inside of the chamber is 3 Pa, the opening portion is heat-sealed inside of the vacuum chamber, and the vacuum heat insulating material 7 is produced as the vacuum heat insulating panel.

Figure 12:
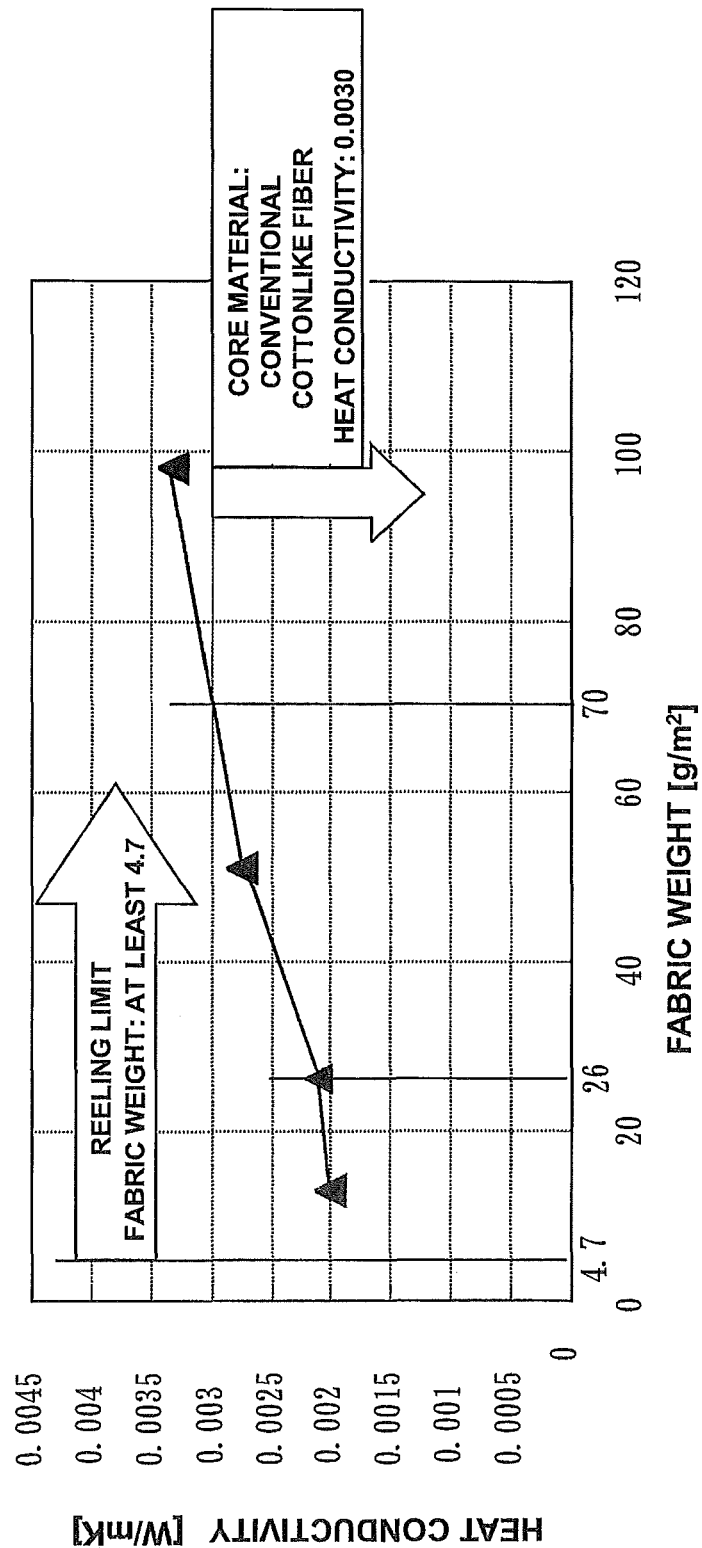
FIG. 12 shows the first embodiment and shows correlation between fabric weight of the vacuum heat insulating material 7 and heat conductivity.
Figure 13:
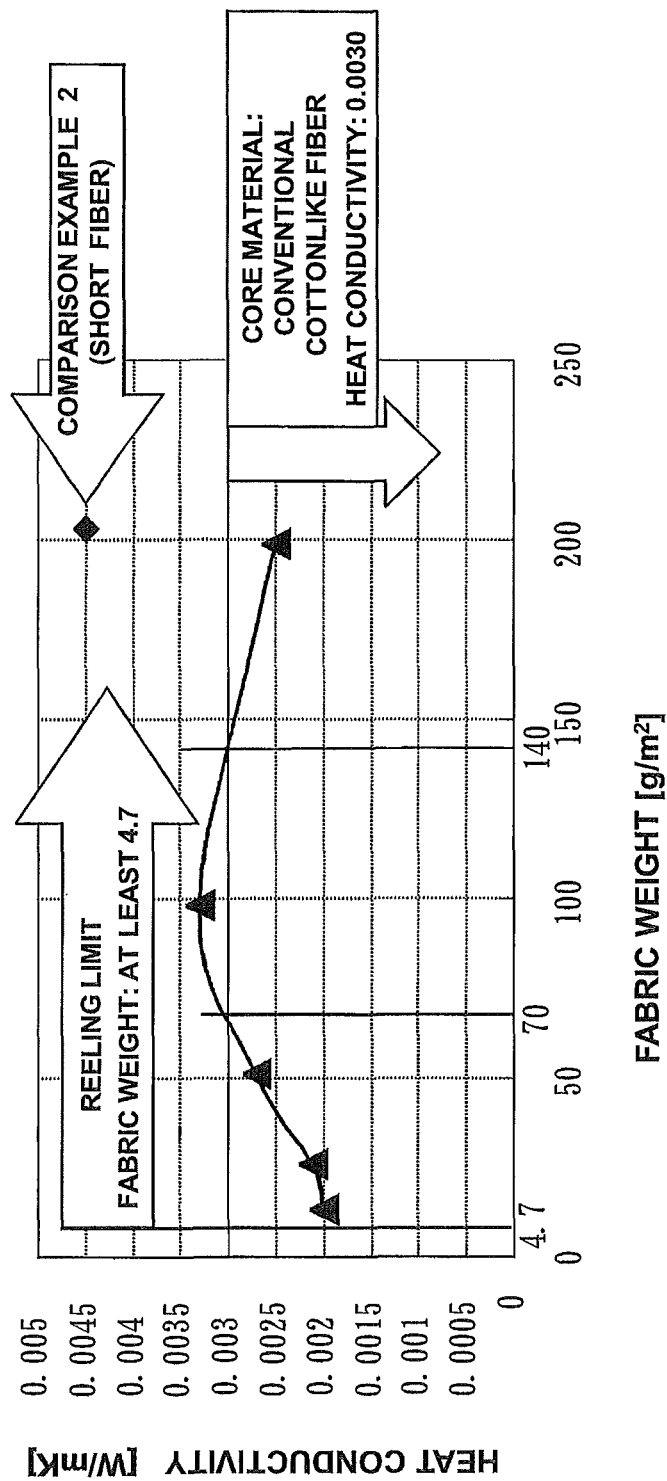
FIG. 13 shows the first embodiment and shows correlation between fabric weight of the vacuum heat insulating material 7 and heat conductivity.

Graphs in FIGS. 12 and 13 show the measured result of the heat conductivity of the obtained vacuum heat insulating material. FIGS. 12 and 13 show the first embodiment; FIG. 12 shows correlation between the fabric weight of the vacuum heat insulating material 7 and the heat conductivity, and FIG. 13 shows correlation between the fabric weight of the vacuum heat insulating material 7 and the heat conductivity.

In each of FIGS. 12 and 13, the vertical axis shows the heat conductivity [W/mK] and the horizontal axis shows the fabric weight [g/m$^2$]. Normally, the fabric weight is represented by the fabric weight [g/m$^2$] showing the weight of fiber per 1 m$^2$. Further, in order to compare with other material of which a specific gravity of fiber material is different, the relation can be represented by a fabric volume [cc/m$^2$] showing the volume (cc) occupied by fiber per 1 m$^2$. Here, in case of showing by the fabric volume [cc/m$^2$], the volume of fiber can be obtained by measuring the weight and converting the result by a specific gravity (in case of PET, the specific gravity is 1.34).

FIG. 12 shows relation between the fabric weight and the heat conductivity when the organic fibers of Embodiment examples 5 to 8 are used for the core material 5 shown in Table 2.

TABLE 2

|  | fiber length | average fiber diameter (μm) | fiber weight (g/m$^2$) |
| --- | --- | --- | --- |
| Embodiment example 5 | long fiber | 13 | 13 |
| Embodiment example 6 | ↑ | ↑ | 26 |
| Embodiment example 7 | ↑ | ↑ | 51 |
| Embodiment example 8 | ↑ | ↑ | 98 |

From FIG. 12, 0.003 [W/mK] which is the heat conductivity of the vacuum heat insulating material 7 when the fabric weight is no more than 70 [g/m$^2$] and the conventional cottonlike core material 5 is used becomes equivalent to the heat conductivity of the case in which the organic fiber assembly 1 of the present embodiment is used for the core material 5. Therefore, if the fabric weight is no more than 70 [g/m$^2$], the heat conductivity of the vacuum heat insulating material 7 related to the first embodiment can be made smaller than 0.003 [W/mK] which is the heat conductivity of the vacuum heat insulating material 7 when the conventional cottonlike core material 5 is used; that is, it is understood that the heat insulating performance is improved.

This is considered that by reducing the fabric weight, the ratio occupied by fibers is reduced, the thickness of the non-woven cloth becomes thin, and thus the fibers within the non-woven cloth tend to be orientated in the direction of plane (the length direction or the width direction) which is almost orthogonal with the heat insulating direction. Accordingly, the fibers are hard to be orientated in the thickness direction (the heat insulating direction), which suppresses the heat conduction in the thickness direction of fibers. Therefore, in the present embodiment, within a range of being less than 0.003 [W/mK] which is the heat conductivity in case of the cottonlike core material, the upper limit of the fabric weight is 70 [g/m²] (no more than), with considering variation of manufacturing. Consequently, it is possible to obtain the vacuum heat insulating material 7 which does not degrade the heat insulating performance, is easy to manufacture, and has a good recyclability.

It is considered that in case of the fabric weight exceeding 70 [g/m²], the orientation direction of the fibers is easily directed in the thickness direction which is the heat insulating direction, and the heat deposited portion of the embossing 110 works as the heat transfer passage in the thickness direction, effect of the heat deposited portion of the embossing 110 is increased, and thus the heat insulating performance is degraded.

Here, from FIG. 12, when the fabric weight exceeds 26 [g/m²], the heat conductivity becomes suddenly larger than around 0.002 [W/mK], so that the fabric weight is desired to be no more than 26 [g/m²]. If the fabric weight is made at least 26 [g/m2], the heat conductivity is made no more than around 0.002 [W/mK] which is the heat conductivity of the conventional general vacuum heat insulating material 7 in which the glass fiber is used for the core material 5, and thus it is possible to obtain the vacuum heat insulating material 7 with high heat insulating performance.

Here, it is considered that the less the fabric weight is, the more the fibers in the non-woven cloth are easily orientated in the plane direction (the length direction or the width direction), and further the effect of the heat deposited portion can be reduced. However, if the fabric weight is lowered too much, the manufacturing becomes hard, and as well the strength is decreased due to the degradation, etc. of the evenness of the non-woven cloth, the non-woven cloth of which the fabric weight is less than 4.7 [g/m²] cannot be reeled as the non-woven cloth, and there occurs a case that fibers may be torn halfway.

Therefore, in the present embodiment, if the embossing 110 is applied on the vacuum heat insulating material 7, the fabric weight is made at least 4.7 [g/m²] and no more than 70 [g/m²] which is the reelable limit of the non-woven cloth, it is possible to obtain the vacuum heat insulating material 7 with high heat insulating performance having the core material 5 with a good usability. Preferably, if the fabric weight is made at least 4.7 [g/m²] and no more than 26 [g/m²], it can be expected that the heat insulating performance is further improved.

Therefore, as for a heat insulating box or a heat insulating wall using the vacuum heat insulating material 7 having a small heat conductivity and high heat insulating performance as explained in the present embodiment, it is possible to make the thickness of the box or the wall thinner due to the good heat insulating performance. Thus, compared with the conventional heat insulating box having the same external appearance, the internal volume can be enlarged, and thus it is possible to supply equipments such as a refrigerator with a large capacity. Further, if the internal volume is made the same as the conventional one, the external appearance can be downsized, and thus it is possible to obtain equipments such as a small compact refrigerator.

Here, FIG. 13 shows a correlation between the fabric weight and the heat conductivity of Embodiment example 5 to Embodiment example 9 shown in Table 3 when the organic fibers 2 is used for the core material 5.

TABLE 3

| | fiber length | average fiber diameter (μm) | fiber weight (g/m²) |
|---|---|---|---|
| Embodiment example 5 | long fiber | 13 | 13 |
| Embodiment example 6 | ↑ | ↑ | 26 |
| Embodiment example 7 | ↑ | ↑ | 51 |
| Embodiment example 8 | ↑ | ↑ | 98 |
| Embodiment example 9 | ↑ | ↑ | 198 |
| Comparison example 2 | short fiber | ↑ | 203 |

In FIG. 13, the horizontal axis shows the fabric weight and the vertical axis shows the heat conductivity. From FIG. 13, when the fabric weight is no more than 70 [g/m²] and at least 140 [g/m²], the heat conductivity becomes smaller than 0.0030 [W/mK] which is the heat conductivity of the conventional one having the cottonlike core material, and thus the heat insulating performance is improved.

Here, the more the fabric weight is greater than 140 [g/m²] which is the predetermined value, the smaller the heat conductivity becomes, and the heat insulating performance is improved. It is considered that the above is because continuous long fibers are used, and thus it is easy to make the fibers orientated at the time of manufacturing in the orthogonal direction to the heat transfer direction (the sheet reeling direction, the length direction or the width direction of the sheet).

Further, if the fabric weight is raised, the thickness per sheet becomes thicker, so that the sheet becomes hard to be folded at the time of lamination due to the thickness of the sheet, and thus the fibers become easy to be orientated in the orthogonal direction to the heat transfer direction (the sheet reeling direction, the length direction or the width direction of the sheet). Consequently, it is considered that the heat conductivity in the heat transfer direction becomes small, and the heat insulating performance is improved.

On the contrary, the more the fabric weight is less than 70 [g/m²] which is the predetermined value, the more the heat insulating performance is improved. It is considered that the above is because the thickness per sheet becomes smaller, so that the fibers become hard to be orientated in the heat transfer direction (the thickness direction), and thus the fibers become easy to be orientated in the orthogonal direction to the heat transfer direction (the sheet reeling direction, the length direction or the width direction of sheet), the heat conductivity in the heat transfer direction becomes small, and the effect of improving the heat insulating performance becomes large.

Therefore, in the present embodiment, if the embossing 110 is applied to the vacuum heat insulating material 7, the fabric weight of the non-woven cloth is made to be at least 4.7 [g/m²], which is the reelable limit of the non-woven cloth, and no more than 70 [g/m²], it is possible to obtain the vacuum heat insulating material 7 the usability of the core material of which is good and the heat insulating performance is high. Preferably, if the fabric weight is made at least 4.7 [g/m²] and no more than 26 [g/m²], it is expected that the heat insulating performance is further improved. Further, if the fabric weight of the non-woven cloth is made at least 140 [g/m²] and no more than 198 [g/m²], it is possible to obtain the vacuum heat insulating material 7, the usability of the core material 5 of which is good and the heat insulating performance is high. The fabric weight is no more than 198 [g/m²], because this value is the measurement result of Embodiment example 9 shown in Table 3, and to this point, it is confirmed that the heat insulating performance is surely good compared with the conventional case using the cottonlike core material.

Therefore, as for a heat insulating box or a heat insulating wall using the vacuum heat insulating material 7 having a small heat conductivity and high heat insulating performance as explained in the present embodiment, it is possible to make the thickness of the box or the wall thinner due to the good heat insulating performance. Accordingly, compared with the conventional heat insulating box having the same external appearance, the internal volume can be enlarged, and thus it is possible to supply equipments such as a refrigerator with a large capacity. Further, if the internal volume is made the same as the conventional one, the external appearance can be downsized, and thus it is possible to obtain equipments such as a small compact refrigerator.

(Heat Insulating Performance 4)
(Long Fiber, Short Fiber)

Here, to demonstrate that the use of continuous long fibers improves the heat insulating performance when the fabric weight is at least 140 [g/m$^2$], the vacuum heat insulating material 7 having the short-fibered core material 5 made by the specification as Comparison example 2 is generated and compared. Here, the organic fibers 2 used for the core material 5 of Comparison example 2 is short fiber having a fiber length of around 5 to 7 mm which is longer than the thickness of one sheet and no more than the thickness (around 5 mm to 10 mm) of the laminated sheet.

From Table 3, as a result of comparing Embodiment example 9 of long fibers and Comparison example 2 using short fibers, both of which the fabric weight are the same, it is found that the heat insulating performance of the heat conductivity (0.0025 [W/mK]) of Embodiment example 9 in which the long-fibered organic fiber assembly 1 is used for the core material 5 is about 1.8 times as better as the heat conductivity (0.0045 [W/mK]) of Comparison example 2 in which the short-fibered organic fiber assembly 1 is used for the core material 5. Therefore, it is found that using the long fibers improves the heat conductivity when the fabric weight is 140 [g/m$^2$]. In this case, since the fabric weight is high, manufacturing is easy, the speed of the manufacturing line can be increased, and thus the production efficiency is improved.

Here, in the present embodiment, as the long fibers, fibers having the continuous fiber length being at least the shortest length of the sheet such as the width direction are used, and thus the heat insulating performance can be improved more than the case in which the short fibers having the fiber length being shorter than the shortest length of the sheet such as the width direction are used. Further, as for the fiber length, the continuous long fibers are preferable. During the manufacturing process of the organic fiber assembly 1, it is considered that fibers may be torn halfway. Further, it is also considered that short fibers, having the fiber length being not continuous exceeding the shortest length of the sheet such as the width direction, may be mixed. In the present embodiment, if the long fibers having the continuous fiber length are included at an occupied rate of at least 50% in the sheet, the heat insulating performance is improved. Consequently, in the present embodiment, the organic fiber assembly 1 formed by the long fibers, of which the fiber length is continuous exceeding the shortest length of the sheet in the length direction or the width direction, etc., of which the occupied rate is at least 50% (preferably, at least 70%) in the sheet is used.

It is considered when the short fibers are used such as in Comparison example 2, since the fiber length is short, the fibers are easy to slant, according to the increase of the fabric weight (the increase of the thickness of the sheet), the fibers are easily orientated in the heat transfer direction, and thus the heat insulating performance is degraded.

On the contrary, if the fiber length of the organic fiber assembly 1 is long, the fibers tend to be orientated in the plane direction (the reeling direction, the length direction, or the width direction) which is almost orthogonal to the heat insulating direction (the thickness direction). That is, a passage for solid heat transfer within the vacuum heat insulating material 7 in the heat insulating direction (the thickness direction) can be long, and thus the heat insulating performance is improved. Further, since the sheet is thick because of the high fabric weight, the sheet is hard to be folded at the time of lamination, and thus it becomes easy to make the fibers orientated in the direction (the reeling direction of the sheet, the length direction or the width direction of the sheet) orthogonal to the heat transfer direction. It is considered because of the above, the heat conductivity in the heat transfer direction is reduced, and the heat insulating performance can be improved. Consequently, the heat insulating performance of the vacuum heat insulating material 7 in which the organic fiber assembly 1 formed by the organic fibers 2 being continuous in the length direction is used for the core material 5 is more excellent than the case of using the short fibers for the core material 5.

(Heat Insulating Performance 5)
(Heat Deposition Penetration, Non-Penetration)

Next, the result of comparison, which is conducted between a case in which the embossing 110 penetrates in the thickness direction and a case in which the embossing 110 does not penetrate, will be explained. It has been explained that in the above vacuum heat insulating material 7, when the embossing 110 penetrates, the heat insulating performance can be improved by lowering the fabric weight (no more than 70 [g/m$^2$], preferably no more than 26 [g/m$^2$]). Here, it is confirmed whether the heat insulating performance is changed or not between the case in which the embossing 110 penetrates in the thickness direction of one sheet and the case in which the embossing 110 does not penetrate in the thickness direction of the sheet (when the emboss is provided only on the front and rear surfaces).

Then, so as not to make the heat deposited portion of the embossing 110 penetrate in the thickness direction, non-woven cloth (the organic fiber assembly 1) is generated with changing the fabric weight by adjusting the temperature of the heat roller and the clearance of the heat rollers. Here, the temperature of the heat roller is set to 180 degrees Celsius, and the clearance between the heat rollers is set to ½ of the thickness of the non-woven cloth before heat deposition is applied.

Figure 14:
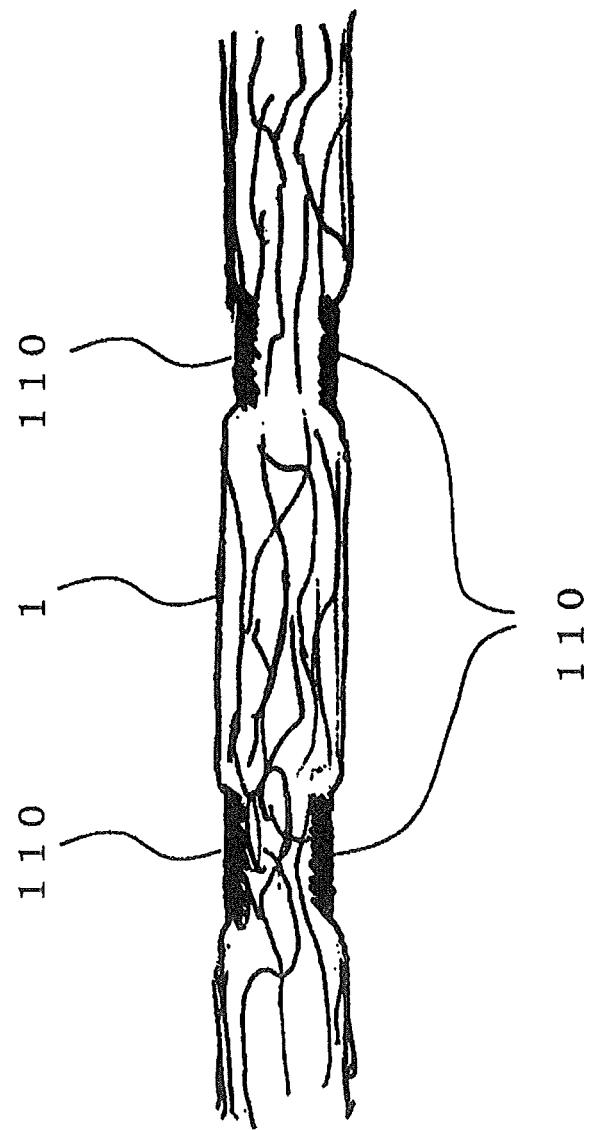
FIG. 14 shows the first embodiment and is a cross section view of non-woven cloth which is the organic fiber assembly 1 of the vacuum heat insulating material 7.

FIG. 14 shows the first embodiment, and is a cross sectional view of the non-woven cloth which is the organic fiber assembly 1 of the vacuum heat insulating material 7. In FIG. 14, for the sheet-shaped organic fiber assembly 1, the embossing 110 is provided by the heat deposition only on the surfaces (the front surface and the rear surface) without penetrating in the thickness direction. Here, "the surface (the front surface and the rear surface)" means "at least one surface of the front surface and the rear surface".

The obtained non-woven cloth (the organic fiber assembly 1) is manufactured into the vacuum heat insulating material 7 in the same manner as the above explanation. Then, the heat insulating performance is compared between the vacuum heat insulating material of which the heat deposited portion of the embossing 110 does not penetrate in the thickness direction (not provided continuously in the thickness direction) and the vacuum heat insulating material of which the heat deposited portion of the embossing 110 penetrates (provided continuously in the thickness direction) (Comparison example). Here, the non-woven cloth to which the embossing 110 is applied is manufactured to have the same size and the same number of portions of the embossing 110 provided in the same dimension.

Figure 15:
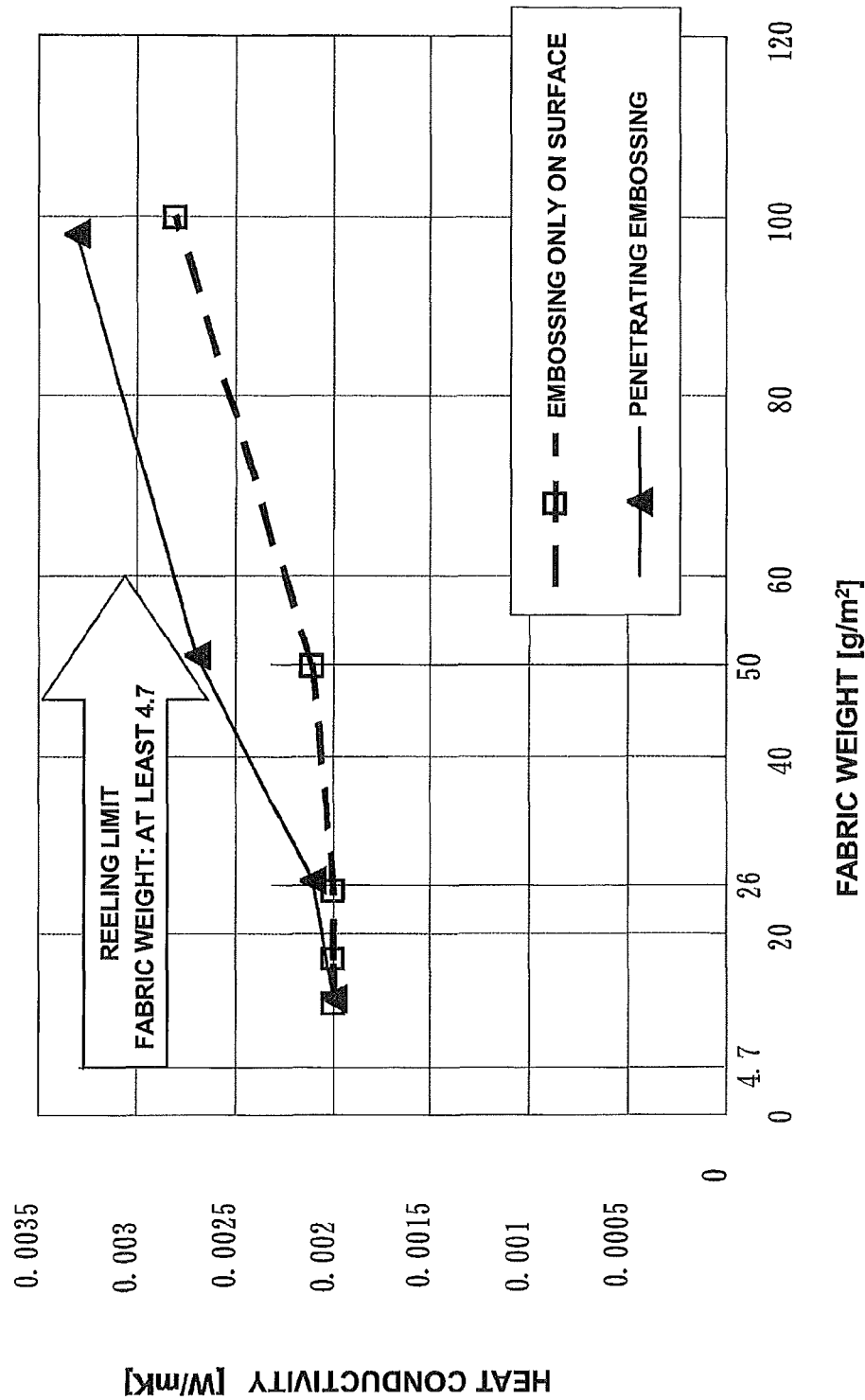
FIG. 15 shows the first embodiment and shows relation between fabric weight of the vacuum heat insulating material 7 and heat conductivity.

The obtained evaluation results of the heat insulating performance of the vacuum heat insulating material 7 is shown in a graph of FIG. 15. FIG. 15 shows the first embodiment and is a diagram showing relation between the fabric weight and the heat conductivity of the vacuum heat insulating material 7. In FIG. 15, similarly to the above discussed FIG. 12, the vertical axis is the heat conductivity [W/mK] and the horizontal axis is the fabric weight [g/m$^2$]. In FIG. 15, a solid line shows the case of the embossing 110 penetrating (the case shown by the solid line in FIG. 12). Further, a broken line shows the case in which the embossing 110 does not penetrate in the thickness direction of one sheet (only on the face surface).

Here, in FIG. 15, when the heat deposited portion of the embossing 110 penetrates in the thickness direction of the organic fiber assembly 1, from a point at which the fabric weight exceeds about 26 [g/m$^2$], the heat conductivity suddenly increases, and the heat insulating performance begins to be degraded. If the fabric weight exceeds about 70 [g/m$^2$], the heat conductivity exceeds 0.003 [W/mK] which is the heat conductivity of the conventional case using the cottonlike core material, and the heat insulating performance is extremely degraded. However, if the heat deposition potion of the embossing 110 is formed so as not to penetrate in the thickness of the non-woven cloth, up to about 50 [g/m$^2$] of the fabric weight, the heat conductivity is almost fixed and the heat insulating performance is good. In the case shown by the broken line in which the heat deposited portion of the embossing 110 does not penetrate in the thickness direction of the non-woven cloth 1, when the fabric weight exceeds around 50 [g/m$^2$], the heat conductivity suddenly increases. Until the fabric weight is up to about 100 [g/m$^2$] (the heat conductivity is about 0.0028 [W/mK]), the case does not exceed 0.003 [W/mK] which is the heat conductivity of the core material of cottonlike fiber, so that it is possible to obtain the vacuum heat insulating material 7 of which the heat insulating performance is more excellent than the conventional cottonlike fiber.

From the above, when the heat deposited portion of the embossing 110 does not penetrate in the thickness direction of the sheet-shaped non-woven cloth, by making the fabric weight to be at least about 4.7 [g/m$^2$] and no more than about 100 [g/m$^2$], it is possible to suppress the heat conductivity to no more than 0.003 [W/mK] which is the heat conductivity of the conventional case using the cottonlike core material. Consequently, it is possible to obtain the non-woven cloth and the vacuum heat insulating material 7, which secure necessary heat insulating performance, are easy to manufacture, and have a good recyclability, and equipments using the heat insulating material 7 such as the refrigerator, the water heater, the jar pot, etc. Here, if the fabric weight is set at least about 4.7 [g/m$^2$] and no more than about 50 [g/m$^2$], the heat conductivity can be equivalent to 0.002 [W/mK] which is the heat conductivity of the conventional general vacuum heat insulating material 7. Therefore, it is possible to obtain the non-woven cloth, the vacuum heat insulating material 7 of which the heat insulating performance is good, is highly efficient and easy to manufacture, and also has a good recylability, and the equipments using the heat insulating box or the vacuum heat insulating material 7 such as the refrigerator, the water heater, the jar pot, etc.

Further, when the heat deposited portion of the embossing 110 penetrates in the thickness direction of the sheet-shaped non-woven cloth, by making the fabric weight to be at least about 4.7 [g/m$^2$] and no more than about 70 [g/m$^2$], it is possible to suppress the heat conductivity to no more than 0.003 [W/mK] which is the heat conductivity of the conventional case using the cottonlike core material. Consequently, it is possible to obtain the non-woven cloth and the vacuum heat insulating material 7, which secure necessary heat insulating performance, are easy to manufacture and have a good recyclability, and equipments using the heat insulating box, the vacuum heat insulating material 7 such as the refrigerator, the water heater, the jar pot, etc. Here, if the fabric weight is set at least about 4.7 [g/m$^2$] and no more than about 26 [g/m$^2$], the heat conductivity can be the equivalent to 0.002 [W/mK] which is the heat conductivity of the conventional general vacuum heat insulating material 7 using the glass fibers as the core material. Therefore, it is possible to obtain the non-woven cloth, the vacuum heat insulating material of which the heat insulating performance is more excellent, which is highly efficient and easy to manufacture, and also has a good recylability, and the equipments such as the refrigerator, the water heater, the jar pot, etc. using the heat insulating box or the vacuum heat insulating material 7.

Further, when the heat deposited portion of the embossing 110 penetrates in the thickness direction of the sheet-shaped non-woven cloth and when the heat deposited portion does not penetrate, by increasing the fabric weight within the above range of the fabric weight, it is possible to increase the thickness of one non-woven cloth sheet. Due to this, it is possible to reduce the number of laminated sheets of non-woven cloth which is the organic fiber assembly 1 for obtaining the vacuum heat insulating material 7 with the desired thickness (the predetermined necessary thickness), and thus the productivity is improved.

Here, within a range of at least 4.7 [g/m$^2$] and no more than 26 [g/m$^2$], a difference is small between the case where the heat deposited portion of the embossing 110 penetrates in the thick direction of the sheet-shaped organic fiber assembly 1 and the case where the heat deposited portion does not penetrate. Accordingly, if no problem occurs in the productivity, by using the non-woven cloth with low fabric weight, there hardly occurs a difference regardless whether the heat deposited portion of the embossing 110 penetrates in the thickness direction of the sheet-shaped non-woven cloth or not, that is, the heat insulating performance is good. Therefore, if no problem occurs in the productivity, the fabric weight should be made within as small range as possible such as at least 4.7 [g/m$^2$] and no more than 26 [g/m$^2$], thus the degree of freedom of the embossing 110 is increased, and the heat insulating performance becomes also good.

Here, if the productivity is considered, the fabric weight should be as large as possible. In this case, the heat deposited portion of the embossing 110 is made not to penetrate in the thickness direction of the sheet-shaped non-woven cloth, and with considering the manufacturing variation, etc., the range of the fabric weight should be made at least about 4.7 [g/m$^2$] and no more than 100 [g/m$^2$] so as to be smaller than about 0.003 [W/mK] which is the heat conductivity of the cottonlike core material.

Further, when the vacuum heat insulating material 7 of the present embodiment of which the heat conductivity is small and the heat insulating performance is high is used, the thickness of the heat insulating box or the heat insulating wall can be made thin due to the good heat insulating performance. Therefore, compared with the conventional heat insulating box with the same external appearance, the internal volume can be enlarged, and thus it is possible to provide equipments such as a refrigerator with a large capacity. Further, if the internal volume is made the same as the conventional one, the external appearance can be downsized, and thus it is possible to provide equipments such as a small and compact refrigerator.

Here, in order to provide the heat deposited portion of the emboss, etc. with a hole penetrating in the thickness direction, if the hole (a through hole, for example) formation process is done by laser processing, etc., the substantial size of the heat deposited portion (heat conduction area) is reduced by the space for forming the hole, the heat transfer through the heat deposited portion can be reduced, and thus the heat insulating performance can be improved. By forming the through hole being smaller than the size of the heat deposited portion applied on the sheet, the heat insulating performance is improved compared with the case where the heat deposited portion has no hole formation. For example, when the size of the heat deposited portion is an almost circle having the diameter of about 2 mm, the size of the through hole should be the diameter of about 1 mm. Since the through hole is smaller than the size of the heat deposited portion, the deposited status of the organic fibers 2 which forms the organic fiber assembly 1 can be maintained, and thus the usability of the sheet is maintained to be good.

Namely, by providing a through hole being small enough to maintain the deposited status (so that the heat deposition can be maintained) of the organic fibers 2 which form the sheet being the organic fiber assembly at the heat deposition such as the embossing applied in the thickness direction of the sheet, while maintaining the usability and the productivity of the sheet good, further it is possible to obtain the vacuum heat insulating material which can improve the heat insulating performance. Regardless the heat deposited portion such as the embossing penetrate or does not penetrate in the thickness direction of the sheet, the heat insulating performance can be improved by providing the hole formation at the heat deposited portion. Further, as for the hole formation, it is not limited to the through hole but a concave portion formation that can obtain the effect of the heat insulating performance improvement. Accordingly, by providing the through hole or the concave portion which is smaller than the heat deposited portion and can maintain the heat deposition of the organic fiber assembly at the heat deposited portion in the thickness direction of the sheet, while the usability of the sheet and the productivity are kept good, further it is possible to obtain the vacuum heat insulating material which can improve the heat insulating performance.

(Heat Insulating Performance 6)
(Without Heat Deposition)

Here, from the usability problem of the core material 5, after forming the sheet of the organic fiber assembly 1, the heat deposition is often applied to the organic fibers 2x and the organic fibers 2y by the heat roller, etc. (the embossing 110). When the embossing 110 is applied, as explained above, the heat insulating performance is improved when the fabric weight is low; however, in case of the non-woven cloth with low fabric weight, since the thickness of one sheet is thin, the number of laminations should be large for obtaining the vacuum heat insulating material 7 having the predetermined thickness. Accordingly, the productivity is degraded such that the manufacturing line of the non-woven cloth becomes delayed or the time required for the lamination step becomes long, etc. Therefore, as for the organic fiber assembly 1 related to the present embodiment, the heat insulating performance will be explained hereinafter for the case where the heat deposition such as the embossing 110, etc., is not applied. When the heat deposition such as the embossing 110, etc. is not applied, since the heat transfer passage can be reduced, it is considered that the heat insulating performance is improved.

Here, when the heat deposition such as the embossing 110, etc. is not applied to the organic fiber assembly 1, the long-fibered non-woven cloth which is the organic fiber assembly 1 is manufactured by the following: the continuous fibers which are melted by the extruder and pushed off from the spinning nozzle, are collected on the conveyer, and reeled by feeding the conveyer at an arbitrary speed. The fiber density of the organic fiber assembly 1 can be adjusted by the discharging amount of the melted resin and the speed of the conveyer, and the organic fiber assembly 1 having different thickness can be manufactured.

Then, the obtained organic fiber assembly 1 is cut out into, for example, an A4 size, and the core material 5 is formed. The number of lamination can be set arbitrarily based on the thickness of the obtained organic fiber assembly 1 and the thickness of the vacuum heat insulating material 7 to be manufactured. The heat insulating performance of the organic fibers 2 is better when the fiber diameter is thinner. Theoretically, the fiber diameter is desired to be no more than 10 µm. Here, according to the thickness of the required core material 5, it is unnecessary to laminate the non-woven cloth sheet which is the organic fiber assembly 1, namely, the number of sheets can be one.

Next, effect to the heat insulating performance due to existence/absence of the heat deposition of the organic fiber assembly 1 will be explained. Here, the organic fibers 2 used here is polyester having the diameter of about 10 µm to 13 µm. Further, the vacuum heat insulating material 7 is manufactured by the manufacturing step equivalent to the above manufacturing method.

At this time, when manufacturing the non-woven cloth without heat deposition, two samples "a" and "b" of the vacuum heat insulating material 7, which are formed by the sheet-shaped organic fiber assembly 1 made of the organic fibers 2 being continuous in the length direction and to which the heat deposition is not applied at the manufacturing step, are manufactured. When manufacturing the non-woven cloth with heat deposition for the comparison example, the vacuum heat insulating material 7, which is formed by the sheet-shaped organic fiber assembly 1 made of the organic fibers 2 being continuous in the length direction and to which the heat deposition is applied at the manufacturing step, is manufactured. Here, the core material 5 is formed without cutting out the organic fiber assembly 1 but with maintaining the continuous sheet shape in the length direction.

Then, the heat conductivities of the organic fiber assembly 1 of samples "a" and "b", and the comparison example which have been manufactured are measured using a heat conductivity tester "Auto A HC-073 (EKO Instruments Co., Ltd.)" at a temperature difference of the upper temperature being 37.7 degrees Celsius and the lower temperature being 10.0 degrees Celsius. Here, the measurement is done after carrying out the vacuuming step, and keeping as it is for about one day until gases or water within the outer cover material 4 is adsorbed by the adsorption agent 6 and the heat conductivity becomes stable. Here, the average fiber diameter is the average value of the measured values of 10 points at which the measurement is done using the microscope.

In this case, the heat insulating performance according to the existence/absence of the heat deposited portion by the embossing 110 are compared using the fabric weight [$g/m^2$] which is the weight per unit weight.

The vacuum heat insulating material 7 without heat deposition by the embossing 110 is confirmed by the two samples having different fabric weights. The fabric weight of the sample using the long fibers without the embossing 110 are about 70 [g/m$^2$] in the sample "a" and about 924 [g/m$^2$] in the sample "b". In both cases for the samples "a" and "b", the heat conductivities are 0.0019 to 0.0020 [W/mK]. The heat insulating performance of the samples "a" and "b" are improved compared with the case using the long fibers with the embossing 110 which are the comparison examples (Embodiment examples 5 to 9, refer to FIG. 13). Accordingly, the heat insulating performance can be improved more in the case without the heat deposition by the embossing 110 rather than the case with the heat deposition by the embossing 110.

The reason for this is considered that there is no heat deposition between the organic fibers 2 themselves of the organic fiber assembly 1, the passage of heat may be shortened due to the absence of the heat deposition. Here, in case of the vacuum heat insulating material 7 in which the long-fibered organic fibers 2 are used for the core material 5, even if the fabric weight is extremely high such as 924 [g/m$^2$], the heat conductivity is small and the heat insulating performance is improved. Therefore, by increasing the fabric weight to make the thickness of one sheet of the sheet-shaped non-woven cloth thick, the number of lamination of the core material 5 can be reduced, the production speed can be increased, and further the productivity can be improved.

From the above, the heat insulating performance becomes better when the heat deposition by the embossing 110 is not applied to the core material 5 of the vacuum heat insulating material 7 and the vacuum heat insulating material 7 is manufactured by the organic fiber assembly 1 in which the long fibers being continuous exceeding the length of the sheet are used for the core material 5. Obviously, it is needless to say, also in the case where the heat deposition by the embossing 110 is applied, the heat insulating performance becomes better than the case where the short fibers are used for the core material 5 when the organic fiber assembly 1 is manufactured by the long fibers being continuous exceeding the length of the sheet.

(Heat Insulating Performance 7)
(Cross-Sectional Shape of Fiber)

Next, the relation between the cross sectional shape of the organic fibers 2 and the heat insulating performance will be explained. The cross sectional shape of the above organic fibers 2 is an almost circle. Another case will be explained, in which the cross sectional shape of the organic fibers 2 which forms the organic fiber assembly 1 is made a triangular cross section which is modified cross section other than the almost circle. The case will be explained using an example, in which the organic fibers 2 having the modified cross section is used for manufacturing the organic fiber assembly 1, 300 sheets of the organic fiber assembly 1 are laminated to form the core material 5, and the vacuum heat insulating material 7 is manufactured in the same manner as discussed above.

The heat conductivity is measured as the heat insulating performance evaluation of the vacuum heat insulating material 7 in which the organic fiber assembly 1 using the organic fibers 2 having a modified cross section, for example, a triangular cross section is applied. For a comparison example, the heat conductivity of another vacuum heat insulating material 7, in which the organic fibers 2 having an almost circular cross section including an almost same dimension of the cross section is used, is also measured. The heat conductivity is 0.0017 [W/mK] for the vacuum heat insulating material 7 in which the organic fiber assembly 1 using the organic fibers 2 having the almost triangular cross section is applied. On the other hand, the heat conductivity is 0.0020 [W/mK] for the vacuum heat insulating material 7 in which the organic fiber assembly 1 using the organic fibers 2 having the almost circular cross section is applied. Therefore, it is found that the heat insulating performance can be improved when the organic fibers 2 having the almost triangular cross section is used rather than when the organic fibers 2 having the almost circular cross section is used.

Since the inside of the vacuum heat insulating material 7 is almost vacuum state, the organic fiber assembly 1 which forms the core material 5 receives atmospheric pressure through the outer cover material 4. When viewed from an arbitrary contacting point as a reference, at which the organic fibers 2 are contacted with each other, since the organic fiber 2 is also contacted with another fiber, the organic fiber 2 receives pressure by a contacting point with the other fiber as a point of support, becomes deflected, so that the organic fiber 2 becomes contacted with more other fibers, and thus the heat conductivity becomes larger; that is, the heat insulating performance is degraded.

Therefore, it is considered that the heat insulating performance is improved by having the modified cross section, because by making the cross sectional shape of the organic fibers 2 the almost triangular shape including the almost same dimension of the almost circular cross section, the stiffness is improved compared with the fibers having the almost circular cross section including the almost same dimension of cross section, and the deflection of the fibers at the time of receiving the atmospheric pressure is reduced.

From the above, the heat insulating performance can be improved when the cross sectional shape of the organic fibers 2 is made to be the modified cross section (the almost triangular shape, for example) rather than the almost circular shape. Further, if the organic fibers 2 has the modified cross sectional shape (for example, an almost triangular shape, a polygonal shape, etc.) including the almost same dimension as the almost circular cross section of the fiber such that the modified cross sectional shape increases the second moment of area, the deformation of the vacuum heat insulating material 7 at the time of receiving the atmospheric pressure can be reduced, the solid volume fraction within the vacuum heat insulating material 7 can be decreased, and thus it is possible to obtain the vacuum heat insulating material 7 of which the heat insulating performance is improved.

Further, the cross sectional shape of the organic fiber 2 before vacuuming is made an almost C shape, and after vacuuming a C-shaped opening portion is deformed by the pressure into a hollow tubular shape of which the C-shaped opening portion is closed (the diameter of the closed C-shaped opening portion is almost the same as the outer diameter of the almost circular shape). If such organic fiber 2 is used, since the cross section is tubular (the almost circular shape of which the center portion is hollow), the heat transfer becomes worse rather than the case of using the fiber having the almost circular cross section, and thus the heat insulating performance is improved.

In this case, if the hollow tubular fiber is used for the initial fiber, the air in the hollow portion is hard to be removed by vacuuming, it takes long to vacuum. Further, there occurs a problem that the degree of vacuum of the hollow portion is not decreased. On the other hand, according to the present embodiment, the cross sectional shape of the organic fiber 2 before vacuuming is the almost C-shaped having the opening portion, and after vacuuming, the organic fiber 2 is pressed by the pressure and deformed into the hollow tubular shape of which the C-shaped opening portion is closed (the diameter of the closed C-shaped opening portion is almost the same as the outer diameter of the almost circular shape). Since such organic fiber 2 is used, the vacuuming time can be reduced, a predetermined degree of vacuum can be obtained, and further the vacuum heat insulating material 7 having a good heat insulating performance can be obtained.

Here, the organic fiber 2 having the C-shaped cross section is used, after vacuuming, the C-shaped opening portion is deformed by the pressure into the hollow tubular shape of which the C-shaped opening portion is closed (the diameter of the closed C-shaped opening portion is almost the same as the outer diameter of the almost circular shape). In this hollow tubular shape of which the C-shaped opening portion is closed, when a rate of the outer diameter to the inner diameter (when this rate is 0%, the inner diameter is 0, which shows the inside is a circular cross section including no opening portion nor hollow portion) when the C-shaped opening portion is closed is a range of 30% to 70%, the heat conductivity is 0.0016 to 0.0019 (W/mK), which is small enough, and it is found that the heat insulating performance is improved. This is also confirmed for a case when the rate of the outer diameter to the inner diameter is no more than 20% and a case of at least 80%, and it is found the heat conductivities are large, and the heat insulating performance is degraded compared with the case of 30% to 70%.

(Heat insulating performance 8)
(Opening Portion Such as a Through Hole, a Notch, Etc.)

Next, in order to compare the size of strain and the deformation due to the creeping at the manufacturing step of the vacuum heat insulating material 7, the thickness of the vacuum heat insulating material 7 is measured after manufacturing the vacuum heat insulating material 7 in the above-discussed manner. Then, after soaking in a normal temperature tank at 60 degrees Celsius, heating is applied for about 11 hours, and the vacuum heat insulating material 7 is pulled out and the thickness of the vacuum heat insulating material 7 is measured again.

Figure 16:
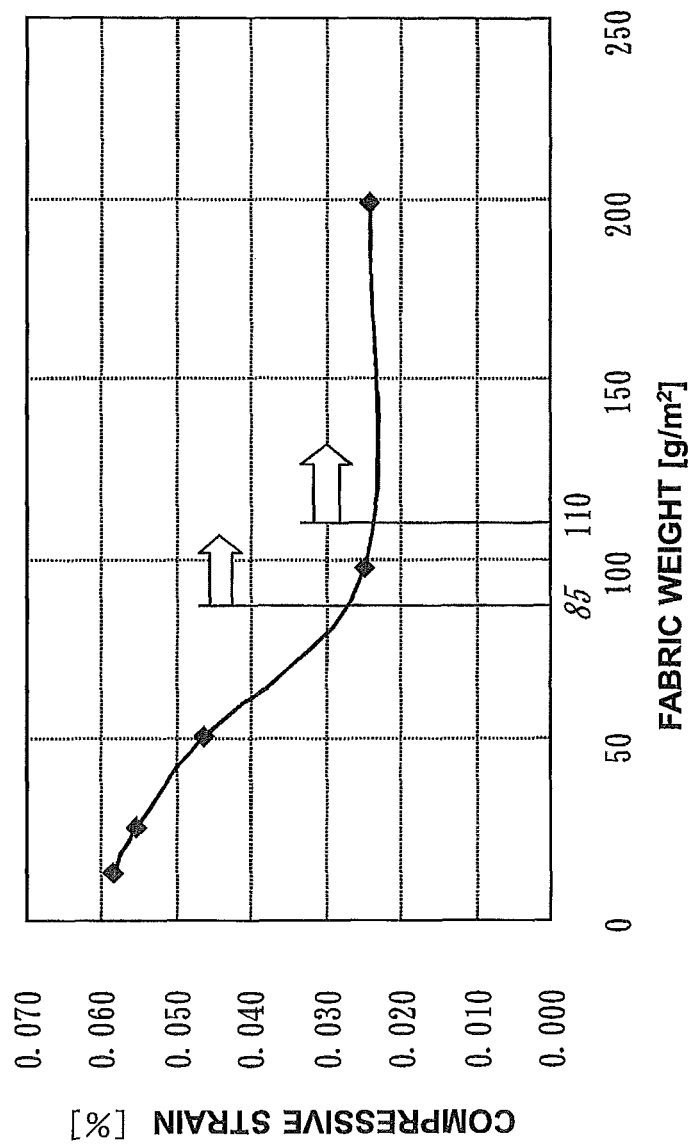
FIG. 16 shows the first embodiment and is a correlation diagram showing relation between fabric weight of the vacuum heat insulating material 7 and compression strain.

FIG. 16 shows the first embodiment and is an correlation diagram showing the fabric weight of the vacuum heat insulating material 7 and compressive strain. The compressive strain a can be obtained, for example, as in the following:

$$\text{Compressive strain } \sigma = (t_B - t_A)/t_A$$

where $t_A$: the thickness of the vacuum heat insulating material 7 before heated $t_B$: the thickness of the vacuum heat insulating material 7 after heated with 60 degrees Celsius for 11 hours From FIG. 16, as for the compressive strain [%], from about 13 [g/m²] to 85 [g/m²] of the fabric weight, according to the increase of the fabric weight, the compressive strain is suddenly reduced. Further, from about 85 [g/m²] of the fabric weight, as the fabric weight increases, the reduction of the compressive strain becomes slow. When the fabric weight is at least 110 [g/m²], it is understood that the compressive strain stays almost fixed, and is not changed so much. Namely, when the fabric weight is about 85 [g/m²], the reducing rate of the compressive strain is changed; that is, there exists a turning point.

It is considered that since if the fabric weight is small, the lamination becomes the one of thin sheets, the smaller the fabric weight is, the softer the lamination becomes; that is, the stiffness against the compression becomes small, the stiffness is hardly maintained, the sheet becomes easily deformed, and thus the strain becomes large.

On the contrary, when the fabric weight exceeds about 85 [g/m²] (or about 110 [g/m²]), the thickness of one sheet becomes somewhat thick, the stiffness against the compression can be obtained, and thus the sheet becomes hard to be deformed or strained.

Therefore, if the fabric weight of the non-woven cloth which is the organic fiber assembly 1 is made at least 85 g/m² and no more than 198 g/m², since the thickness of one sheet becomes thick and hard to be strained, the stiffness against the compression can be obtained, and thus the deformation becomes hard to occur at the time of vacuuming. Accordingly, the shape failure due to the deformation would not occur and the vacuum heat insulating material 7 with high reliability can be obtained.

Figure 17:
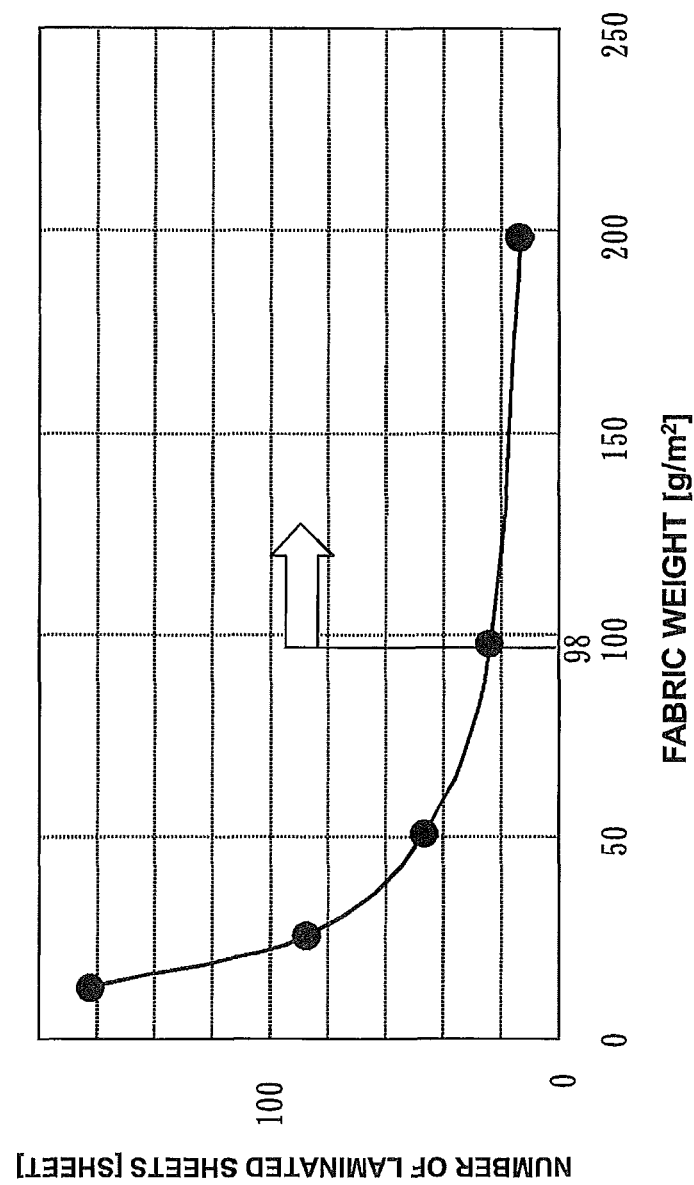
FIG. 17 shows the first embodiment and is a diagrammatic view showing fabric weight and the number of laminated sheets (the number of laminated sheets when the thickness of vacuum heat insulating material is a predetermined thickness, for example, the thickness after vacuuming is a predetermined thickness) of the vacuum heat insulating material 7.

FIG. 17 shows the first embodiment and a diagrammatic view showing the fabric weight of the vacuum heat insulating material 7 and the number of laminated sheets (the number of laminated sheets when the thickness of vacuum heat insulating material is a predetermined thickness, for example, the thickness after vacuuming is a predetermined thickness). The higher the fabric weight is, the less the number of laminated sheets becomes. Namely, when the fabric weight is high, the number of the laminated sheets is small, and the productivity is good; that is, the fabric weight is preferably at least 98 [g/m²] which is a point in FIG. 17 from which a slope of the line becomes small (gradual).

Here, although the upper limit value of the fabric weight is not specifically described, the fabric weight is desirable to be the one which makes the number of laminated sheets one. The less the number of laminated sheets is, the laminating step can be saved during the production; that is, the productivity becomes good, and thus when the fabric weight is increased as much as possible and the number of laminated sheets is reduced, the productivity is improved.

From the above, from the viewpoint of productivity, it is understood that the fabric weight is desired to be at least 98 [g/m²]. On the other hand, from the viewpoint of improvement of the heat insulating performance, the fabric weight is desired to be at least 4.7 [g/m²] and no more than 70 [g/m²], or the fabric weight is at least 140 [g/m²] and no more than the fabric weight which makes the number of laminated sheets one. Further, from the viewpoint of the creeping characteristics with consideration of the compressive strain, the fabric weight is desired to be at least 85 [g/m²], preferably at least 110 [g/m²] and no more than the fabric weight which makes the number of laminated sheets one.

Further, by using the long fiber, if the fabric weight is made at least 98 [g/m²] and no more than 198 [g/m²], while the heat insulating performance is maintained, the compressive strain can be suppressed to be small, and thus it is possible to obtain the vacuum heat insulating material 7 with less deformation and high reliability.

Further, by mixing and laminating the first core material having a high fabric weight or a high fabric volume and the second core material having a low fabric weight or a low fabric volume (for example, by combining alternatively the first core material and the second core material), compared with the case of laminating the sheets having the same thickness, if the thickness after lamination is the same, the strain can be reduced in the core material 5 totally, and further, the thickness can be reduced rather than the case of laminating the same number of sheets having the high fabric weight. Therefore, it is possible to obtain the highly reliable vacuum heat insulating material 7 of which the heat insulating performance is good, the laminated thickness is thin, and the deformation due to the strain is small.

Further, the necessary heat insulating performance can be secured more compared with the case of laminating the same number of sheets having a low fabric weight, and as well a predetermined stiffness can be obtained, the heat insulating performance is good, and thus it is possible to obtain the highly reliable vacuum heat insulating material 7 with less deformation and high performance. Here, the combination example of the first core material and the second core material has been explained; the same effect can be obtained by combining and laminating plural sheet-shaped core materials 5 having different fabric weights.

For example, as shown in FIG. 6, a sheet with a high fabric weight (for example, the fabric weight within a range of small compressive strain is at least 110 [$g/m^2$] and no more than 198 [$g/m^2$]) and small compressive strain is used for the first organic fiber assembly 1x, and a sheet with a low fabric weight (for example, the heat insulating performance ratio is at least 4.7 [$g/m^2$] and no more than 70 [$g/m^2$]) and a little bit large compressive strain is used for the second organic fiber assembly 1y, and they are laminated alternatively to form one sheet of the core material 5. In this way, the compressive strain can be suppressed by the first organic fiber assembly 1x with the high fabric weight, and the thickness of the core material 5 can be reduced totally by the second organic fiber assembly 1y of which the fabric weight is low and the heat insulating performance is good, and further the core material 5 becomes easily folded. Therefore, the thickness of the vacuum heat insulating material 7 which is formed by mixing and laminating plural types of sheets each having different thickness is made the same as the thickness of the vacuum heat insulating material 7 which is formed by laminating sheets each having the same thickness, and thereby since the second organic fiber assembly 1y with good heat insulating performance is laminated, the heat insulating performance of the core material 5 is improved, the stiffness becomes small, and thus folding process, etc. can be easily done. Further, since the first organic fiber assembly 1x with small compressive strain is laminated, the compressive strain is small, the stiffness is high, and thus the vacuum heat insulating material 7 with good usability and good heat insulating performance can be obtained.

From the above, for the core material 5 of the vacuum heat insulating material 7, if the organic fiber assembly 1 is manufactured by continuous long fibers to which the heat deposition by the embossing 110 is not applied and is continuous exceeding the length of the sheet, the heat insulating performance becomes better. Obviously, it is needless to say, also in the case where the heat deposition by the embossing 110 is applied, the heat insulating performance becomes good when the organic fiber assembly 1 is manufactured by the long fibers being continuous exceeding the length of the sheet.

(Heat Insulating Performance 9)
(A Through Hole and a Notch)

Figure 18:
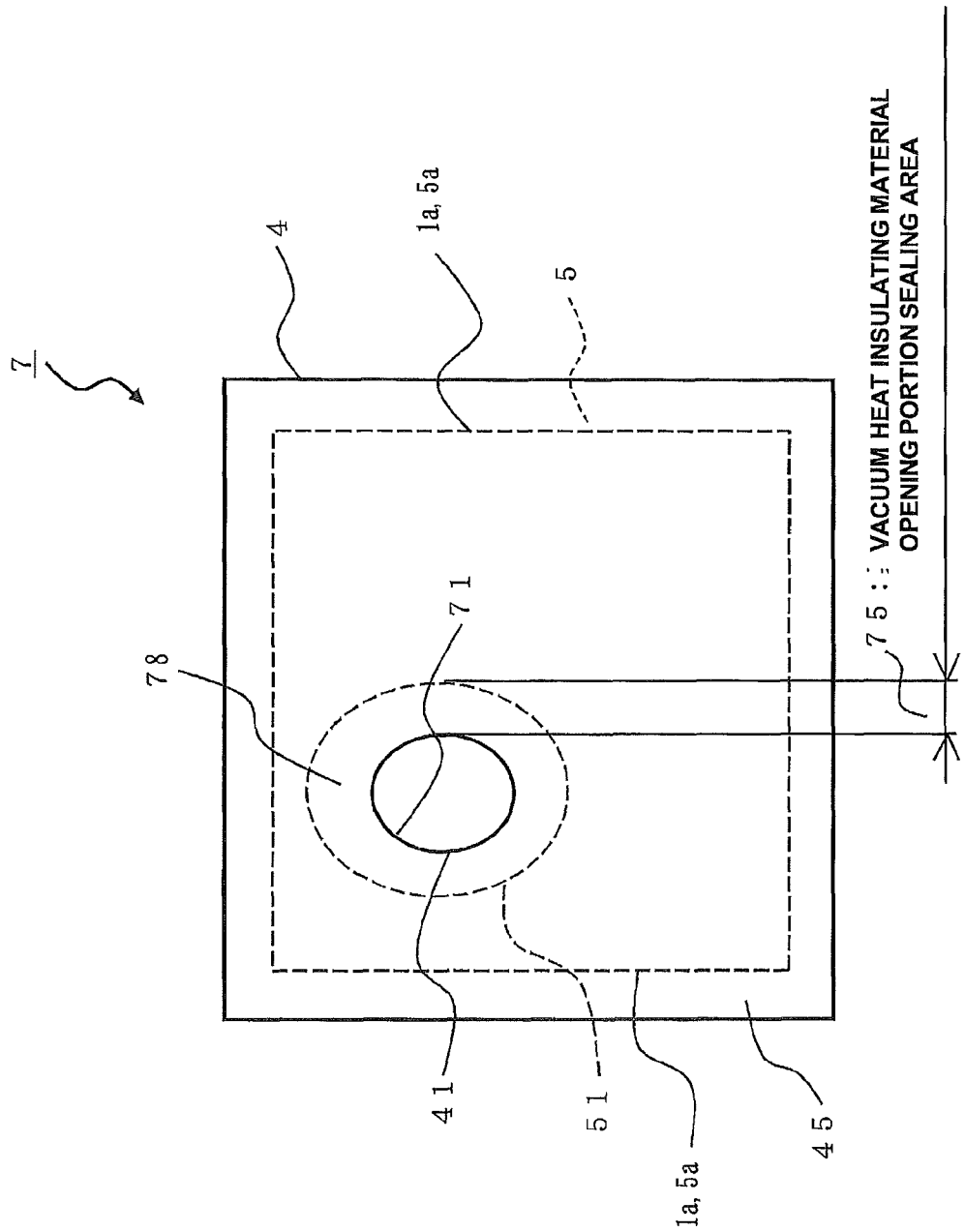
FIG. 18 shows the first embodiment and is a frontal view of the vacuum heat insulating material 7 having an opening portion.
Figure 19:
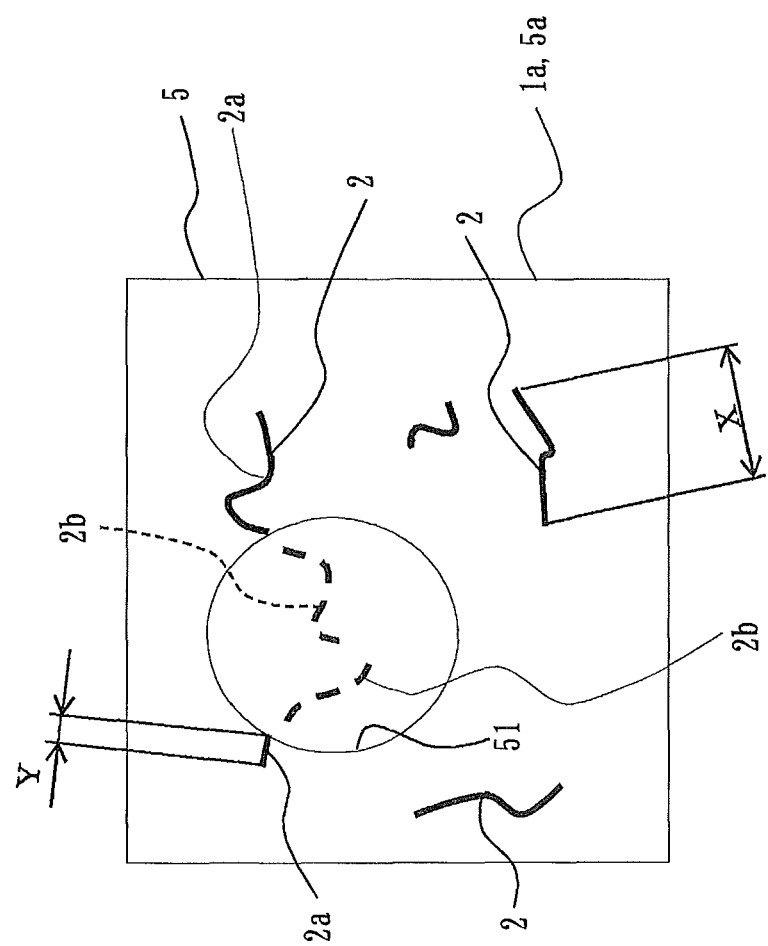
FIG. 19 shows the first embodiment and shows appearance of the opening portion of the core material 5 of the vacuum heat insulating material 7 when short fiber is used for the core material 5.
Figure 20:
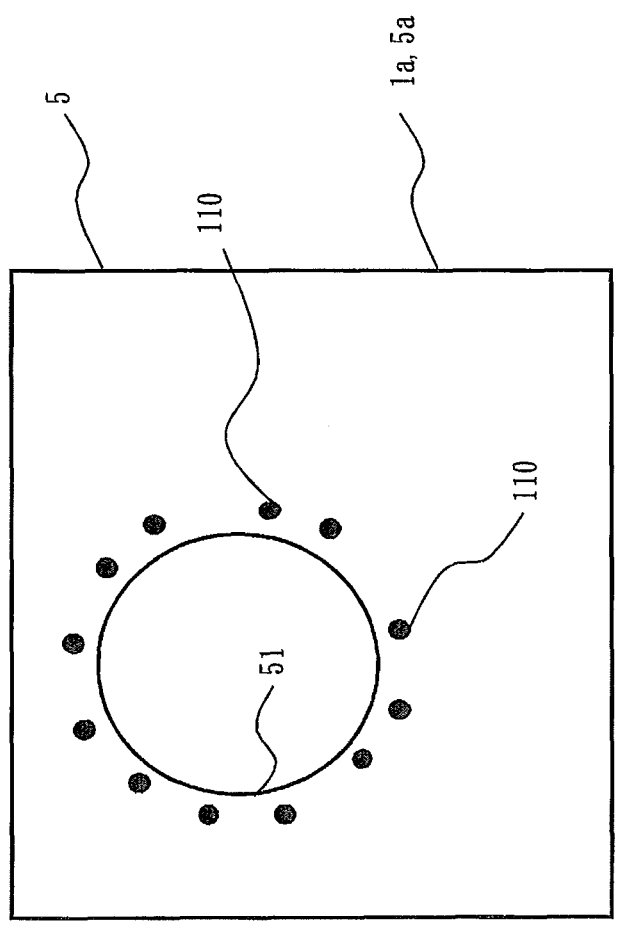
FIG. 20 shows the first embodiment and is a drawing showing an example in which a heat deposited portion such as an embossing 110 around an outer circumference of the opening portion of the core material 5 of the vacuum heat insulating material 7.

In the present embodiment, the vacuum heat insulating material 7 is provided with a penetrating opening portion 70 such as a through hole and a notch, etc. FIG. 18 shows the first embodiment and is a frontal view of the vacuum heat insulating material 7 having the opening portion. FIG. 19 shows an appearance of the opening portion of the core material 5 of the vacuum heat insulating material 7 when conventional short fiber is used for the core material 5. FIG. 20 shows the first embodiment and is a drawing showing an example in which a heat deposited portion such as the embossing 110 is provided around an outer circumference of the opening portion of the core material 5 of the vacuum heat insulating material 7.

In FIGS. 18 through 20, at the core material 5 of which the end faces 1a and 5a are cut to form into a predetermined size (for example, A4 size), a core material opening portion 51, which has a predetermined size being smaller than the size of the core material 5 and larger than a necessary size and penetrates the core material 5 such as a through hole or a notch, is provided previously.

Here, as shown in FIG. 18, since the core material 5 or the organic fiber 2 which has been discussed above in the present embodiment is used for the core material 5 or the organic fiber 2 in this case, the heat insulating performance is excellent.

The core material 5 is inserted to the outer cover material 4, dried, and vacuumed, and then a sealing portion 45 of an insertion hole of the outer cover material 4 is sealed by heat deposition, etc. After that, vacuuming is done, the inside portion (a vacuum heat insulating material opening portion sealing area 78) of a core material opening portion 51 such as the through hole or the notch, etc. is heat-deposited and sealed, and an outer cover material opening portion 41 which is a through hole is formed by cutting the outer cover material 4 with an almost similar shape to the core material opening portion 51 and smaller than the core material opening portion 51 with an amount of a vacuum heat insulating material opening portion sealing area 75, which is predetermined necessary sealing length. By this operation, a vacuum heat insulating material opening portion 71 such as the through hole or the notch, etc. is finally formed on the vacuum heat insulating material 7.

Here, on the outer cover material 4, the outer cover material opening portion 41, which is smaller than the size of the core material opening portion 51 with the amount of the vacuum heat insulating material opening portion sealing area 75 at the almost same position as the core material opening portion 51 of the core material 5 when the core material 5 is inserted, is provided, the core material 5 is inserted to the outer cover material 4, and a vacuum heat insulating material opening portion sealing portion 78 (with the length of the vacuum heat insulating material opening portion sealing area 75) between the outer cover material 4 and the core material 5 is heat-deposited, dried, and vacuumed, and then the sealing portion 45 (the inserting portion) of the inserting hole of the outer cover material 4 can be sealed.

Here, as shown in FIG. 19, if a short fiber (for example, fibers of which fiber length is about 5 to 150 mm) being shorter than the length or the width of the sheet of the predetermined is used for the organic fiber 2 which is conventionally used for the core material 5, when the core material opening portion 51 such as the through hole or the notch is provided at the core material 5, when the core material opening portion 51 such as the through hole or the notch is removed from the organic fiber assembly 1 (sheet) by cutting (cut away), the organic fibers 2 bridging (bridging a cut portion to be removed and a remaining portion of the sheet) the core material opening portion 51 is split into a remaining fiber 2a and a cutoff fiber 2b by cutting, the remaining fiber 2a remains on the sheet and the cutoff fiber 2b is removed from the sheet.

Since the remaining fiber 2a which remains at the sheet side other than the cutoff fiber 2b (a portion other than the portion to be removed) is cut (cut off), the length of the remaining fiber 2a becomes Y which is shorter than an initial fiber length X (a short fiber, about 5 to 150 mm, for example).

In particular, if the initial fiber length X is short, the fiber length Y of the remaining fiber 2a remained at the sheet portion may be extremely short. In this case, the remaining fiber 2a cannot be tangled with the existing fibers of the sheet portion since the fiber length Y of the remaining fiber 2a is short, but the remaining fiber may be ragged and protruded. If this happens, when the vacuum heat insulating material opening portion sealing area 75 of the outer cover material 4 around the core material opening portion 51 is sealed by heat deposition, etc., the remaining fiber 2a which has been ragged and protruded is intruded to the vacuum heat insulating material opening portion sealing area 75, which may generate sealing failure, and the heat insulating performance possibly may be extremely degraded.

For example, it is assumed that if the short fiber having the initial fiber length X of 55 mm is used, and the through hole which is the core material opening portion 51 has the diameter of about 50 mm, 50 mm out of the initial fiber length X of 55 mm is cut and removed by the through hole. In this case, the fiber length Y (the length) of the remaining fiber 2a remaining at the organic fiber assembly 1 (sheet) is about 5 mm. The fiber having the length of 5 mm cannot be tangled with the existing fiber in the sheet, the remaining fiber may be ragged and protruded around the through hole portion which is the core material opening portion 51. When the outer cover material 4 around the through hole 51 is sealed by heat deposition, etc., the fibers ragged and protruded to the through hole portion which is the core material opening portion 51 may intrude in the vacuum heat insulating material opening portion sealing area 75, the sealing failure may occur, and thus the heat insulating performance is extremely degraded. Further, at the vacuuming step, the remaining fiber 2a (the remaining fiber 2a of which the fiber length becomes Y), of which the fiber length is made short by cutting, is made to easily protrude by the vacuuming, and it is possibly sucked by a vacuum pump, which may cause the failure of the vacuum pump.

However, in the present embodiment, since the long fiber of the continuous organic fiber 2 is used for the organic fiber assembly 1 (non-woven cloth sheet), the initial fiber length X is more than the length of the non-woven cloth sheet (for example, the long side or the short side of the A4 size) in a status in which the core material 5 is cut (cutoff) into a predetermined size (for example, A4 size). Accordingly, if the core material opening portion 51 such as the through hole or the notch, etc., the size of which is no more than the width (for example, the length of the short side) of the organic fiber assembly 1, is cut, since the fiber length is long (continuous), if the organic fiber assembly is cut (cutoff) by the core material opening portion 51, the fiber length Y of the remaining fiber 2a remaining at the sheet side other than the cutoff fiber 2b of the portion to be removed by the cutoff can be secured long, and thus the remaining fiber 2a is tangled with the existing fiber in the organic fiber assembly 1 and does not protrude from the core material opening portion 51.

Namely, when the long fiber (for example, a continuous fiber or a fiber having the length of at least the length of the sheet) is used, even if the core material opening portion 51 such as the through hole or the notch, etc. is provided by cutting, the fiber length Y of the remaining fiber 2a of the cutting portion of the core material opening portion 51 such as the through hole or the notch, etc. can be secured long. Therefore, fiber waste of the remaining fiber 2a remained on the sheet by cutting does not protrude around the inside of the cutting portion of the core material opening portion 51 such as the through hole or the notch, etc., the sealing failure does not occur, and thus it is possible to obtain the vacuum heat insulating material 7 of which the heat insulating performance is not degraded if the time passes, the heat insulating box and the equipments, etc. using the vacuum heat insulating material 7.

Further, in the present embodiment, the long fibers, of which the initial fiber length X is at least the same length (or the width) of the organic fiber assembly 1 (the non-woven cloth sheet), are used, so that if the vacuum heat insulating material opening portion 71 such as the through hole or the notch, etc. is provided at the vacuum heat insulating material 7, the sealing failure, etc. does not occur, and it is possible to obtain the vacuum heat insulating material 7 of which the heat insulating performance is hardly degraded.

Here, the fiber length being at least the same length as the length (or the width) of the organic fiber assembly 1 (the non-woven cloth sheet) is used. However, as for the fiber length of the long fiber, when the vacuum heat insulating material opening portion 71 such as the through hole or the notch, etc. is provided at the vacuum heat insulating material 7, the fiber length Y of the remaining fiber 2a should be sufficiently long so that the remaining fiber hardly protrudes to the inside (the outside), etc. of the core material opening portion 51 such as the through hole or the notch, etc. due to ravel, etc. When the fiber length is sufficiently longer than the size of the core material opening portion 51 such as the through hole or the notch, etc. (the longer the fiber length is than the size of the diameter of the through hole or the size of the notch, the better; for example, the long fiber of which the fiber length Y of the remaining fiber 2a is longer than the diameter of the through hole or the size of the notch which is the core material opening portion 51 with at least about 10 mm (preferably at least 15 mm)), if the core material opening portion 51 such as the through hole or the notch is provided, and the sheet is removed by the core material opening portion 51, the length Y of the remaining fiber 2a of the remaining portion of the core material 5 other than the core material opening portion 51 is at least 10 mm (preferably, at least 15 mm), possibility of being ragged and protruded to around the through hole is decreased, the sealing property is hardly degraded, and the degradation of the heat insulating performance due to the sealing failure can be suppressed.

Further, in the present embodiment, the case in which the core material opening portion 51 of the vacuum heat insulating material 7 is cut (cutoff) has been explained. The application of the embodiment is not limited to the core material opening portion 51. If applied to the end face of the sheet of the core material 5 of the portion to be sealed (for example, at least one end face of the organic fiber assembly 1 of which the end face 5a (or the end face 1a) is cut with the predetermined size), etc., the sealing failure does not occur, and it is needless to say, the degradation of the heat insulating performance can be suppressed.

For example, when the core material 5 of which the end face is cut and becomes a predetermined size (for example, A4 size) is inserted into the outer cover material 4, and the insertion opening 4a of the outer cover material is sealed, the embodiment can be applied to the end faces 1a, 5a which is the cut face (cutoff face) of the core material 5 or the organic fiber assembly 1 (the non-woven cloth sheet) corresponding to the insertion opening 4a of the outer cover material 4. The insertion opening 4a to which the core material 5 of the outer cover material 4 is inserted is sealed at the sealing portion 45 by the heat deposited portion, etc. after the core material 5 is inserted. Accordingly, like the present embodiment, since the long fiber (for example, the fiber of which the initial fiber length is at least the same length or width of the organic fiber assembly 1 (the non-woven cloth sheet) of which the end face 5a (or 1a, or the core material opening portion 51) is cut, preferably the fiber of which the fiber length Y of the remaining fiber 2a remained on the sheet after the end face and 5a (or 1a, or the core material opening portion 51) is cut is at least 10 mm (preferably at least 15 mm, more preferably at least 20 mm) is used, if the core material 5 is cut to produce the core material 5 or the organic fiber assembly 1 with the predetermined length, the fiber length Y of the remaining fiber 2a can secure the predetermined length (for example, the fiber length of the remaining fiber 2a remained after cutting is at least 10 mm (preferably at least 15 mm, more preferably at least 20 mm)). Therefore, the remaining fiber 2a does not protrude from the cutoff face of the core material 5 or the organic fiber assembly 1, the sealing failure does not occur, and it is possible to obtain the highly reliable vacuum heat insulating material 7 of which heat insulating performance is hardly degraded for a long term.

Here, the fiber length of the long organic fiber can be, for example, the initial fiber of which the fiber length Y of the remaining fiber 2a remained on the sheet after cutting (cutoff) the sheet is at least 10 mm (preferably at least 15 mm, more preferably at least 20 mm). Preferably, it is desired that the long fiber should be at least the same length (or the width) of the non-woven cloth sheet, and more preferably, the long fiber should be continuous from one end to the other end of the length (or the width) of the sheet.

Therefore, since the long fiber of which the end face is cut and is continuous in the length direction or the width direction of the organic fiber assembly 1 having the predetermined size and width is used for the organic fiber 2, and the length of the remaining fiber 2a which is generated on the cutting portion (for example, the end face 1a, 5a which is the cutting portion of the sheet end face of the core material 5 or the organic fiber assembly 1 or the cutting portion 51 of the hole formation or the cutting portion 51 of the notch formation) of the organic fiber assembly 1 (the non-woven cloth sheet) by cutting can be secured long, it is possible to suppress protrusion of the remaining fiber generated on the end face 1a, 5a, 51 which is the cutting portion generated if the conventional case using the short fiber by cutting. It becomes unnecessary to increase the length of sealing of the sealing portion 45 or the opening portion sealing area 78 with consideration of protrusion of the remaining fiber like the conventional case using the short fiber. Accordingly, the sealing length of the sealing portion 45, 78 of the outer cover material 4 can be shortened, and thus it is possible to obtain the compact low-cost vacuum heat insulating material. Further, if the size of the outer cover material 4 is the same, compared with the conventional case using the short fiber, the size of the core material 5 (the length or the width of the sheet) can be increased with an amount of the length of protrusion (for example, about 1 mm to 10 mm), the heat insulated area can be increased, and thus the heat insulating performance is improved.

Further, as shown in FIG. 20, if continuously to or with a predetermined interval with the periphery of a portion of the core material 5 which is not to be cut by the core material opening portion 51 such as the through hole or the notch, etc. which is to be cut (for example, the outer circumference of the core material opening portion 51, if the portion to be cut is the core material opening portion 51, and the inside portion of the core material opening portion 51 is to be removed by cutoff), the heat deposited portion such as the embossing 110, etc. is provided, it is possible to suppress the protrusion of the remaining fiber. Further, when the portion to be cut is the end face of the organic fiber assembly 1, continuously to or with a predetermined interval with neighborhood of the cutoff face of the end face of the remaining sheet portion (the portion which forms the organic fiber assembly 1) which is not the portion to be cut, if the heat deposited portion such as the embossing 110, etc. is provided, the fibers of neighborhood of the cutoff portion are attached with each other due to the heat deposition such as the embossing 110, etc. and the fibers 2 become hard to be ragged and thus it is possible to suppress the protrusion of the remaining fiber. Like this, by providing the embossing 110, etc., it is possible to further reduce the sealing failure, and suppressing effect of the heat insulating performance is further improved. Here, the heat deposited portion such as the embossing 110, etc. can be provided at only neighborhood of the cutoff portion, however, it is not necessary to concentratedly provide at neighborhood of the cutoff portion, but the effect can be obtained if plural heat deposited portions are provided over the sheet-shaped organic fiber assembly 1 as a whole with a predetermined interval. Further, when the heat deposited portion such as the embossing 110, etc. is provided so as to penetrate the thickness of the organic fiber assembly 1, the effect is large, and when the size of the heat deposited portion is large, the effect is large. However, without penetrating, the length of the heat deposited portion in the thickness direction can be set appropriately as well as the size of the heat deposited portion within a range not to generate the sealing failure based on experiments.

Here, in the present embodiment, it has been explained that using the long fiber having the continuous fiber length being longer than the shortest length of the sheet (the organic fiber assembly 1) such as the length direction or the width direction of the sheet improves the heat insulating performance compared with the case using the short fiber being shorter than the shortest length of the sheet such as the length direction or the width direction of the sheet, and it is preferable to use the continuous long fiber. It is considered that the fiber may tear halfway during the manufacturing process of the organic fiber assembly 1, and that fibers which are not continuously longer than the shortest length of the sheet such as the length direction or the width direction of the sheet may be mixed. In the present embodiment, if the continuous long fibers being longer than the shortest length of the sheet in the length direction or the width direction of the sheet are included with at least 50% of the whole fibers, the heat insulating performance can be improved. Therefore, in the present embodiment, the organic fiber assembly 1 formed by the long fibers, at least 50% of which (preferably at least 70%) is occupied by the continuous long fibers being longer than the shortest length of the sheet in the length direction or the width direction of the sheet, is used.

(Heat Insulating Box)

Next, one embodiment example will be explained, in which the vacuum heat insulating material 7 of the present invention is applied to a refrigerator.

Figure 21:
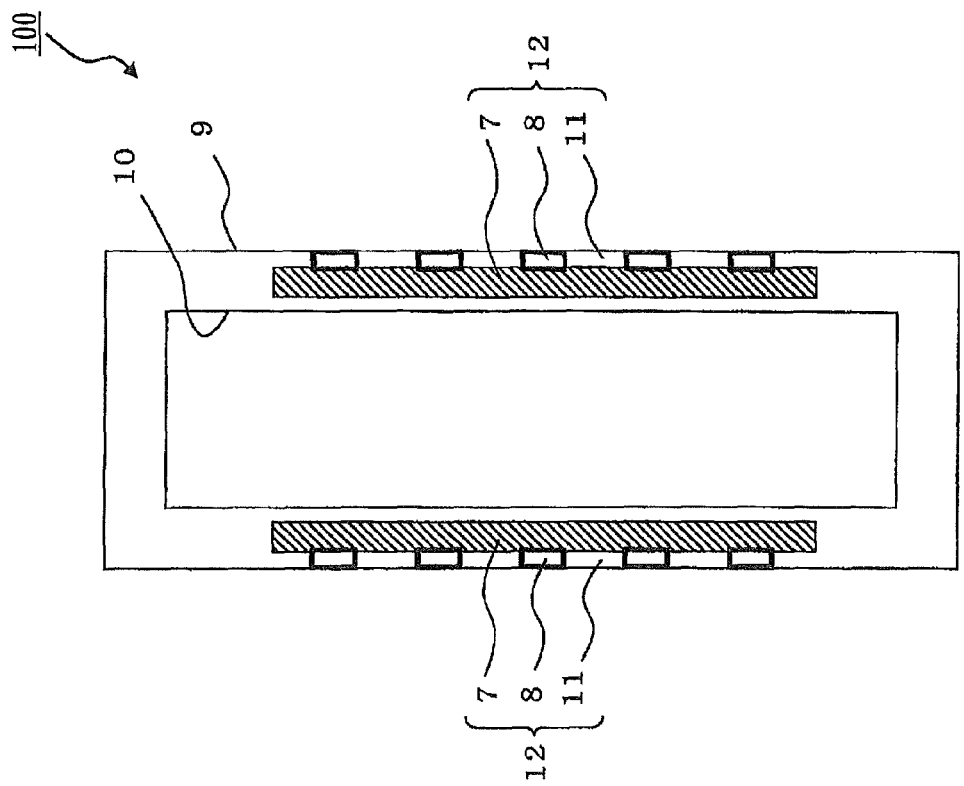
FIG. 21 shows the first embodiment and is a sectional side view of frontal view for explaining a heat insulating box and showing by pattern an application example to a refrigerator 100.

FIG. 21 shows the first embodiment for explaining a heat insulating box and is a sectional side view of frontal view showing an example applied to a refrigerator like a pattern diagram. Since the vacuum heat insulating material 7, the core material 5, or the organic fiber assembly 1, etc. which has been explained in the present embodiment is used for the vacuum heat insulating material 7, the core material 5, or the organic fiber assembly 1, etc. in this example, the heat insulating performance is excellent.

In FIG. 21, a refrigerator 100 includes an external box 9, an internal box 10 arranged inside of the external box 9, the vacuum heat insulating material 7 and a foam insulation 11 arranged in a space between the external box 9 and the internal box 10, and a refrigeration unit (not illustrated) having a compressor for supplying cold energy to the inside of the internal box 10. Here, a heat insulating box body formed by the external box 9 and the internal box 10 is provided with an opening portion at the front face, and an opening/closing door is arranged at the opening portion (none of them illustrated).

Here, if the outer cover material 4 including aluminum foil is used for the outer cover material 4 of the vacuum heat insulating material 7, since the aluminum foil is included, heat may be transferred through the aluminum foil to generate a heat bridge which circulates heat, and the heat insulating performance may be degraded. Therefore, in order to suppress the effect of the heat bridge, the vacuum heat insulating material 7 is arranged separately from a coated steel plate of the external box 9 using a spacer 8 which is a resin molded product. Here, the spacer 8 is provided with a suitable hole for not preventing the flow, so that a void may not be generated in polyurethane form which will be injected into the heat insulating wall at a later step.

Namely, the refrigerator 100 includes a heat insulating wall 12 formed by the vacuum heat insulating material 7, the spacer 8, and the foam insulation 11. Here, a range at which the heat insulating wall 12 including the vacuum heat insulating material 7 is provided is not limited; it can be all or a part of the space formed between the external box 9 and the internal box 10, or the heat insulating wall 12 can be arranged inside of the opening/closing door.

After using, the refrigerator 100 is demolished/recycled at a recycle center at each location according to Electric Appliance Recycling Law. At this time, the refrigerator 100 of the present embodiment includes the vacuum heat insulating material 7 formed by the core material 5 which is the organic fiber assembly 1 (formed by the organic fibers 2). Accordingly, at the time of thermal recycle, the refrigerator 100 does not lower the combustion efficiency nor stay as a residue, that is, the recyclability is good, so that it is possible to carry out crushing process without removing the vacuum heat insulating material 7.

Further, in the refrigerator 100, of which the heat insulating box is provided with the vacuum heat insulating material 7, if the vacuum heat insulating material 7 is a vacuum heat insulating panel of which the core material 5 is inorganic powder, since the powder may fly dispersedly, the heat insulating box as it is cannot be crushed. Accordingly, it is necessary to remove the vacuum heat insulating material 7 from the refrigerator box body with a lot of time and effort.

Further, if the core material 5 of a vacuum heat insulating panel is glass fiber, the heat insulating box can be crushed as it is; however, the crushed glass fiber may be mixed with ground product of polyurethane foam and supplied to thermal recycle. At this time, the recyclability may have a problem that such vacuum heat insulating panel may lower the combustion efficiency or remain as a residue after combustion.

In the present embodiment, since no inorganic fiber such as the glass fiber is included in the core material 5, even if it is crushed, such as glass powder, etc. is not generated. Therefore, harmful effect to the human body due to the glass powder, etc. can be suppressed, and further, it is unnecessary to remove the vacuum heat insulating material 7 from the refrigerator box body with a lot of time and effort. Therefore, it is possible to largely reduce the time for demolishing, the recyclability is good, and the recycling efficiency is extremely improved.

In the above discussion, the refrigerator 100 is shown as an example of the heat insulating box; however, the present embodiment is not limited to this. Various effects which have been discussed above can be obtained when applied to cooling devices or heating devices such as a warmer box, a vehicle air-conditioner, a water heater, a hot-water tank, etc. In addition, the box body having a predetermined shape can be replaced with a heat insulating bag (a heat insulating container) having flexible external and internal bags.

(Refrigerator)

Figure 22:
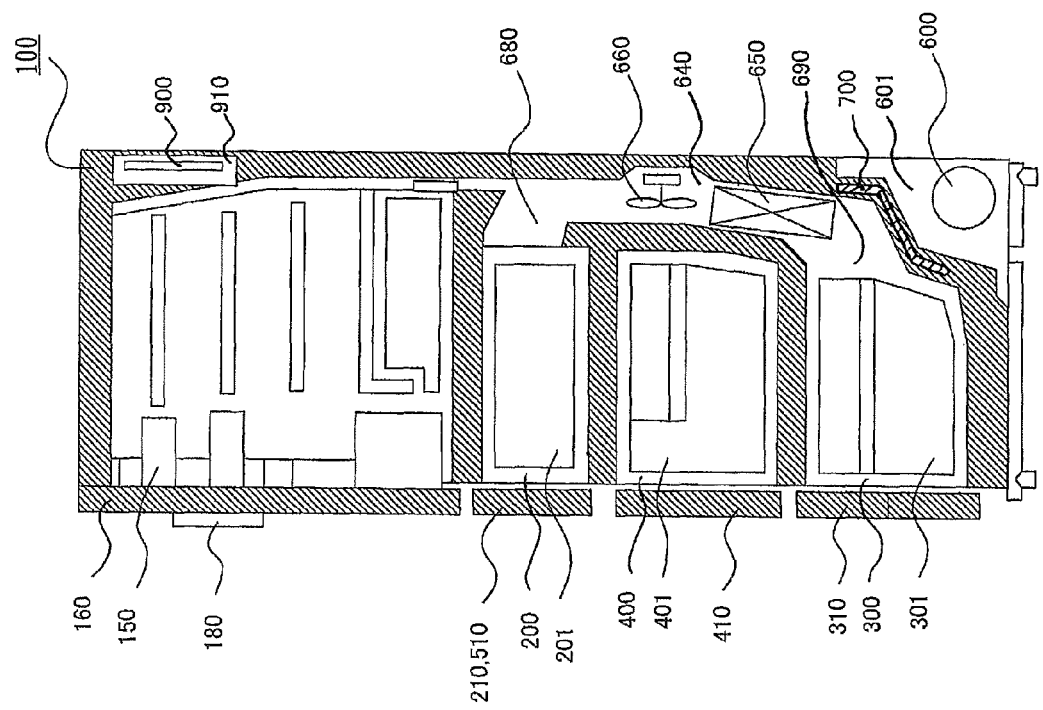
FIG. 22 shows the first embodiment and is a cross sectional view of the refrigerator 100.
Figure 23:
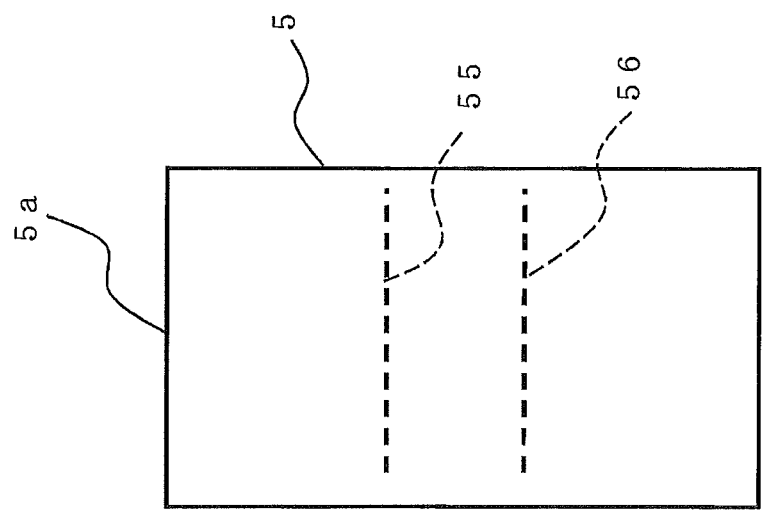
FIG. 23 is a pattern diagram showing the core material 5 of the vacuum heat insulating material 7 used for a heat insulating partition of the refrigerator 100 shown in FIG. 22.
Figure 24:
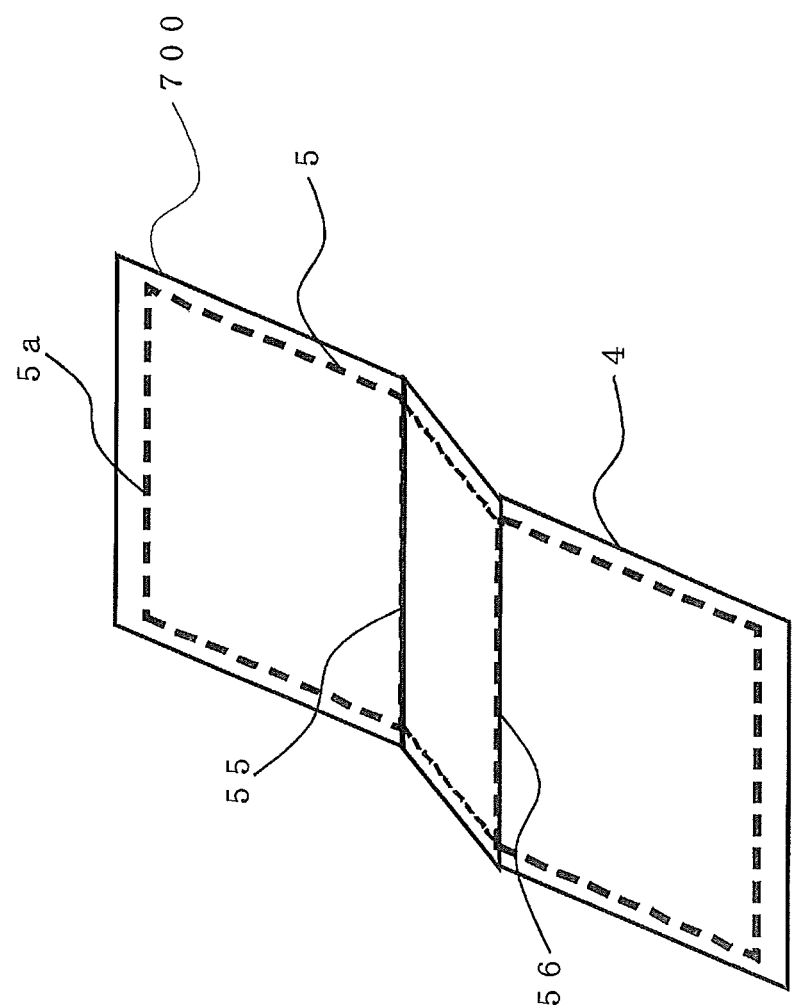
FIG. 24 shows the first embodiment and is a pattern diagram showing the vacuum heat insulating material 7 used for the heat insulating partition of the refrigerator 100.

FIGS. 22 to 24 show the first embodiment; FIG. 22 is a cross sectional view of the refrigerator 100, FIG. 23 shows a pattern diagram showing the core material 5 of the vacuum heat insulating material 7 used for a heat insulating partition of the refrigerator 100 shown in FIG. 22, and FIG. 24 is a pattern diagram drawing showing the vacuum heat insulating material 7 used for the heat insulating partition of the refrigerator 100.

The vacuum heat insulating material 7, 700, the core material 5, and the organic fiber assembly 1, etc. which have been discussed in the above embodiment are used for the vacuum heat insulating material 700, the core material 5, the organic fiber assembly 2, etc. used here, so that the heat insulating performance is excellent.

In the figure, a food storage room of the refrigerator 100 includes a refrigerating room 150 arranged at the topmost part and provided with a refrigerating room door 160 which is the opening/closing door, a switching room 200 which is able to switch the temperature band from the one for frozen storage (−18 degrees Celsius), for cool storage, for vegetables, for chilled storage, for softly freezing (−7 degrees Celsius), etc. arranged at lower to the refrigerating room 150 and provided with a switching room door 210 which is a drawer type door; an ice making room 500 arranged in parallel to the switching room 200 and provided with an ice making room door 510 which is a drawer type door; a freezing room 300 arranged at the lowermost part and provided with a freezing room door 310 which is a drawer type door; and a vegetable room 400 arranged between the freezing room 300 and the switching room 200 and the ice making room 500 and provided with a vegetable room door 410 which is a drawer type door, and so on. On the front side surface of the refrigerating room door 160 of the refrigerator 100 is provided with an operation panel 180 consisting of an operation switch for adjusting temperature or setting of each room and a liquid crystal for displaying a temperature of each room, and so on.

At a lower part of the rear surface side of the refrigerator 100, a machine room 601 provided with a compressor 600 which forms a refrigerating cycle, and a cooler room 640, in which a cooler 650 and a fan 660 for blowing air cooled by the cooler 650 to the refrigerating room 150 or the switching room 200, and so on are arranged.

A cooling air passage 680 for introducing the cooling air cooled by the cooler 650 to the refrigerating room 150 from the cooler room 640 and an air passage 690 for introducing the cooling air cooled by the cooler 650 to the freezing room 300, and so on are provided.

Further, at the top part of the refrigerator 100, on the rear surface of the heat insulating wall arranged at the rear surface of the refrigerating room 150, a control board 900 is contained in a control board containing room 910. The control board 900 is provided with control lead wires and power source wires connected to the compressor 600 and a damper, etc. which opens/closes the cooling air passages for controlling temperatures of the storage rooms such as the refrigerating room 150 or the freezing room 300, etc. by opening/closing control of the compressor 600 and the cooling air passages.

Here, the switching room 200 is provided with a containing case 201, the freezing room 300 with a containing case 301, and the vegetable room 400 with a containing case 401, respectively, and it is possible to store food in these cases.

Here, a vacuum heat insulating material 700 is provided at the heat insulating wall between the machine room 601 located at the lower part of the refrigerator 100 and the cooler room 640. The vacuum heat insulating material 700 can be provided as a single unit or it also can be embedded or arranged in the foam insulation 11.

Namely, the refrigerator 100 of the present embodiment includes a plurality of storage rooms including the refrigerating room 150 provided with the opening/closing refrigerating room door 160, the switching room 200, the freezing room 300, the vegetable room 400, and the ice making room 500, respectively provided with the switching room door 210, the freezing room door 310, the vegetable room door 410, and the ice making room door 510 which are drawer type doors, and so on; the cooler 650 arranged at the rear surface side of the storage rooms through the partition wall for generating cooling air to be blown to the storage rooms; the internal fan 660 for blowing the cooling air generated by the cooler 650 to each storage room; the cooler room 640 arranged at the rear surface side of the storage rooms through the partition wall for containing the cooler and the internal fan; the machine room 601 arranged at the lower part or the upper part of the refrigerator 100 for containing the compressor 600 which forms the refrigerating cycle; the first heat insulating wall arranged between the machine room 601 and the cooler room 640; the second heat insulating wall arranged between the machine room and storage rooms; and the vacuum heat insulating material 7, 700 which is provided at either of the doors of the storage rooms, the first heat insulating wall, or the second heat insulating wall, structured by lamination structure of the organic fiber assembly 1 made by the sheet-shaped organic fiber 2, and formed by inserting the core material 5 having a cutting portion, of which the end face has been cut, into the outer cover material 4, and sealing the sealing portion of the outer cover material around the sheet so as to hermetically seal the inside with almost vacuum status. In the above, the long fiber having at least the same length as the organic fiber assembly 1 is used for the organic fiber 2.

The vacuum heat insulating material 700 provided at the heat insulating wall between the machine room 601 and the cooler room 640 has a Z-shaped complex structure, in which the vacuum heat insulating material 700 is folded at two points as shown in FIG. 22. The vacuum heat insulating material 700 is inserted to the outer cover material 4 with a status of a sheet having a predetermined size, in which the core material 5 formed by laminating the organic fiber assembly 1 made of long fibers and the end face of which is cut. After drying and vacuuming, the vacuum heat insulating material 700 is completed by sealing the inserted portion of the outer cover material 4 with heat deposition, etc.

In the present embodiment, the organic fiber assembly 1 is used for the core material 5, and folded portions 55 and 56 (a hole formation or a groove formation, etc. by melting, for example) such as forming a plurality of small shallow holes or continuous grooves which do not penetrate but can obtain the heat insulating performance on at least one surface of the side desired to fold. Therefore, after completing, the vacuum heat insulating material 700 can be easily folded by the folded portion 55, 56 of the core material 5 with a necessary predetermined angle.

At this time, the size, the groove width, and the depth, etc. are decided appropriately by an experiment, etc. based on the angle to be folded and the amount to be folded, etc.

Further, providing the folded portion 55, 56 at both sides of the folding portion within a range not to penetrate the folding portion makes folding operation easy, so that it becomes possible to fold with a large angle. In addition, since the folded portion 55, 56 does not penetrate the core material 5, the heat insulating performance can be maintained. Further, the long fiber which is longer than the length of the sheet (the length of the long side or the short side of the sheet) having the predetermined size is used for the core material 5, the heat insulating performance is good. Further, since the organic fiber is used for the core material 5, compared with the case of using the glass fiber for the core material, it causes no harmful effect to human body, and the recyclability is also good.

Using laser processing, the hole formation can be easily done even if the hole has a complex shape, and the increase of the temperature can be suppressed at the time of melting, so that it is possible to do the hole formation or the continuous groove formation with a necessary size, width, and depth at only necessary portion. If the laser processing is applied to the embossing process, it becomes unnecessary to prepare a heat roller separately, that is, the equipment investment can be reduced, and the vacuum heat insulating material 7 and the refrigerator 100 can be obtained with a low cost. In the present embodiment, the application example to the refrigerator has been explained; however, the present embodiment can be applied to equipments other than the refrigerator such as a water heater, a freezer, or an air-conditioner, etc. Further, in the present embodiment, the vacuum heat insulating material 700 having the "Z" shaped complex structure with two folded portions has been explained; however, the present embodiment can be easily applied to the vacuum heat insulating material having a "L" shaped structure with one folded portion, a "U" shaped structure with two folded portions, a "C" shaped, "J" shaped, or "W" shaped structure with plural folded portions. Therefore, the vacuum heat insulating material of the present embodiment is applicable to a complex shaped portion (portions of shapes of "Z", "U", "C", "J", or "W", etc., portions having a projection, or portions provided with a piping), to which it has been difficult to mount the vacuum heat insulating material since the folding process or the hole formation are difficult; that is, the vacuum heat insulating material of the present embodiment can be mounted to all kinds of equipments. The equipments such as a refrigerator mounting the vacuum heat insulating material of the present embodiment has a good recyclability, causes no harmful effect on a human body, and it is expected that the heat insulating performance is improved.

Here, the heat insulating wall between the machine room 601 and the cooler room 640 is sometimes penetrated by a piping for connecting the compressor 600 and the cooler 650. In this case, the vacuum heat insulating material 700 can be provided with a through hole 72 (a vacuum heat insulating material opening portion 71) as shown in FIG. 25.

Figure 25:
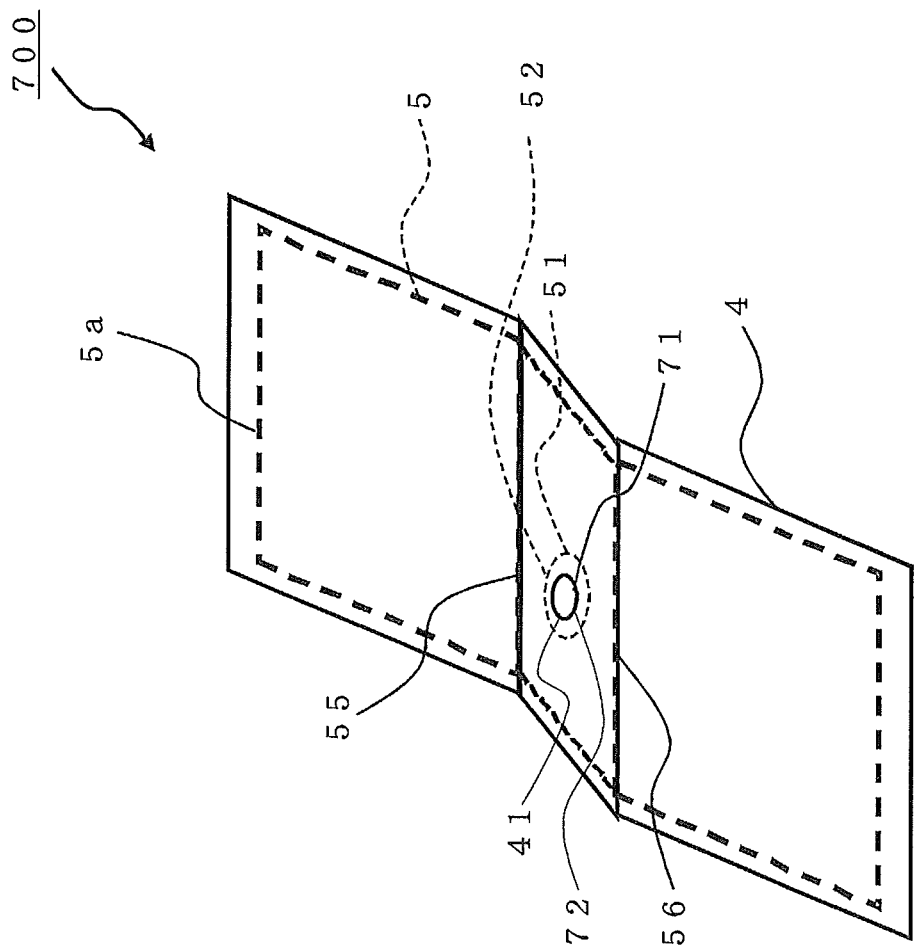
FIG. 25 shows the first embodiment and is a pattern diagram showing the vacuum heat insulating material 7 used for the heat insulating partition of the refrigerator 100.

FIG. 25 shows the first embodiment and is a pattern diagram showing the vacuum heat insulating material 7 used for the heat insulating partition of the refrigerator 100. In this case, the core material 5 is provided with the core material opening portion 51, the outer cover material 4 is provided with the outer cover material opening portion 41 which is smaller than the core material opening portion 51 with a sealing portion being necessary for sealing, and thereby the vacuum heat insulating material 7 having the vacuum heat insulating material opening portion 71 can be obtained. At this time, the through hole 72 which is the vacuum heat insulating material opening portion 71 of the vacuum heat insulating material 700 is sufficient to be a through hole having a hole diameter being larger than a diameter of a piping such as a suction pipe or a discharge pipe, etc. or lead wires for control or for power source, etc. which are desired to penetrate the heat insulating wall, or the through hole 72 can be a shape of notch.

Further, the example case shows that the vacuum heat insulating material 700 of the present embodiment is provided with the through hole 72 which is the vacuum heat insulating material opening portion 71 at a different location from the folded portion 55, 56; however, the through hole 72 can be provided so as to penetrate the folded portion 55, 56 by a piping, etc. At this time, by providing the core material through hole 52 which is the core material opening portion 51 at the portion of the folded portion 55, 56, the vacuum heat insulating material 7 having the through hole can be obtained easily.

Namely, the refrigerator 100 of the present embodiment includes a plurality of storage rooms 150, 200, 300, 400, and 500 including the refrigerating room 150 and the freezing room 300, etc. provided with the opening/closing or drawer type doors 160, 210, 310, 410, and 510; the cooler 650 arranged at the rear surface side of the storage rooms through the partition wall for generating cooling air to the storage rooms; the internal fan 660 for blowing the cooling air generated by the cooler 650 to each storage room; the cooler room 640 arranged at the rear surface side of the storage rooms through the partition wall for containing the cooler and the internal fan; the machine room 601 arranged at the lower part or the upper part of the refrigerator 100 for containing the compressor 600 which forms the refrigerating cycle; the heat insulating wall arranged between the machine room 601 and the cooler room 640; the vacuum heat insulating material 7, 700 which is provided at either of the doors of the storage rooms, the heat insulating wall, structured by lamination structure of the organic fiber assembly 1 made by the sheet-shaped organic fiber 2, and formed by inserting the core material 5 having a cutting portion, of which the end face has been cut, into the outer cover material 4, and sealing the sealing portion of the outer cover material around the sheet so as to hermetically seal the inside with almost vacuum status. In the above, the long fiber having at least the same length as the organic fiber assembly 1 is used for the organic fiber 2. Therefore, the heat insulating performance of the heat insulating material 7, 700 is good, the recyclability is excellent, the sealing fault, etc. may not occur, and thus the reliability is high. Accordingly, equipments such as the refrigerator, etc. using this vacuum heat insulating material have also high performance for a long term and good recyclability.

Here, the example case shows the vacuum heat insulating material 700 is provided at the heat insulating wall between the machine room 601 and the cooler room 640; however, the vacuum heat insulating material opening portion 71 can be applied to the cooling air passage. In this case, the vacuum heat insulating material 700 can be used for a section wall, a partition wall, or a heat insulating wall having the cooling air passage. Further, the vacuum heat insulating material can be provided at the heat insulating wall which forms the cooler room 640.

Further, the vacuum heat insulating material 700 can be provided in the heat insulating wall of the rear surface or the side surface of the refrigerator, a concave groove (a continuous concave groove having a width and a depth which is about the diameter of the piping such as the cooler pipe, etc.), to which a piping such as a cooler pipe can be contained, is formed by heat deposition or laser processing, the piping such as the cooler pipe is arranged within the concave groove, and the heat insulating of the cooler pipe, etc. can be performed.

In particular, when at least two vacuum heat insulating materials 700, to each of which a continuous concave groove having a width of about the diameter (can be no more than the diameter) of the cooler pipe and a depth of about a half of the diameter (can be no more than the diameter) of the cooler pipe, are used, and the piping such as the cooler pipe is fixed so as to be inserted between the two concave grooves of the vacuum heat insulating materials 7, it is possible to further improve the heat insulating performance of the piping such as the cooler pipe. Accordingly, effect of temperature increase to the storage rooms due to the heat discharge or heat absorption of the piping such as the cooler pipe can be reduced and an energy-saving refrigerator 100 can be obtained.

When the refrigerator has a drain-pan function having a drain hole for receiving defrosted water fallen from the cooler 650 through the heat insulating wall between the machine room 601 and the cooler room 640 and discharging the defrosted water to the outside of the refrigerator 100 or the machine room 601, since the vacuum heat insulating material 701 of the present invention includes the vacuum heat insulating material opening portion 71, the vacuum heat insulating material 700 can be arranged so that the location of the vacuum heat insulating material opening portion 71 is almost matched with the one of the drain hole.

Here, in general, when resin foam is filled between the external box 9 and the internal box 10, a gas discharge hole is necessary for filling the resin foam. However, conventionally, when the vacuum heat insulating panel is arranged at the heat insulating wall between the external box and the internal box, the gas discharge hole should be arranged with avoiding the arranged area of the vacuum heat insulating panel, so that the resin foam cannot be filled sufficiently within the heat insulating box body, which may cause manufacturing failure. Then, it is considered that another gas discharge hole is arranged at the internal box; however, this is not sufficient, so that it is considered that the vacuum heat insulating material is adhered to the internal box; however, it is difficult to adhere the vacuum heat insulating material to an inside surface having irregularities of the internal box. Accordingly, because of necessity of securing the gas discharge hole between the vacuum heat insulating material 7, 700 and the external box, it is considered that a spacer is provided for making the vacuum heat insulating material float from the external box so as not to shut the gas discharge hole; however, in this case, the spacer is necessary, the cost should be increased, and further the assemblability may be degraded.

On the other hand, according to the present invention, it is easy to form the vacuum heat insulating material opening portion 71 of the vacuum heat insulating material 7, 700 such as a through hole or a notch, and the vacuum heat insulating material opening portion 71 can be arranged at almost the same location as the gas discharge hole of the external box, so that the vacuum heat insulating material 7, 700 can be adhered to the surface of the external box which is the gap between the external box and the internal box so as not to shut the gas discharge hole without providing the spacer, etc. Further, since the vacuum heat insulating material 7, 700 of the present invention can be folded into a complex shape, it is possible to adhere the vacuum heat insulating material 7, 700 easily to the inside surface having irregularities of the internal box which is the gap between the external box and the internal box. Therefore, the vacuum heat insulating material 7, 700 of the present invention can be adhered between the external box 9 and the vacuum heat insulating material 7, 700, and the vacuum heat insulating material 7, 700 of the present invention can be also adhered between the internal box 10 and the vacuum heat insulating material 7, 700 without providing the spacer, etc., so that it is possible to obtain the heat insulating box or the refrigerator having good heat insulating performance with a low cost.

Here, the vacuum heat insulating material 7, 700 of the present invention can be provided for the heat insulating material of the storage room door such as the refrigerating room door 160, the switching room door 210, the freezing room door 310, the vegetable room door 410, the ice making room door 510, etc. In this case, if the heat insulating material is penetrated by a screw, etc. for fixing a handling part such as a handle provided at the storage room door, the vacuum heat insulating material opening portion 71 of the vacuum heat insulating material 700 can be arranged at almost the same location as the location of the screw portion for fixing the handle. Further, since the heat insulating performance of the vacuum heat insulating material 7, 700 of the present invention is good, it is possible to manufacture the vacuum heat insulating material 7, 700 to be thin, so that the vacuum heat insulating material is applicable to the heat insulation of the top plate of the refrigerator 100.

Here, the vacuum heat insulating material opening portion 71 is formed by sealing the outer cover material 4 around the core material opening portion 51 with the sealing portion (the sealing area 75), and then cutting an unnecessary portion without the core material 5 inside of the sealing portion (the sealing area 75) of the outer cover material 4, and as a result, the through hole 72 is formed on the vacuum heat insulating material 7, 700. At this time, in the vacuum heat insulating material 7, 700, the unnecessary portion without the core material 5 inside of the sealing portion (the sealing area 75) can remain as it is without being cut so as to be the vacuum heat insulating material opening portion 71. In this case, the vacuum heat insulating material 7, 700 does not have the through hole 72 in the vacuum heat insulating material opening portion 71; however, the unnecessary portion without the core material 5 inside of the sealing portion (the sealing area 75) of the outer cover material 4 corresponds to the vacuum heat insulating material opening portion 71.

Therefore, in case of using the vacuum heat insulating material 7, 700 including the core material opening portion 51 but without the vacuum heat insulating material opening portion 72, when it is used for equipments such as the heat insulating box or the refrigerator as it is without forming the through hole 72, after mounting the vacuum heat insulating material to the equipments such as the heat insulating box or the refrigerator at a range which does not cause effect to the sealing property of the sealing portion 75, it becomes possible to do the hole formation or to do screwing, so that the through hole formation of the outer cover material 4 becomes unnecessary, and thus the vacuum heat insulating material, or the equipments such as the heat insulating box, the refrigerator, etc. can be obtained with a low cost.

Therefore, according to the present embodiment, in case of using the vacuum heat insulating material 7, 700 including the core material opening portion 51 in the core material but without having the vacuum heat insulating material opening portion 72 in the heat insulating material, when it is used for heat insulating material of a wall of a house, conventionally, for a through hole for a refrigerating piping or a drain piping of an air-conditioner, in most cases a hole formation is done at the time of mounting the air-conditioner after completing the house so as to match the location where the air-conditioner is placed. However, the location where the air-conditioner is placed, take-out positions of the refrigerant piping or the drain piping can be estimated previously with some degree. Accordingly, the vacuum heat insulating material 7, 700 having the core material opening portion 51 in the core material but without having the heat insulating material opening portion 72 in the vacuum heat insulating material is placed around the estimated take-out positions of the refrigerant piping or the drain piping, and thus it is possible to form take off holes for the refrigerating piping and the drain piping by carrying out the hole formation at the portion of the heat insulating material opening portion 72 of the vacuum heat insulating material 7, 700 after completing the house. In this way, even if the air-conditioner is not mounted at that place, since the outer cover material 4 is provided at the through hole 72, the inside and the outside of the house are not penetrated through, and the heat insulating performance, etc. would not be seriously degraded.

As for the vacuum heat insulating material 700 of the present embodiment, the folded portions 55, 56 and the through hole 72 which is the vacuum heat insulating material opening portion 71 can be formed at the same time on one sheet of the vacuum heat insulating material, so that it is easy to shape when applied to a wall having a complex shape such as the heat insulating wall or the partition wall between the machine room 601 and the cooler room 640 of the refrigerator 100, and further easy to apply to the portion having the through hole portion such as the piping, the lead wires, or the drain hole provided penetrating the heat insulating wall or a portion having a screw portion for fixing the handling portion. In this case, by providing both of the folded portion 55, 56 and the core material opening portion 51 at the core material 5, it is possible to obtain the vacuum heat insulating material 7, which has the opening portion and for which folding process can be done easily. Therefore, it is possible to obtain energy-saving and low-cost refrigerator and equipments having good heat insulating efficiency, cooling efficiency, usability, and processability.

Figure 26:
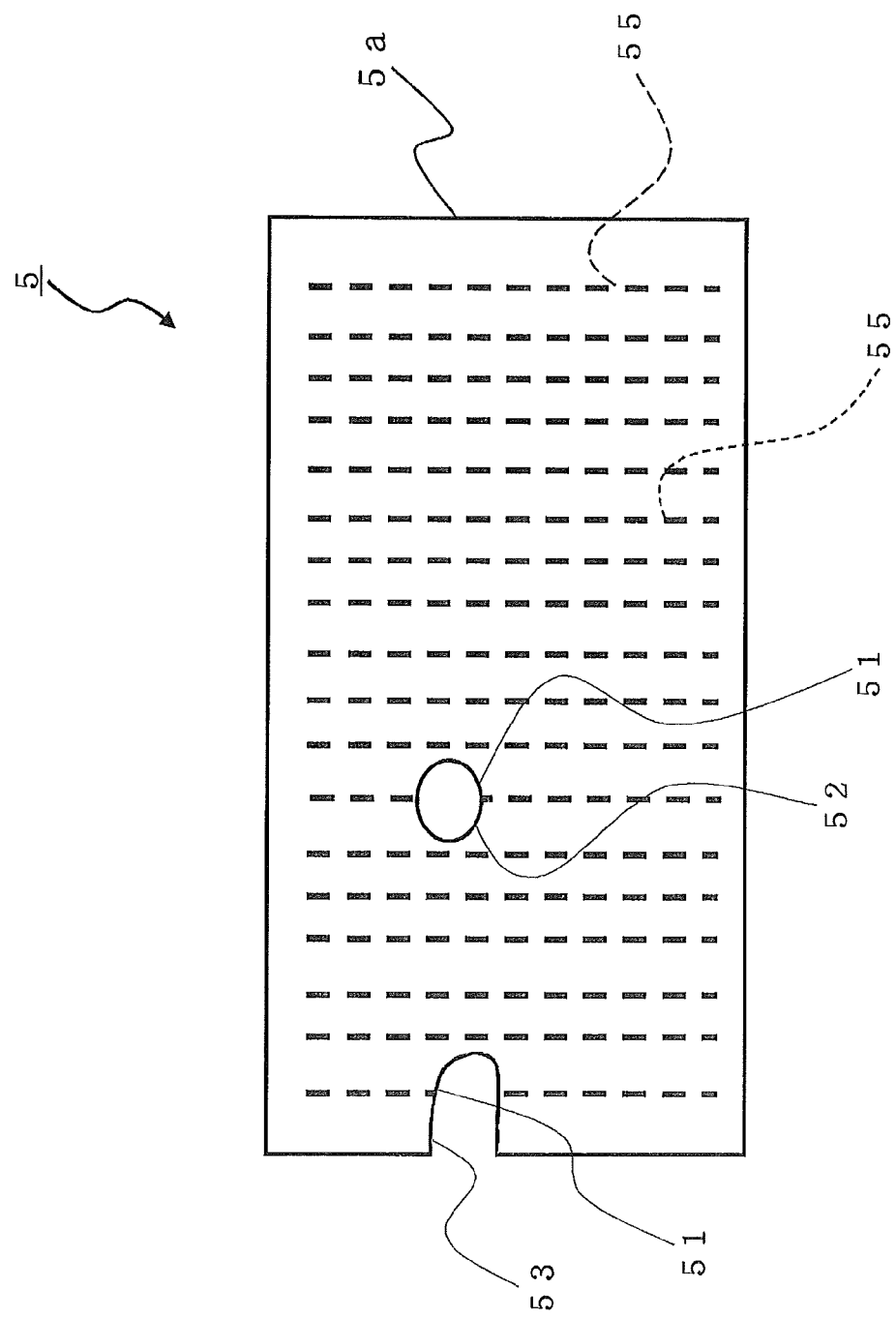
FIG. 26 shows the first embodiment and is a pattern diagram showing the core material 5 of a vacuum heat insulating material 701.
Figure 27:
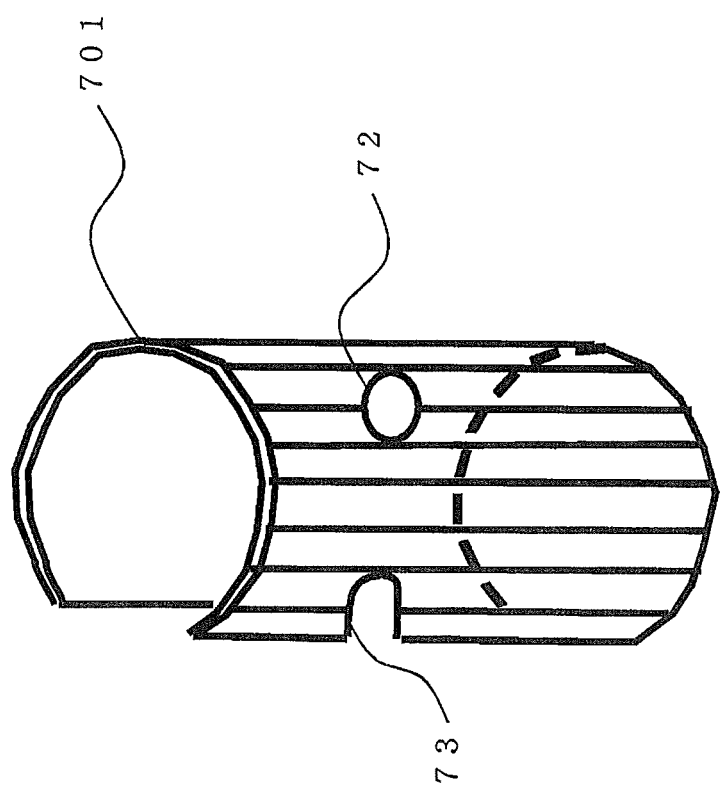
FIG. 27 shows the first embodiment and is a pattern diagram showing the vacuum heat insulating material 701 used for heat insulating of a compressor 600 or a hot water tank of a water heater.

FIGS. 26 and 27 show the first embodiment. FIG. 26 is a pattern diagram showing the core material 5 of a vacuum heat insulating material 701. FIG. 27 is a pattern diagram showing the vacuum heat insulating material 701 used for heat insulating of the compressor 600 or the hot water tank of the water heater.

Since the vacuum heat insulating material 7, 700, the core material 5 and the organic fiber assembly 1, etc. which have been explained in the present embodiment are used for the vacuum heat insulating material 701, the core material 5, the organic fiber assembly 1, etc., the heat insulating performance is excellent.

In the figures, the core material 5 used for the vacuum heat insulating material 701 is structured by laminated structure of the non-woven cloth sheets which are the organic fiber assembly 1. On the core material 5, by the heat roller or the laser processing using which the heat deposited portion such as the embossing 110 is provided, a plurality of the folded portions 55 (for example, the hole formation or the groove formation by welding) such as shallow and small hole formation (or the continuous groove formation) within a range of not penetrating but obtaining the heat insulating performance with a predetermined interval or a necessary interval. Accordingly the vacuum heat insulating material 701 can be folded easily with a predetermined angle after completion by the folded portion 55 of the core material 5, and thus it is possible to surely fold at the desired portion and suppress the undesired portion from being folded or deformed.

According to the present embodiment, the core material 5 is provided with a plurality of the folded portions 55, to which a plurality of hole formations (or continuous groove formation) with a thick interval (having an interval and a depth necessary for being folded) with some degree in the width direction, in the length direction of the folded portion 55 with a predetermined interval or a necessary interval. By folding with the folded portion 55, the vacuum heat insulating material 701 having an almost cylinder shape can be obtained. The vacuum heat insulating material 701 is used for heat insulation of an almost cylinder shaped container such as heat insulation of an outer circumference portion of a hermetic container of the compressor 600 of the refrigerator 100 or the refrigerating/air-conditioner, etc. or heat insulation of an outer circumference portion of a hot water tank of the water heater.

At this time, the size, the groove width, or the depth, etc. of the folded portion 55 is determined appropriately by experiment based on a folding angle or a folding amount, etc.

Further, if the folded portion 55 is provided at a place to be folded on both sides of the core material 5 within a range of not penetrating, the foldability is increased, and the folding process with a large angle can be done. In addition, since the folded portion 55 does not penetrate the core material 5, the heat insulating performance can be maintained. If laser processing is used, it is easy to do a curved face formation or a hole formation of a complex shape. Further, since the temperature increase at the time of melting can be controlled, the hole formation or the continuous groove formation can be done with necessary size, width, or depth at only a necessary portion. If this laser processing is applied to the embossing 110, the heat roller becomes unnecessary to prepare, facility investment can be reduced, and thus it is possible to obtain the vacuum heat insulating material 701, and equipments such as the refrigerator 100, the refrigerating/air-conditioner, the water heater, etc. with a low cost.

Further, as for the vacuum heat insulating material 701 of the present embodiment, the example case shows that the folded portion 55 formed at the core material 5 and the through hole 72 which is the vacuum heat insulating material opening portion 71 are provided at separate places; however, the through hole 72 can be formed to penetrate the folded portion 55, 56 with the piping, etc. In this case, by forming the core material through hole 52 which is the core material opening portion 51 at the folded portion 55, 56 of the core material 5, it is easy to obtain the vacuum heat insulating material 701 having the through hole.

Here, the vacuum heat insulating material 700 of the present embodiment is not necessarily provided at the heat insulating wall between the compressor 600 and the cooler 650, but can be provided at the heat insulating wall between the control board containing room 910 in which the control board 900, etc. are contained and the storage rooms such as the refrigerating room 150. In this case, the vacuum heat insulating material 7, 700 of which processability is easy, the degree of freedom in arrangement is high, and the heat insulating performance is high, can be used, so that no condensation occurs in the control board containing room 910, and thus the refrigerator 100 of high performance and high reliability can be obtained. Further, it is also effective to provide at the heat insulating wall or the partition wall which requires the heat insulating performance between the storage rooms or between the cooler room 640 and the storage rooms. Further, since the vacuum heat insulating material 7, 700 of the present embodiment is excellent in the heat insulating performance, it can be thinned, and also the opening portion which has been folded can be processed easily, so that it is applicable to the top panel, the partition board, and the air passage of the refrigerator 100.

Here, in the present embodiment, as shown in FIGS. 25 to 27, the core material 5 is provided with the through hole 52 and the notch 53, which are the core material opening portions 51, and the vacuum heat insulating material 701 is provided with the through hole 72 and the notch 73, which are the vacuum heat insulating material opening portions 71. In this case, the through hole 52 and the notch 53 are formed on the core material 5, and the through hole 72 and the notch 73 which are smaller than the through hole 52 and the notch 53 with sealing amount necessary for sealing are formed on the outer cover material 4, and thereby the vacuum heat insulating material 701 having the vacuum heat insulating material through hole and the vacuum heat insulating material notch, which are the vacuum heat insulating material opening portions 71, can be obtained. Here, since according to the present embodiment, as discussed above, a predetermined size of sheet, which is made of the laminated structure of the organic fiber assembly 1 formed by long-fibered organic fiber and cut with the end surface, is used for the core material 5, and thus there seldom occurs protrusion or coming-out of the remaining fiber 2a caused by cutting of the end face. Accordingly, the remaining fiber 2a would not protrude and inserted to the sealing portion of the outer cover material 4 to degrade the sealing property. It is possible to shorten the sealing area 75 of the outer cover material 4, and further to obtain highly reliable vacuum heat insulating material which does not cause to degrade the sealing property with a low cost. Further, similarly, it is also possible to shorten the sealing area 75 of the through hole 52, 72 or the notch 73, and thus when it is mounted to the equipments such as the heat insulating box or the refrigerator, etc., the through hole 52, 72 can be used largely, so that the vacuum heat insulating material with a good usability can be obtained. Or, on the contrary, the sealing area 75 of the outer cover material 4 can be decreased its size, and thus the hole diameter of the through hole 52, 72 or the opening width (length) of the notch 53, 73 which is the core material opening portion 51 can be reduced. Consequently, if the vacuum heat insulating material 7, 700, 701 has the through hole 52, 72 or the notch 53, 73, it is possible to have sufficiently large core material 5, so that the vacuum heat insulating material having a good heat insulating performance can be obtained.

The vacuum heat insulating material 701 is used for heat insulation for an almost cylinder-shaped container such as heat insulation around an external circumference of a hermetic container of the compressor 600 of the refrigerator 100 or the refrigerating/air-conditioner, etc. or heat insulation around an external circumference of the hot water tank of the water heater. (The vacuum heat insulating material 7, 700, 701 is arranged so as to cover at least a part of the circumference of the almost cylinder-shaped container.) At this time, the through hole 72 or the notch 73 which is the vacuum heat insulating material opening portion 71 of the vacuum heat insulating material 701 can be a shape of a through hole or a notch having a larger hole diameter than a piping or a lead wire to penetrate; that is, for example, the piping such as the suction piping or the discharge piping, a lead wire for control, or a lead wire for power source, etc. which is desired to penetrate the vacuum heat insulating material 701.

Further, in a heat pump water heater including a container having an almost rectangular cube shape or an almost cylindrical shape, an almost cylindrical hot water tank contained in the container and for reserving water or hot water, a heat source equipment for heating the water of the hot water tank having a refrigerating cycle for heating the water of the hot water tank (for example, a refrigerating cycle connecting a compressor, a first heat exchanger (a heat exchanger for heating water), a squeezer, and a second heat exchanger (an evaporator) to form a circle), it is unnecessary to arrange the vacuum heat insulating material 7, 700, 701 around the hot water tank so as to directly cover the hot water tank. By arranging the vacuum heat insulating material 7, 700, 701 of the present invention at all of or at least a part of an inside wall of a cabinet to cover the inside wall of the cabinet, the heat insulating effect inside of the cabinet can be improved, and thus it is possible to maintain the temperature of the hot water in the hot water tank at a predetermined temperature for a long term, and the energy-saving water heating apparatus (the water heater) can be obtained. Further, the noise reduction can be done, and yet further the recyclabiilty becomes good.

Further, in a refrigerating/air-conditioning apparatus or a water heater which is formed by connecting a compressor, a cooler (or a gas cooler), a decompressor, and an evaporator in series, in which R410A, carbon dioxide ($CO_2$), flammable refrigerant (HC refrigerant, etc.), low GWP refrigerant (R32 or HFO refrigerant) being slightly flammable, etc. are used, if in a cabinet having the almost rectangular cube of an outdoor unit or a heat source equipment, etc, a partition wall is arranged for partitioning a fan room containing the fan and a machine room containing the compressor, the vacuum heat insulating material 7, 700, 701 of the present invention can be applied or can be formed with the cabinet as one body. In this case, the vacuum heat insulating material 7, 700, 701 is desired to apply on the front surface of the internal face of the cabinet; and the vacuum heat insulating material can be applied to five faces except the bottom face (the front face, two side faces (including the partition wall), the back face, and the top face), at least one face of the cabinet, or to a part of one of the faces. At this time, in case of using the conventional vacuum heat insulating material, it is difficult to pull out the piping or lead wires such as the suction piping, discharge piping, the refrigerating piping or the hot water piping, or the control lead wire for controlling the compressor or the water temperature. However, according to the present invention, it is easy to pull them out from the opening portion 71 of the heat insulating material 700, 701 to the outside of the cabinet. This enables to improve the heat insulating performance of the compressor or obtain the effect of noise prevention.

Further, when the slightly flammable low GWP refrigerant (refrigerant having a low global warming potential such as R32, HFO refrigerant, etc.) is used, if non-ignitable flame-retardant material is used for the outer cover material 4 of the vacuum heat insulating material of the present embodiment, even if refrigerant leakage occurs, since the vacuum heat insulating material is non-ignitable, the ignition of the apparatus can be suppressed, and thus it is possible to obtain safe equipments such as the water heater, the refrigerating/air-conditioning apparatus, etc.

Further, in the container having the almost rectangular cubic shape, the partition wall for partitioning the fan room for containing the fan and the machine room for containing the compressor is provided, since at least a part of the inside (or the outside) of the machine room is covered by the vacuum heat insulating material 7, 700, or all or at least a part of the surrounding of the almost cylindrical compressor is covered, the temperature of hot water or the heating performance can be improved, and thus it is possible to provide the energy efficient refrigerator, the refrigerating/air-conditioning apparatus, or equipments. Further, for equipments such as a refrigerator, an automatic vending machine, a cool box, a water heater, a refrigerating/air-conditioning apparatus, etc. having an almost cylindrical compressor, by covering all or at least a part of the surrounding of the almost cylindrical compressor with the vacuum heat insulating material 7, 700 of the present invention, the heat insulating effect is improved, further the noise reduction can be made, and yet further, the recyclability becomes good.

Further, in a heat source device of a heat pump water heater including a refrigerating cycle, as discussed above, a partition wall is provided in an almost rectangular cubic cabinet for partitioning a fan room containing a fan and a machine room containing a compressor, and if the cabinet is structured to have a gas cooler arranged at the bottom portion or the side portion of the fan room or the machine room, all of the internal surface of the machine room or at least a part of the inside (or the outside) of the machine room is provided and covered with the vacuum heat insulating material 7, 700 of the present invention, or all or at least a part of the surrounding of the almost cylindrical compressor is covered. Accordingly, it is possible to feed high-pressure refrigerant gas compressed by the compressor to the gas cooler or the cooler without heat loss, the temperature of hot water or the heating performance can be improved, and thus it is possible to provide the energy efficient heat pump water heater or the calorifier. Further, by providing the vacuum heat insulating material 7, 700 of the present invention inside of the cabinet, there is also an effect to reduce the noise of the fan or the compressor.

Further, if the vacuum heat insulating material 7, 700 of the present invention is used for the heat insulating material for an almost cylindrical container such as a jar pot, etc., since the heat insulating performance is improved, it is possible to keep the contents hot for long hours, and thus equipments such as the jar pot with high energy efficiency can be obtained.

Here, if insulating plastic laminated film is used for the outer cover material 4 of the vacuum heat insulating material 7, 700, when the vacuum heat insulating material is used for the insulating material for neighborhood of the lead wire for control or the lead wire for power source or when the lead wire for control or the lead wire for power source, etc. is used as the insulating material by penetrating through the vacuum heat insulating material opening portion 71, the vacuum heat insulating material functions also as the insulating material, and thus it is possible to obtain safe vacuum heat insulating material 700, 701 with high heat insulating performance, and the equipments using the heat insulating material 700, 701 such as the heat insulating box, the compressor 600, the automatic vending machine, the cool box, the refrigerator 100, the water heater, and the refrigerating/air-conditioning apparatus, etc. In particular, if used for the heat insulating material for neighborhood of a portion where electric appliances are arranged such as a power source connecting unit or a control board, it is possible to obtain an effect to provide further safe equipments.

Further, for the equipments such as the refrigerator 100, the water heater, the refrigerating/air-conditioning apparatus, etc. of the present invention, to facilitate visual understanding of the portion to which the vacuum heat insulating material is arranged at the time of demolishing or recycling, an overall view or a partial view such as a cross section, a development view, a cubic diagram, a perspective view, etc. of the whole equipment is shown on the rear surface or the side surface of the body of the equipment (in case of the refrigerator 100, the rear surface or the side surface of the refrigerator body; in case of the water heater, the side surface or the rear surface of the heat source device, the surrounding of the hot water tank, in case of the electric water heater, the surrounding of the tank, etc.) of the power source box, etc. Accordingly, by showing the arrangement location of the vacuum heat insulating material, the arrangement location of the getter agents, the arrangement location of the adsorption agent, etc., information being useful at the time of demolishing or recycling the equipments is made understandable visually and instantly.

Further, if the size and thickness of the vacuum heat insulating material used, the type or fabric weight of the core material of the vacuum heat insulating material, etc. are also shown, it is possible to easily grasp the quantity or the type of the re-usable core material at the time of recycling.

Further, the material name or the quantity of the core material 5 of the vacuum heat insulating material 7 used in the equipment is shown and that the organic fiber is used for the core material 5 instead of the glass fiber is also shown. For example, by displaying "Glass fiber is not used for the core material of the vacuum heat insulating material used in this product. Since organic fiber (for example, PET) is used for the core material, glass fiber fragments never appear at the time of disassembling or demolishing for recycling the product." and so on, it is possible to obtain the refrigerator 100, the water heater, and the equipments for which disassembling or demolishing is easily done. Therefore, if the core material 5 (organic fiber) of the vacuum heat insulating material 7 is mixed with urethane waste, etc. at the time of recycling and is supplied to thermal recycle, the combustion efficiency of the thermal recycle is not decreased, and the generation of residue is suppressed, so that it is possible to obtain the equipments having a good recyclability such as the refrigerator 100, the water heater, the refrigerating/air-conditioning apparatus, etc. Further, since powder dust due to the shredded glass fiber is not generated at the time of disassembling or demolishing, it is possible to prevent sucking of such powder dust or sticking of the powder dust to the skin, and thus adverse effect to human body can be suppressed.

As has been explained, according to the present embodiment, since the organic fiber assembly 1 of continuous long fibers is used for the core material 5, it is possible to secure the length of remaining fiber generated by the cutting remained on the cutting portion of the non-woven cloth sheet (for example, the cutting portion of the end face of the sheet or the cutting portion of the hole forming or the notch forming) to be long. Accordingly, it is possible to suppress the remaining fiber from coming out of the end face of the cutting portion, and thus there is no protrusion, etc. of the remaining fiber generated by cutting from the cutting portion when the short fibers are used for the core material. Therefore, the sealing property is not degraded by the remaining fiber protruded from the sealed portion when the core material 5 is inserted in the outer cover material 4 and sealed. Further, the non-woven cloth of the organic fibers 2 is used for the core material 5, it is possible to provide the vacuum heat insulating material 7 of which the processability, usability, heat insulating performance, and productivity are excellent, and the equipments having the vacuum heat insulating material 7 such as the heat insulating box, the automatic vending machine, the cool box, the refrigerator 100, the water heater, the refrigerating/air-conditioning apparatus, etc.

Further, in the present embodiment, since the organic fibers 2 is used for the core material 5 of the vacuum heat insulating material 7, compared with the conventional case where the hard and brittle glass fiber is used as the core material, it is possible to prevent flowing of powder dust and sticking to skin/mucous membranes of a worker to give stimulus, and thus the usability and the workability are improved.

Further, in the present embodiment, when plural non-woven cloth sheets of the organic fiber assembly 1 are laminated and used for the core material 5, even if the number of laminated sheets is large and after vacuuming the sheet becomes hard and is not easily folded, by providing the folded portion 55, 56 at the portion which is desired to be folded, the sheet is made easily foldable. Accordingly, it is possible to fold only the portion which is desired to be folded, and prevent from deforming a portion which is not desired to be folded. Therefore, it is possible to obtain the highly reliable vacuum heat insulating material 7, and the equipments having the vacuum heat insulating material 7 such as the heat insulating box, the automatic vending machine, the cool box, the refrigerator 100, the water heater, the refrigerating/air-conditioning apparatus, etc.

Further, since the organic fiber 2 is used for the core material 5 of the vacuum heat insulating material 7, compared with the conventional case where the hard and brittle glass fiber is used as the core material, it is possible to prevent flowing of powder dust and sticking to skin/mucous membranes of a worker to give stimulus, and thus the usability and the workability are improved.

Further, in the present embodiment, plural non-woven cloth sheets of the organic fiber assembly 1 using the long fiber are laminated and used for the core material 5, even if the hole formation or the notch formation is provided on the vacuum heat insulating material 7, fiber fragment would not intrude nor be inserted in the sealing portion. Therefore, it is possible to provide the vacuum heat insulating material 7 for which the core material 5 which is easy to carry out the hole formation or the notch formation and has a good sealing property and an easy usability, and equipments having the vacuum heat insulating material 7 such as the heat insulating box, the automatic vending machine, the cool box, the refrigerator 100, the water heater, the refrigerating/air-conditioning apparatus, etc.

Further, in the present embodiment, the core material 5 of the vacuum heat insulating material 7 is provided with a concave groove having an almost similar shape to the piping shape (a concave groove having an almost circular cross section) using the heat roller or laser processing, etc., and the piping is arranged to the concave groove. Accordingly, it is possible to obtain the vacuum heat insulating material 7 in which the heat leakage from the piping is less, and the equipments having the vacuum heat insulating material 7 such as the heat insulating box, the automatic vending machine, the cool box, the refrigerator 100, the water heater, the refrigerating/air-conditioning apparatus, etc.

The vacuum heat insulating material of the present invention can be applied to the wall, the ceiling, or the floor surface of a housing or a store, etc. Since the glass material is not used for the core material 5 in the vacuum heat insulating material 7, 700 of the present invention, at the time of constructing or demolishing the housing, it is possible to prevent flowing of powder dust of the glass fiber and sticking to skin/mucous membranes of a worker to give stimulus, and thus the usability, the workability, and the safeness, and the recyclability are improved. Further, it is possible to provide the vacuum heat insulating material opening portion 71, the vacuum heat insulating material can be easily provided or arranged at the pulling-out portion of the refrigerant piping or the lead wire for control, a ventilating opening portion, the pulling-out portion of the power source wire, the water supply piping, or the drainage piping of the refrigerating/air-conditioning apparatus such as the air-conditioner, etc., or the pulling-out portion of wiring for telephone or the Internet. Further, since the folding processing is easy, it is easy to apply to a curved surface or a bended portion.

From the above, in the present embodiment, the core material 5 structured by the laminated structure of the organic fiber assembly 1 made by forming the organic fiber 2 into a sheet shape and having a cutting portion on which the end face (for example, the end face 5a) is cut so as to obtain a predetermined length (for example, the core material 5 structured by the laminated structure of the organic fiber assembly 1 made by forming the organic fiber 2 into a sheet shape and cutting the end face la, or the core material 5 structured by after laminating the organic fiber assembly 1 made by the organic fibers 2 formed into a sheet shape, cutting the end face 5a with the predetermined length (or the width); a gas-barrier outer cover material 4 containing the core material 5 inside, having a sealing portion 45 for sealing surrounding of the cutting portion within a range being longer than the cutting portion (for example, the end face 5a) of the core material 5 with a sealing length amount; and the vacuum heat insulating material 7, 700, 701 in which the inside of the outer cover material 4 is hermetically sealed by sealing the sealing portion 45 of the outer cover material 4 are included. Since the long fiber having the same or longer than the length (or the width) of the core material 5 of which the end face is cut (or the sheet of which the end face is cut) is used for the organic fiber 2, the remaining fiber 2a does not protrude from the cutting face (the end face 5a) of the end face of the sheet of the core material 5 facing to the sealing portion 45, and the sealing failure, etc. would not occur. Accordingly, it is possible to obtain the high-performance and highly reliable vacuum heat insulating material 7, 700, 701 which does not generate the sealing failure, etc., the recyclability is good, and the heat insulating performance is hardly degraded.

Further, the core material 5 structured by a laminated structure of the organic fiber assembly 1 made by forming the organic fiber 2 into a sheet shape and cutting the end face 1a so as to become a predetermined length, or the core material 5 structured by after laminating the organic fiber assembly 1 which is the organic fiber 2 formed into a sheet shape, and cutting the end face 5a so as to become a predetermined length (or the width), and having the core material opening portion 51 provided with the opening portion such as the through hole 52 and the notch 53, etc. by cutting, the gas-barrier outer cover material 4 containing the core material 5 inside, having the sealing portion 45, 78 for sealing the surrounding of the end face la, 5a and the surrounding of the core material opening portion 51 of the core material 5 (or the sheet-shaped organic fiber assembly 1), and hermetically sealing the inside in an almost vacuum status by sealing the sealing portion 78; and the outer cover material opening portion 41 such as the through hole or the notch, etc. provided at the outer cover material 4 with a status in which the sealing portion 45, 78 provided around the end face 1a, 5a and around the core material opening portion 51 of the core material 5 (or the sheet-shaped organic fiber assembly 1) having the hole diameter (for example, the diameter) or the length (or the width) of the opening portion being smaller than the core material opening portion 51 with the length of the sealing area 75 are included. Accordingly, since the long fiber having the length being the same or longer than the length (or the width) of the sheet of the core material 5 of which the end face 1a, 5a is cut is used for the organic fiber 2, that is, the long fiber (for example, the continuous fiber or the fiber having the length being the same or longer than the length of the sheet) is used, if the core material opening portion 51 such as the through hole or the notch is provided by cutting (cutoff), fiber waste of a cut fiber 2b cut by cutting or the remaining fiber 2a on the remaining portion of the sheet does not protrude, the sealing failure does not occur, and thus it is possible to obtain the vacuum heat insulating material 7, 700, 701 of which recyclability is good and the heat insulating performance is not degraded and the heat insulating box and the equipments using the vacuum heat insulating material 7, 700, 701.

Further, the thickness of the organic fiber assembly 1 is, when the organic fiber assembly is contained inside of the gas-barrier container (the outer cover material 4) with an almost vacuum state (decompressurized state), at least three times and no more than eighteen times of the fiber diameter of the organic fibers 2, and thus the heat insulating performance is improved compared with a case using the cottonlike fiber for the core material 5. Further, the productivity is also improved, so that it is possible to obtain highly reliable vacuum heat insulating material 7 having high heat insulating performance with a low cost.

Further, the organic fiber assembly 1 is formed in a sheet-shape by applying heat deposition on continuous organic fiber 2, and an area of the heat deposited portion is made no more than 20%, preferably no more than 15% of an area of the sheet and thus while maintaining the handling strength, it is possible to obtain reelable long-fibered non-woven cloth having high heat insulating performance and the vacuum heat insulating material 7.

Further, the organic fiber assembly 1 is formed in a sheet-shape by applying heat deposition on continuous organic fiber 2, and the fabric weight of the non-woven cloth which is the organic fiber assembly 1 is at least 4.7 $g/m^2$ and no more than 70 $g/m^2$, or at least 140 $g/m^2$ and no more than 198 $g/m^2$ and the heat deposited portion is made to penetrate from the front surface to the rear surface of the organic fiber assembly 1 in the thickness direction of the sheet. Accordingly, it is possible to obtain the non-woven cloth, the heat insulating material 7, the heat insulating box, the equipments using the heat insulating material 7 such as the refrigerator 100, the water heater, the jar pot, etc., which secure necessary heat insulating performance, is easy to manufacture, and has excellent recyclability. Further, it is possible to obtain the heat insulating material 7 of which the core material 5 has a good usability and has high heat insulating performance.

Further, the organic fiber assembly 1 is formed in a sheet-shape by applying heat deposition on continuous organic fiber 2, and the fabric weight of the non-woven cloth which is the organic fiber assembly 1 is at least 4.7 $g/m^2$ and no more than 100 $g/m^2$, and the heat deposited portion is made not to penetrate from the front surface to the rear surface of the organic fiber assembly 1. Accordingly, it is possible to obtain the non-woven cloth, the heat insulating material 7, the heat insulating box, the equipments using the heat insulating material 7 such as the refrigerator 100, the water heater, the jar pot, etc., which secure necessary heat insulating performance, is easy to manufacture, and has excellent recyclability. Further, it is possible to obtain the heat insulating material 7 of which the core material 5 has a good usability and has high heat insulating performance.

Further, the fabric weight of unwoven cloth being the organic fiber assembly 1 is made at least 85 $g/m^2$ and not more than 198 $b/m^2$ so as to suppress deformation of the organic fiber assembly 1 due to the temperature or compression force at the time of vacuum forming. Therefore, the thickness of one sheet becomes thick enough to suppress strain, and thus the stiffness against the compression is obtained. Since deformation hardly occurs at the time of vacuum forming, shape defect due to the deformation does not occur, and the highly reliable vacuum heat insulating material 7 can be obtained.

Further, if the heat insulating performance is emphasized more (if the heat conductivity is desired to be no more than 0.002 [W/mK] which is equivalent to the conventional one using the glass fiber for the core material), the fabric weight of the non-woven cloth sheet (the organic fiber assembly 1) can be made at least 4.7 $[g/m^2]$ and no more than 26 $[g/m^2]$, and it is expected to improve the heat insulating performance. Further, if deformation (compressive strain) is desired to be suppressed, the fabric weight of the non-woven cloth sheet can be made at least 110 $[g/m^2]$ and no more than the fabric weight of the case in which the number of lamination is one (no more than 198 $[g/m^2]$, for example), and thus the vacuum heat insulating material with less deformation and good usability can be obtained. Further, if it is desired to suppress the deformation (compressive strain) of the non-woven cloth sheet and further improve the heat insulating performance to some extent (if the heat conductivity is desired to be no more than 0.003 [W/mK] which is equivalent to the conventional one using the cottonlike fiber for the core material), the fabric weight of the non-woven cloth sheet is made at least 140 $[g/m^2]$ and no more than 198 $[g/m^2]$, and thus the vacuum heat insulating material can be obtained, of which deformation (compressive strain) is small, of which the core material has a good usability, and has high heat insulating performance.

Further, the core material 5 structured by a laminated structure of the organic fiber assembly 1 made by forming the organic fiber into a sheet shape and applying heat deposition, and having a cutting portion in which the end face 5a is cut so as to be a predetermined length, a gas-barrier outer cover material 4 containing the core material 5 inside, having a sealing portion 78 for sealing surrounding of the cutting portion with a range of being larger than the cutting portion of the core material 5 with the sealing length (the sealing area 75), the vacuum heat insulating material 7, 700, 701 in which the inside of the outer cover material 4 is hermetically sealed in almost vacuum status by sealing the sealing portion 45, 78 of the outer cover material 4 are included. The thickness of the fiber assembly (the non-woven cloth sheet) 1 is made at least 3 times and no more than 18 times of the average fiber diameter, the fabric weight of the fiber assembly (the non-woven cloth sheet) is made at least 4.7 $g/m^2$ and no more than 70 $g/m^2$, and the range to which the heat deposited portion is provided in the fiber assembly (the non-woven cloth sheet) is made no more than 20% of the sheet area (preferably, no more than 8%). Thus it is possible to obtain the non-woven cloth, the vacuum heat insulating material, of which the heat conductivity is small, the heat insulating performance is high, the productivity is good, easy to manufacture, the sheet usability is good, and the recyclability is good, and the equipments using the vacuum heat insulating material such as the heat insulating box, the refrigerator, the water heater, the jar pot, the refrigerating/air-conditioning apparatus, the showcase, etc. Further, since organic fibers 2 are heat-deposited with each other, and the organic fiber assembly 1 hardly becomes ragged, the usability is improved. Further, since appropriate pressure, heat deposition is applied, it is possible to suppress the increase of the contacting area between the organic fibers 2, the heat conduction from the heat deposited portion due to the increase of the heat transfer can be suppressed, and the degradation of the heat insulating performance can be suppressed. Further, in addition to the effect to improve the heat insulating performance, the productivity is improved, the production cost can be reduced, so that it is possible to obtain a low-cost, high performance, highly reliable vacuum heat insulating material, and the equipments using the vacuum heat insulating material such as the heat insulating box, the refrigerator, the water heater, the jar pot, the refrigerating/air-conditioning apparatus, the showcase, etc.

Further, if the thickness of the organic fiber assembly 1 (the non-woven cloth sheet) is made at least 3 times and no more than 18 times of the average fiber diameter, the fabric weight of the organic fiber assembly 1 (the non-woven cloth sheet) is made at least 98 $[g/m^2]$ (preferably, at least 140 $[g/m^2]$) and no more than 198 $[g/m^2]$, and the range to which the heat deposited portion is provided in the organic fiber assembly (the non-woven cloth sheet) is made no more than 20% of the sheet area (preferably, no more than 8%). Thus it is possible to obtain a predetermined heat insulating performance. Further it is possible to obtain the non-woven cloth, the vacuum heat insulating material, of which deformation hardly occurs, the productivity is good, easy to manufacture, the sheet usability is good, the reliability is high, and the recyclability is good, and the equipments using the vacuum heat insulating material such as the heat insulating box, the refrigerator, the water heater, the jar pot, the refrigerating/air-conditioning apparatus, the showcase, etc. Further, since organic fibers 2 are heat-deposited with each other, and the organic fiber assembly 1 hardly becomes ragged, the usability is improved. Further, since appropriate pressure, heat deposition is applied, it is possible to suppress the increase of the contacting area between the organic fibers 2, the heat conduction from the heat deposited portion due to the increase of the heat transfer can be suppressed, and the degradation of the heat insulating performance can be suppressed. Further, in addition to the effect to improve the heat insulating performance, the productivity is improved, the production cost can be reduced, so that it is possible to obtain a low-cost, high performance, highly reliable vacuum heat insulating material, and the equipments using the vacuum heat insulating material such as the heat insulating box, the refrigerator, the water heater, the jar pot, the refrigerating/air-conditioning apparatus, the showcase, etc.

Further, since the cross sectional shape of the fiber structuring the organic fiber assembly 1 is made modified cross-sectional shape such as an almost triangular shape or a C shape, the cross sectional shape of the organic fiber 2 is made an almost triangular shape having almost the same cross section area as the fiber having an almost circular cross section, and thereby compared with the fiber having the almost circular cross section having almost the same cross sectional area, the second moment of area is large and the stiffness is improved, thus the deflection of fiber is decreased at the time of receiving atmospheric pressure, and the heat insulating performance of the vacuum heat insulating material 7 is improved.

Further, if the cross section of the organic fiber 2 is the C shaped cross section, since the cross section is deformed to a pipe shape (a hollow almost circular shape) when compressed by pressure at the time of forming, the heat transfer becomes worse due to its pipe shape than a case of using the fiber having an almost circular cross section, and thus the heat insulating performance is improved.

Further, since the core material 5 is formed by folding and laminating the organic fiber assembly 1, the folded portion is not necessary to be cut, namely, the number of end faces which need to be cut can be reduced, and thus a cutting step can be saved, and the core material 5 can be produced efficiently in a short time with a low cost. Accordingly, it is possible to manufacture the low-cost vacuum heat insulating material 7, 700, and 701.

Further, since the core material 5 is laminated with combining the core materials 5 of a plurality of types of different fabric weights, compared with a case of laminating the core materials having the same thickness, if the thickness of lamination is the same, the strain can be reduced for the core material 5 totally. Yet further, compared with a case of laminating the core materials having low fabric weight to form into the same thickness, necessary heat insulating performance can be secured, and further, since the predetermined stiffness can be obtained, it is possible to obtain the vacuum heat insulating material 7, 700, and 701 having a good heat insulating performance, with less deformation, high performance, and high reliability.

Further, the core material 5 is formed by the first organic fiber assembly 1x folded and laminated and the second organic fiber assembly 1y folded and laminated, and the first organic fiber assembly 1x and the second organic fiber assembly 1y are interfolded so as to mutually intersect, so that the intermediate part of the sheets becomes a point contact, which improves the heat insulating performance more. Further, when fabric weights of the first organic fiber assembly 1x and the second organic fiber assembly 1y are different, compared with a case of laminating the assemblies having the same thickness, if the thickness is the same, the strain can be reduced totally as the core material 5. In addition, since the thickness can be reduced compared with a case of laminating the same number of sheets of the organic fiber assembly of which the fabric weight is higher, it is possible to obtain the vacuum heat insulating material 7 with a good heat insulating performance, with less thickness in the lamination, less deformation by the strain, and high reliability. Yet further, compared with a case of laminating the same number of sheets having low fabric weight, necessary heat insulating performance can be secured, and further, since the predetermined stiffness can be obtained, it is possible to obtain the vacuum heat insulating material 7, 700, and 701 having a good heat insulating performance, with less deformation, high performance, and high reliability.

Further, since the organic fiber 2 is continuous in the length or width direction of the organic fiber assembly 1, it is possible to maintain the length of the remaining fiber 2a, which is generated on the cutting portion (for example, the end face 1a, 5a, the cutting portion 52 of the hole formation, or the cutting portion 53 of the notch formation) of the non-woven cloth sheet of the organic fiber assembly 1 by cutting, long. Accordingly, it is possible to suppress protrusion of the remaining fiber 2a from the end face of the cutting portion, that is, the protrusion, etc. of the remaining fiber 2a, which is generated on the cutting portion by cutting in case of using the short fiber for the core material 5, does not occur. Therefore, the sealing property is not degraded by the remaining fiber 2a which protrudes when the core material 5 is inserted into the outer cover material 4 and sealed.

Further, in the present invention, since the long fiber being continuous in the length or width direction of the organic fiber assembly 1 is used for the organic fiber 2, it is possible to maintain the length of the remaining fiber 2a, which is generated on the cutting portion (for example, the end face 1a, 5a, the cutting portion 52 of the hole formation, or the cutting portion 53 of the notch formation) of the organic fiber assembly 1 (the non-woven cloth sheet) by cutting, long. Accordingly, it is possible to suppress protrusion, etc. of the remaining fiber generated on the cutting portion by cutting in case of using the short fiber for the core material. It is unnecessary to make the sealing length long with considering the protrusion of the remaining fiber such as the conventional case of using the short fiber. Therefore, the length of the sealing portion of the outer cover material 4 can be shortened, and thus a compact low-cost vacuum heat insulating material can be obtained. Further, if the size of the outer cover material 4 is the same, compared with the conventional case of using the short fiber, the size of the core material 5 (the length or the width of the sheet) can be increased with the protruded length (for example, about 1 mm to 10 mm) of the remaining fiber, that is, a heat insulating area can be made large, and thus the heat insulating performance is improved.

Further, since the organic fiber 2 of the organic fiber assembly 1 is either of polyester, polystyrene, polypropylene, polylactate, aramid, and liquid polymer, the processability, the usability, the heat insulating performance, and the productivity are excellent.

Further, the external box 9 and the internal box 10 arranged inside of the external box 9 are included, the vacuum heat insulating material 7 of the above-discussed present embodiment is provided at the space between the external box 9 and the internal box 10, so that it is possible to obtain the heat insulating box having good processability, usability, heat insulating performance, or productivity and further the vacuum heat insulating material 7 with a good heat insulating performance and the refrigerator 100 having the heat insulating box.

Further, since the spacer 8 is provided between the external box 9 and the vacuum heat insulating material 7, the heat ingression from the outside can be insulated by the vacuum heat insulating material 7 through the spacer 8, which improves the heat insulating efficiency. Further, the heat ingression into the internal box 10 is also through urethane, etc.; that is, after insulating heat by the vacuum heat insulating material 7 and insulating further using urethane, etc., it is possible to reduce the heat quantity invaded into the refrigerator, and thus the heat insulating performance can be improved. Further, the strength of the box body can be secured by the external box 9, the internal box 10, the foam insulation 11 (urethane), and the spacer 8.

Further, the heat insulating wall between the machine room 601 containing the compressor 600 and the cooler room 640 containing the cooler 650 has a Z-shape folded at two points or a complex shape folded at least three points (W-shaped or curved-face shaped), and the core material 5 is provided with the vacuum heat insulating material 7, 700 of the present embodiment, so that it is easily form the vacuum heat insulating material with a low cost, good recyclability, and high heat insulating performance even if it is applied to a zigzag shape such as the heat insulating wall of the refrigerator 100.

Further, after completing, the vacuum heat insulating material 700 can be folded easily at the folded portion 55, 56 of the core material 5 with a necessary predetermined angle, so that it is possible to form the vacuum heat insulating material 700 which can be easily processed and has a good heat insulating performance, and thus the refrigerator 100 with high heat insulating performance can be provided with a low cost.

Further, the long fiber of the organic fiber 2, having the length of at least the length (or the width) of the core material sheet in a status where the end face is cut, is used for the sheet-type core material 5 of which the end face 5a is cut so as to have a predetermined length (or the width), the vacuum heat insulating material 7, 700 is provided with the vacuum heat insulating material opening portion 71 such as the through hole 72 or the notch 73, etc., and the vacuum heat insulating material 7, 700 is arranged so that the piping connecting the vacuum heat insulating material opening portion 71 of the vacuum heat insulating material 7, 700 and the cooler 650 passes through the vacuum heat insulating material opening portion 71 of the vacuum heat insulating material 7, 700. Even if there is an obstacle for arranging the vacuum heat insulating material 7, 700 such as piping of the suction piping or the discharge piping, etc. or the lead wires for control or power source, etc., it is possible to arrange the vacuum heat insulating material 7, 700 of which is the opening portion such as the through hole 72 or the notch 73, etc. has easy processability, and thus it is possible to provide the refrigerator 100 which has high degrees of freedom in arrangement and high heat insulating performance.

Further, the refrigerating/air-conditioning apparatus such as the air-conditioner includes the internal unit placed indoor for conditioning indoor air and the external unit having the cabinet having a shape of an almost rectangular cube and the partition wall for partitioning the fan room containing the fan and the machine room containing the compressor inside of the cabinet, and the vacuum heat insulating material 7, 700, 701 of the present embodiment is provided at least a part of the inside (the partition wall inside of the machine room, the cabinet, or around the compressor, etc.) or the outside (the cabinet forming the machine room or the external wall of the partition wall, etc.) of the machine room structured by the cabinet and the partition wall, so that the heat insulating of the machine room or the compressor can be carried out, the heating capacity can be improved, and thus it is possible to provide the refrigerating/air-conditioning apparatus or equipments.

Further, an almost cylindrical container such as the compressor 600 or a tank, etc. is provided, and the above discussed vacuum heat insulating material, in which the long fiber of the organic fiber 2 having at least the same length as the length of the core material sheet (or the organic fiber assembly 1) of which the end face is cut is used for the core material 5, is formed around the almost cylindrical container, so that it is possible to obtain the equipment with a good heat insulating performance.

Further, even if there is an obstacle at providing the vacuum heat insulating material such as water heater piping such as the suction pipe or the discharge pipe or lead wires for control or power source, etc., since the vacuum heat insulating material of which the opening portion such as the through hole 72 or the notch 73 can be easily processed is provided with a low cost, the equipments of which the degree of freedom is high, having a good recyclability and high heat insulating performance can be supplied with a low cost.

According to the present embodiment, a method for manufacturing a vacuum heat insulating material includes: a collecting step for extruding heat-deposited organic resin such as polyester or polystyrene, etc. in a continuous state from a plurality of aligned nozzles and collecting on a conveyer as a plurality of organic fibers (fibers having a fiber diameter of about at least 3 μm and no more than 15 μm); a reeling step for feeding the conveyer at a predetermined speed, and producing an organic fiber assembly 1 in a reeled sheet state by applying pressure with a roller and heat deposition (for example, embossing process); a core material processing step for making a core material 5 having a predetermined size by cutting an end face of the organic fiber assembly 1 produced by the reeling step; a decompressing step for inserting the core material 5 into an outer cover material 4 from an insertion opening 4a and decompressing an inside to an almost vacuum state; and an outer cover material sealing step for sealing the insertion opening 4a of the outer cover material 4 of which the inside is decompressed to the almost vacuum state at the decompressing step. Accordingly, continuous formation of the organic fiber can be easily done, and it is easy to form the long-fibered organic fiber assembly 1 made of continuous organic fiber. Further, by controlling extrusion amount (discharge amount) of the molten resin and the speed of the conveyer, it is easy to manufacture the organic fiber assembly 1 having different thickness or the organic fiber assembly 1 having different fabric weight. Further, by changing the hole diameter of the nozzles, it is easy to change the fiber diameter of the organic fiber. Further, since the long-fibered organic fiber is used for the core material 5 or the organic fiber assembly 1, even if the end face is cut, the remaining fiber 2a does not protrude from or come out of the end face to the sealing portion 45 of the outer cover material 4. Thus, it is possible to obtain the highly reliable vacuum heat insulating material in which the sealing failure hardly occurs and the degree of vacuum hardly decreases.

Further, according to the present embodiment, the method for manufacturing the vacuum heat insulating material includes: an extruding step for continuously extruding heated and melted organic resin such as polyester or polystyrene, etc. in a predetermined width from a plurality of aligned nozzles; a fiberizing step for cooling the resin continuously extruded from the nozzles at the extruding step and then stretching by compressed air to fiberize, or a fiberizing step for blowing high-temperature air with a temperature being almost equal to a melting temperature of the resin from neighborhood of holes of the nozzles (for example, beside the extruding hole of the nozzles) to the resin extruded from the nozzles and a fiber collecting step for collecting a plurality of organic fibers (fibers having a fiber diameter of about at least 3 μm and no more than 15 μm) fiberized at the fiberizing step on the conveyer. Accordingly, it is possible to manufacture continuous long fibered organic fiber from the molten resin by a simple structure. Further, by controlling extrusion amount (discharge amount) of the molten resin and the speed of the conveyer, it is easy to manufacture the organic fiber assembly 1 having different thickness or the organic fiber assembly 1 having different fabric weight. Further, by changing the hole diameter of the nozzles, it is easy to change the fiber diameter of the organic fiber.

Further, according to the manufacturing method of the vacuum heat insulating material of the present embodiment, at the core material processing step, after laminating a plurality of the organic fiber assembly 1, the end face is cut so as to form the core material 5, and thus only laminating the plurality of the organic fiber assembly 1, it is possible to easily manufacture the organic fiber assembly 1 using continuous organic fiber with a predetermined size.

Further, according to the manufacturing method of the vacuum heat insulating material of the present embodiment, at the core material processing step, the organic fiber assembly 1 is reeled by the almost cylindrical roller, and after the tubular state organic fiber assembly 1 is formed into sheet shape, the end face is cut so as to form the core material 5 of the predetermined size, and thus at the time of manufacturing the core material 5, only tubular opening end face needs to be cut. Since the number of cutoff portions can be reduced, it is possible to obtain the vacuum heat insulating material which can improve the workability with a low cost.

Further, according to the manufacturing method of the vacuum heat insulating material of the present embodiment, since a range of the area on which heat deposition is applied is made no more than 20% (preferably, no more than 15%, and more preferably, no more than 8%) of the total area of the organic fiber assembly 1, the organic fibers 2 are heat-deposited with each other, and the organic fiber assembly 1 hardly becomes ragged, the usability is improved. Further, since appropriate pressure, heat deposition is applied, it is possible to suppress the increase of the contacting area between the organic fibers 2, the heat conduction from the heat deposited portion due to the increase of the heat transfer can be suppressed, and the degradation of the heat insulating performance can be suppressed.

Further, according to the manufacturing method of the vacuum heat insulating material of the present embodiment, since the core material is manufactured so that the fabric weight of the organic fiber assembly 1 is made at least 4.7 $g/m^2$ and no more than 26 $g/m^2$, it is possible to easily manufacture the organic fiber assembly 1 which is continuous organic fiber. Further, since the fabric weight is made at least 4.7 $g/m^2$, the organic fiber 2 would not tear even if the organic fiber 2 is reeled by the roller, and thus it is possible to obtain the continuous long organic fiber having high reliability. Further, since the fabric weight is made no more than 26 $g/m^2$, the heat conductivity can be made equal or no more than around 0.002 [W/mK] which is the heat conductivity of the conventional general-used vacuum heat insulating material 7 using the glass fiber for the core material 5, and thus it is possible to obtain the vacuum heat insulating material 7 with high heat insulating performance.

Explanation of Signs

1: an organic fiber assembly; 1a: an end face, 1x: the first organic fiber assembly; 1y: the second organic fiber assembly; 2: an organic fiber 2a: a remaining fiber; 2b: a cutoff fiber; 2x: an organic fiber 2y: an organic fiber; 3: an air layer; 4: an outer cover material; 5: a core material; 5a: an end face; 6: adsorption agent; 7: a vacuum heat insulating material; 8: a spacer; 9: an external box; 10: an internal box; 11: a foam insulation; 12: a heat insulating wall; 41: an outer cover material opening portion; 45: a sealing portion; 51: a core material opening portion; 52: a through hole; 53: a notch; 55: a folded portion 56: a folded portion; 71: a vacuum heat insulating material opening portion; 72: a through hole; 73: a notch; 75: a vacuum heat insulating material opening portion sealing area; 100: a refrigerator; 110: an embossing; 150: a refrigerating room; 160: a refrigerating room door; 200: a switching room; 201: a containing case; 210: a switching room door; 300: a freezing room; 301: a containing case; 310: a freezing room door; 400: a vegetable room; 401: a containing case; 410: a vegetable room door; 500: an ice making room; 510: an ice making room door; 600: a compressor; 601: a machine room; 640: a cooler room; 650: a cooler; 660: a fan; 680: a cooling air passage; 690: an air passage; 700: a vacuum heat insulating material; 701: a vacuum heat insulating material; 900: a control board; and 910: a control board containing room.

The invention claimed is:

1. A vacuum heat insulating material comprising:
a core material structured by a laminated structure of an organic fiber assembly made by forming an organic fiber into a sheet, having a cutting portion where an end face is cut so as to be a predetermined length; and
a gas-barrier outer cover material containing the core material inside, and having a sealing portion for sealing surrounding the cutting portion in a range being larger than the cutting portion of the core material with an amount of sealing length,
wherein an inside of the outer cover material is hermetically sealed to substantially a vacuum by sealing the sealing portion of the outer cover material, and
wherein at least one long fiber, each at least one long fiber being equal to or longer than a length of the core material, is used for the organic fiber.

2. The vacuum heat insulating material of claim 1, wherein a thickness of the organic fiber assembly is, when the organic fiber assembly is sealed inside of the gas-barrier outer cover material, at least 3 times and no more than 18 times of a diameter of the organic fiber.

3. The vacuum heat insulating material of claim 1,
wherein the organic fiber assembly is formed in a sheet by applying heat deposition on continuous organic fiber, and
wherein an area of the heat deposited portion is made no more than 20% of an area of the sheet.

4. The vacuum heat insulating material of claim 3, wherein the heat deposited portion is provided with a through hole or a concave portion which is smaller than a size of the heat deposited portion.

5. The vacuum heat insulating material of claim 1,
wherein the organic fiber assembly is formed in a sheet by applying heat deposition on continuous organic fiber,
wherein a fabric weight of a non-woven cloth which is the organic fiber assembly is at least 4.7 g/m$^2$ and no more than 70 g/m$^2$, and
wherein the heat deposited portion is made to penetrate from a front surface to a rear surface of the organic fiber assembly.

6. The vacuum heat insulating material of claim 1,
wherein the organic fiber assembly is formed in a sheet by applying heat deposition on continuous organic fiber,
wherein a fabric weight of a non-woven cloth which is the organic fiber assembly is at least 4.7 g/m$^2$ and no more than 100 g/m$^2$, and
wherein the heat deposited portion is made not to penetrate from a front surface to a rear surface of the organic fiber assembly.

7. The vacuum heat insulating material of claim 1,
wherein a fabric weight of a non-woven cloth which is the organic fiber assembly is at least 85 g/m$^2$ and no more than 198 g/m$^2$.

8. The vacuum heat insulating material of claim 1, wherein a cross sectional shape of a fiber forming the organic fiber assembly is made a modified cross sectional shape.

9. The vacuum heat insulating material of claim 1, wherein a plurality of types of core material having different fabric weights are mixed and laminated.

10. The vacuum heat insulating material of claim 1,
wherein the core material is formed by a first organic fiber assembly folded and laminated and a second organic fiber assembly folded and laminated, and
wherein the first organic fiber assembly and the second organic fiber assembly are folded so as to intersect each other.

11. The vacuum heat insulating material of claim 1, wherein the organic fiber is continuous in a length direction or a width direction of the organic fiber assembly.

12. The vacuum heat insulating material of claim 1, wherein an organic fiber of the organic fiber assembly is one of polyester, polystyrene, polypropylene, polylactate, aramid, and liquid crystalline polymer.

13. A heat insulating box comprising:
an external box; and
an internal box arranged inside of the external box,
wherein the vacuum heat insulating material of claim 1 is provided at either of a gap on a surface of the external box between the external box and the internal box, a gap on a surface of the external box between the external box and the internal box, and a gap on a surface of the internal box between the external box and the internal box.

14. The heat insulating box of claim 13, wherein a spacer is provided between the external box and the vacuum heat insulating material.

15. A refrigerator provided with the vacuum heat insulating material of claim 1 on a storage room door or a heat insulating wall between a machine room containing a compressor and a cooler room containing a cooler generating cold air.

16. The refrigerator of claim 15,
wherein the vacuum heat insulating material is provided with an opening portion, and
wherein the opening portion is arranged at a position of a piping connecting the compressor and the cooler so that the piping passes through the vacuum heat insulating material.

17. A refrigerating/air-conditioning apparatus comprising:
an outdoor unit having a cabinet having an almost rectangular cubic shape, a partition wall for partitioning inside of the cabinet into a fan room containing a fan and a machine room containing a compressor, and the vacuum heat insulating material of claim 1 provided at least a part of an inside or an outside of the machine room.

18. A water heater comprising:
a cabinet having a rectangular cubic shape or a cylindrical shape; and
a hot water tank having a cylindrical shape, for reserving water or hot water, and contained in the cabinet, wherein all or at least a part of inside wall of the cabinet is provided with the vacuum heat insulating material of claim 1.

19. An equipment comprising:
a cylindrical container,
wherein surrounding of the container is provided with the vacuum heat insulating material of claim 1 in which a long fibered organic fiber having a length being equal to or longer than a length of the core material is used.

20. An equipment displaying an overall view or a partial view of the equipment on a rear surface or a side surface of a body of the equipment, and further displaying a provided position of the vacuum heat insulating material of claim 1 in either of the overall view or the partial view.

21. The vacuum heat insulating material of claim 1,
wherein the organic fiber assembly is formed in a sheet by applying heat deposition on continuous organic fiber,
wherein a fabric weight of a non-woven cloth which is the organic fiber assembly is at least 140 $g/m^2$ and no more than 198 $g/m^2$, and
wherein the heat deposited portion is made to penetrate from a front surface to a rear surface of the organic fiber assembly.

22. A vacuum heat insulating material comprising:
a core material structured by a laminated structure of an organic fiber assembly made by forming an organic fiber into a sheet and cutting an end face with a predetermined length, or structured by after laminating the organic fiber assembly made by the organic fiber formed into the sheet, cutting the end face with the predetermined length, and having a core material opening portion formed by a through hole or a notch provided by cutting;
a gas-barrier outer cover material containing the core material inside, having a sealing portion for sealing surrounding of the core material structured by the laminated structure of the organic fiber assembly sheet and surrounding of the core material opening portion, and hermetically sealing an inside to substantially a vacuum by sealing the sealing portion; and
an outer cover material opening portion provided at the outer cover material under a status in which the sealing portion provided at the surrounding of the core material and the surrounding of the core material opening portion is sealed, being a through hole or a notch which is smaller than the core material opening portion with a sealed amount,
wherein at least one long fiber, each at least one long fiber being equal to or longer than a length of the core material, is used for the organic fiber.

23. A vacuum heat insulating material comprising:
a core material structured by a laminated structure of an organic fiber assembly formed by forming an organic fiber into a sheet and heat deposition applied, and having a cutting portion where an end face is cut so as to be a predetermined length; and
a gas-barrier outer cover material containing the core material inside, and having a sealing portion for sealing surrounding of the cutting portion in a range being larger than the cutting portion of the core material with an amount of sealing length,
wherein an inside of the outer cover material is hermetically sealed to substantially a vacuum by sealing the sealing portion of the outer cover material, and
wherein a thickness of the organic fiber assembly is at least 3 times and no more than 18 times of an average fiber diameter of the organic fiber, a fabric weight of the organic fiber assembly is at least 4.7 $g/m^2$ and no more than 70 $g/m^2$, and a range in which the organic fiber assembly is provided with a heat deposited portion is no more than 20% of an area of the organic fiber assembly sheet wherein at least one long fiber, each at least one long fiber being equal to or longer than a length of the core material, is used for the organic fiber.

* * * * *